United States Patent
Ishii et al.

(10) Patent No.: US 7,180,561 B2
(45) Date of Patent: Feb. 20, 2007

(54) LIQUID CRYSTAL DISPLAY DEVICE

(75) Inventors: Toshiya Ishii, Kanagawa (JP); Michiaki Sakamoto, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 213 days.

(21) Appl. No.: 11/028,802

(22) Filed: Jan. 5, 2005

(65) Prior Publication Data
US 2005/0146659 A1    Jul. 7, 2005

(30) Foreign Application Priority Data
Jan. 5, 2004    (JP) .............................. 2004-000526

(51) Int. Cl.
*G02F 1/1335* (2006.01)
(52) U.S. Cl. ...................... 349/119; 349/120
(58) Field of Classification Search ................ 349/117, 349/119, 120
See application file for complete search history.

(56) References Cited

U.S. PATENT DOCUMENTS

| | | | | |
|---|---|---|---|---|
| 6,801,283 | B2 * | 10/2004 | Koyama et al. ............ | 349/119 |
| 6,999,144 | B2 * | 2/2006 | Wu et al. .................... | 349/114 |
| 7,012,662 | B2 * | 3/2006 | Kim et al. .................. | 349/114 |

FOREIGN PATENT DOCUMENTS

| | | |
|---|---|---|
| JP | H01-270024 A | 10/1989 |
| JP | H07-69536 A | 7/1995 |
| JP | 2000-29010 A | 1/2000 |
| JP | 2001-343653 A | 12/2001 |
| JP | 2002-55342 A | 2/2002 |
| JP | 2002-303869 A | 10/2002 |
| JP | 2003-114428 A | 4/2003 |
| JP | 2003-207782 A | 7/2003 |
| KR | 2001-0007574 A | 1/2001 |
| KR | 2002-0077804 A | 10/2002 |

* cited by examiner

*Primary Examiner*—David Nelms
*Assistant Examiner*—David Chung
(74) *Attorney, Agent, or Firm*—Sughrue Mion, PLLC

(57) ABSTRACT

A liquid crystal display device includes a liquid crystal cell, first and second polarizers disposed outside the liquid crystal cell, first and second retardation plates arranged between the first and second polarizers, and the liquid crystal cell, and optical layers arranged between the first and second retardation plates and the liquid crystal cell. The first and second retardation plates have lagging axes perpendicular with each other. The first polarizer has an absorption axis inclining by about 45 degrees relative to the lagging axis of the first retardation plate, and inclining by about 90 degrees relative to an absorption axis of the second polarizer. The absorption axes of the first and second polarizers are angularly deviated such that characteristic of a viewing angle in the liquid crystal display device is rendered symmetric, relative to a symmetry axis about which liquid crystal is aligned in different directions.

14 Claims, 58 Drawing Sheets

FIG.15
PRIOR ART

| RETARDATION OF FIRST OPTICAL COMPENSATION LAYER | 0nm | 50nm | 100nm | 150nm | 200nm | 250nm | 300nm |
|---|---|---|---|---|---|---|---|
| SECOND POLARIZER PLATE | 115 | 113 | 113 | 109 | 99 | 86 | 81 |
| SECOND λ/4 PLATE | 70 | 68 | 68 | 64 | 54 | 41 | 36 |
| SECOND OPTICAL COMPENSATION LAYRE | 25 | 23 | 23 | 19 | 9 | -4 | -9 |
| LIQUID CRYSTAL LAYER | - | - | - | - | - | - | - |
| FIRST OPTICAL COMPENSATION LAYRE | 115 | 113 | 113 | 109 | 99 | 86 | 81 |
| FIRST λ/4 PLATE | 160 | 158 | 158 | 154 | 144 | 131 | 126 |
| FIRST POLAREZER PLATE | 25 | 23 | 23 | 19 | 9 | -4 | -9 |

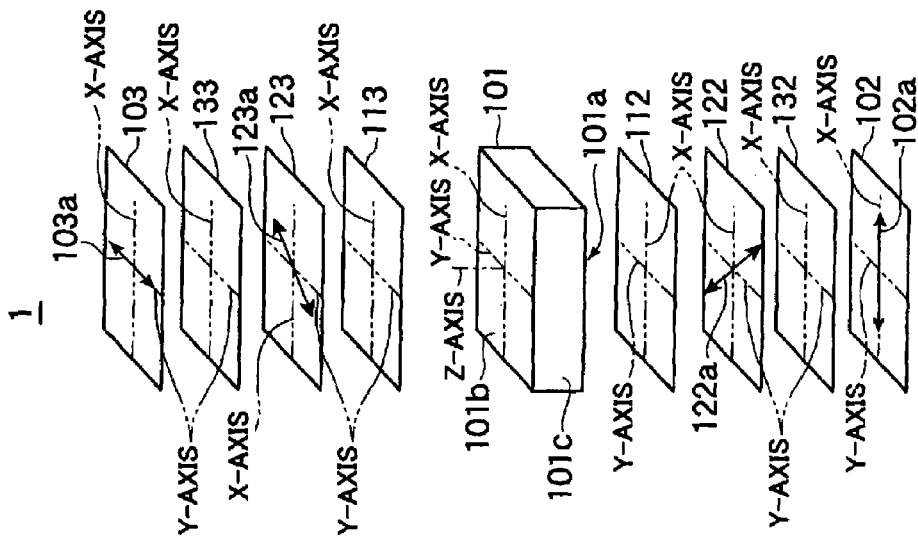
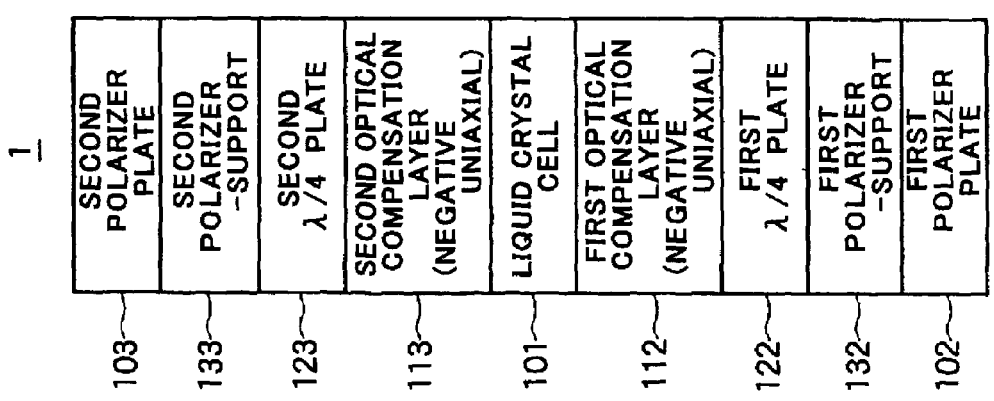

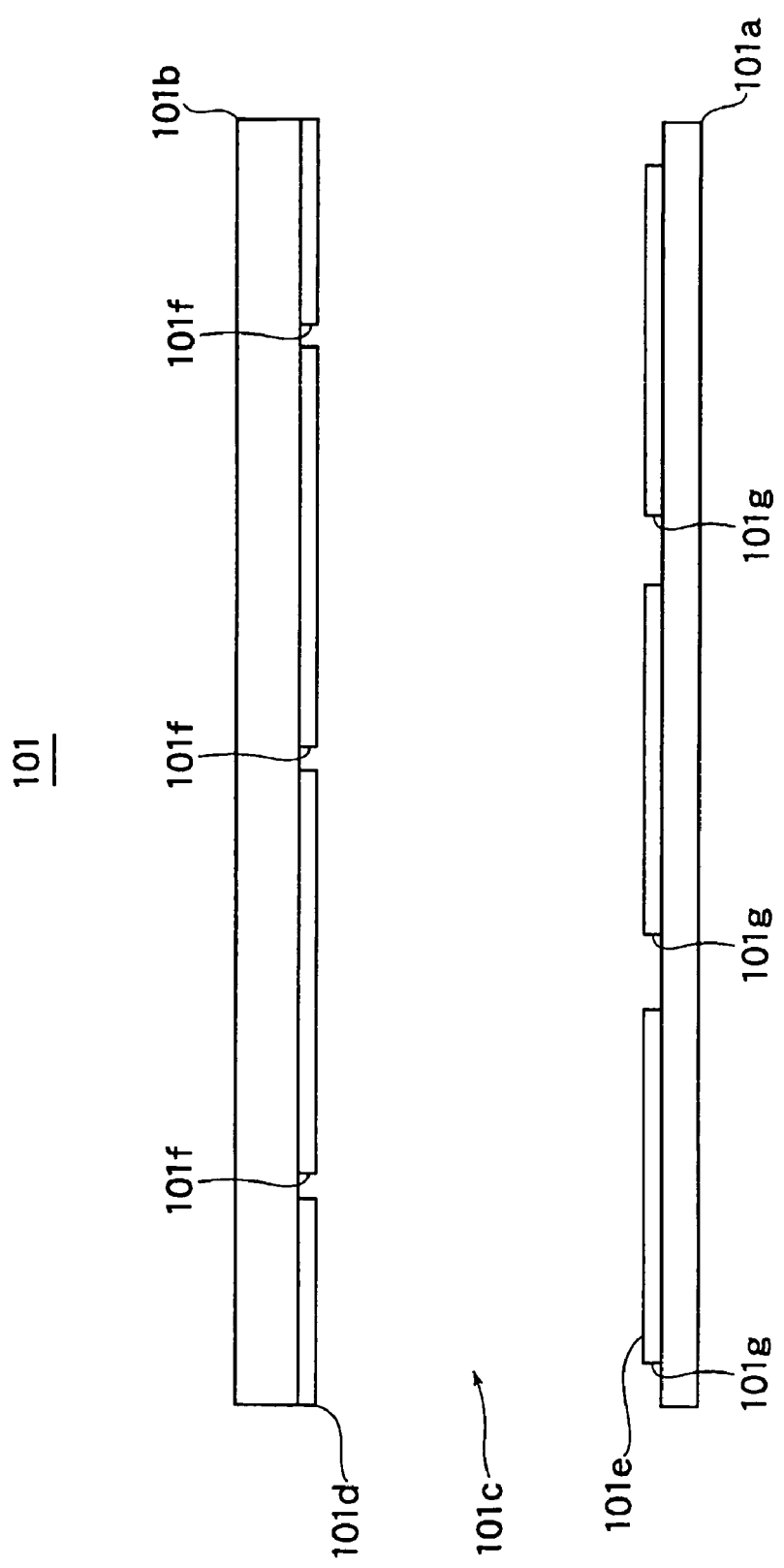

FIG.27

| RETARDATION OF FIRST OPTICAL COMPENSATION LAYER | 50nm | 100nm | 150nm | 200nm | 250nm | 300nm |
|---|---|---|---|---|---|---|
| SECOND POLARIZER PLATE | 118 | 116 | 110 | 95 | 87 | 85 |
| SECOND λ/4 PLATE | 73 | 71 | 65 | 50 | 42 | 40 |
| SECOND OPTICAL COMPENSATION LAYRE | 28 | 26 | 20 | 5 | -3 | -5 |
| LIQUID CRYSTAL LAYER | - | - | - | - | - | - |
| FIRST OPTICAL COMPENSATION LAYRE | 118 | 116 | 110 | 95 | 87 | 85 |
| FIRST λ/4 PLATE | 163 | 161 | 155 | 140 | 132 | 130 |
| FIRST POLAREZER PLATE | 28 | 26 | 20 | 5 | -3 | -5 |

FIG.35

| RETARDATION OF FIRST OPTICAL COMPENSATION LAYER | 50nm | 100nm | 150nm | 200nm | 250nm | 300nm |
|---|---|---|---|---|---|---|
| SECOND POLARIZER PLATE | 122 | 118 | 106 | 93 | 88 | 86 |
| SECOND λ/4 PLATE | 77 | 73 | 61 | 48 | 43 | 41 |
| SECOND OPTICAL COMPENSATION LAYRE | 32 | 28 | 16 | 3 | -2 | -4 |
| LIQUID CRYSTAL LAYER | - | - | - | - | - | - |
| FIRST OPTICAL COMPENSATION LAYRE | 122 | 118 | 106 | 93 | 88 | 86 |
| FIRST λ/4 PLATE | 167 | 163 | 151 | 138 | 133 | 131 |
| FIRST POLAREZER PLATE | 32 | 28 | 16 | 3 | -2 | -4 |

FIG.42

| RETARDATION OF FIRST OPTICAL COMPENSATION LAYER | 25nm | 50nm | 75nm | 100nm | 125nm | 150nm |
|---|---|---|---|---|---|---|
| SECOND POLARIZER PLATE | 120 | 118 | 118 | 116 | 113 | 109 |
| SECOND λ/4 PLATE | 75 | 73 | 73 | 71 | 68 | 64 |
| SECOND OPTICAL COMPENSATION LAYRE | 30 | 28 | 28 | 26 | 23 | 19 |
| LIQUID CRYSTAL LAYER | — | — | — | — | — | — |
| FIRST OPTICAL COMPENSATION LAYRE | 120 | 118 | 118 | 116 | 113 | 109 |
| FIRST λ/4 PLATE | 165 | 163 | 163 | 161 | 158 | 154 |
| FIRST POLAREZER PLATE | 30 | 28 | 28 | 26 | 23 | 19 |

LIQUID CRYSTAL DISPLAY DEVICE

BACKGROUND OF THE INVENTION

1. Field of the Invention

The invention relates to a liquid crystal display device.

2. Description of the Related Art

Japanese Patent Application Publication No. 1-270024A has suggested a liquid crystal display device comprised of a liquid crystal cell in which liquid crystal is vertically aligned, first and second polarizer plates arranged at opposite sides about the liquid crystal cell, a first λ/4 plate arranged between the liquid crystal cell and the first polarizer plate, and a second λ/4 plate arranged between the liquid crystal cell and the second polarizer plate, wherein "λ" indicates a wavelength of a light. The suggested liquid crystal display device improves viewing angle characteristic observed when a viewer obliquely views the liquid crystal display device.

There has been developed a display presenting high visibility even under external light. For instance, Japanese Patent Application Publication No. 2000-29010A (Japanese Patent No. 3410663) has suggested a liquid crystal display device having both a first area in which a light passes therethrough for displaying images and a second area in which a light is reflected for displaying images, and improving characteristic for dark-displaying. The suggested liquid crystal display device is structurally different from the liquid crystal display device suggested in Japanese Patent Application Publication No. 1-270024A in that the liquid crystal cell has the first and second areas. The liquid crystal cell having liquid crystal vertically aligned is used in a normally-black mode in which darkness is displayed when a voltage is not applied thereto and illumination is displayed when a voltage is applied thereto. The suggested liquid crystal display device improves contrast by including normally-black vertically-aligned liquid crystal, in comparison with including TN (twisted nematic) mode liquid crystal or STN (super twisted nematic) mode liquid crystal.

Japanese Patent Publication No. 7-69536B has suggested a liquid crystal display device comprised of a liquid crystal cell in which liquid crystal is vertically aligned, first and second polarizer plates arranged at opposite sides about the liquid crystal cell, a first λ/4 plate arranged between the liquid crystal cell and the first polarizer plate, a second λ/4 plate arranged between the liquid crystal cell and the second polarizer plate, a first negative uniaxial optical compensation layer arranged between the first λ/4 plate and the liquid crystal cell, and a second negative uniaxial optical compensation layer arranged between the second λ/4 plate and the liquid crystal cell. The suggested liquid crystal display device improves viewing angle characteristic for dark-displaying.

Japanese Patent Application Publication No. 2002-303869A has suggested a liquid crystal display device having the same structure as that of the liquid crystal display device suggested in Japanese Patent Publication No. 7-69536B, but being designed as a multi-domain type liquid crystal display device. Herein, a multi-domain type liquid crystal display device indicates a liquid crystal display device in which each of pixels has a plurality of domains in which alignment conditions of liquid crystal are different from one another.

The above-mentioned liquid crystal display device suggested in Japanese Patent Application Publication No. 1-270024A is accompanied with a problem of poor symmetry in contrast, and the liquid crystal display device suggested in Japanese Patent Application Publication No. 2000-29010A improves symmetry in contrast, but is accompanied with a problem that light is leaked when a viewer varies a viewing angle from a direction in which a normal line of a substrate extends.

The liquid crystal display devices suggested in Japanese Patent Publication No. 7-69536B and Japanese Patent Application Publication No. 2002-303869A are accompanied with a problem that desired viewing angle characteristic cannot be obtained.

Japanese Patent Application Publication No. 2002-303869A sets forth that a direction in which contrast is best maintained is obtained by rotating 0 (X-axis direction), 90, 180 and 270 degrees directions by about 30 degrees in a counterclockwise direction, and that contrast is maximized at 0 (X-axis direction), 90, 180 and 270 degrees directions by optimizing angles of the polarizers. However, the Publication fails to indicate a reason why a direction in which contrast is best maintained is rotated, and a relation among retardation of a liquid crystal layer, retardation of a compensation layer, and an arrangement angle of polarizers.

Japanese Patent Application Publication No. 2001-343653 has suggested a liquid crystal display device including a first substrate on which a pixel electrode is formed, a second substrate on which an opposing electrode is formed, a liquid crystal layer sandwiched between the first and second substrates, and containing liquid crystal molecules aligned in different directions in each of pixels when a voltage applied across the pixel and opposing electrodes is equal to a predetermined voltage, a photodetector detecting a light having passed through the liquid crystal layer, a polarizer for polarizing a light entering the liquid crystal layer into a circularly polarized light, and a first retardation layer arranged between the liquid crystal layer and the photodetector, and having in-plane retardation equal to a quarter of a wavelength of a light passing through the liquid crystal layer.

Japanese Patent Application Publication No. 2002-55342 has suggested a liquid crystal display device including a liquid crystal cell, polarizers arranged at opposite sides of the liquid crystal cell, λ/4 layers arranged between the polarizers and the liquid crystal cell, and having retardation almost equal to a quarter of a wavelength of a light passing through the liquid crystal cell, a retardation layer arranged between the liquid crystal cell and one of the λ/4 layers, having retardation in a thickness-wise direction thereof, and optically compensating for the liquid crystal cell, and a compensation layer arranged between the polarizer and the above-mentioned one of the λ/4 layers, wherein the retardation of the compensation layer in a thickness-wise direction thereof has a sign opposite to that of a sum of the retardation of the polarizer, the λ/4 layer and the retardation layer.

Japanese Patent Application Publication No. 2003-114428 has suggested a liquid crystal display device including a first substrate having an area in which an incident light is reflected and an area in which a light passes therethrough, a second substrate on which an opposing substrate is formed, and a liquid crystal layer sandwiched between the first and second substrates, a first polarizer arranged on a surface of the second substrate oppositely to the liquid crystal layer, a second polarizer arranged on a surface of the first substrate oppositely to the liquid crystal layer, a first retardation plate arranged between the first polarizer and the liquid crystal layer, and a second retardation plate arranged between the second polarizer and the liquid crystal layer. Each of the first and second retardation plates is comprised of a λ/4 plate, a light-transmission axis of the first polarizer and a lagging axis of the first retardation plate form 45 degrees therebetween, and a light-transmission axis of the second polarizer and a lagging axis of the second retardation plate form 45 degrees therebetween.

Japanese Patent Application Publication No. 2003-207782 has suggested a liquid crystal display device is comprised of a liquid crystal cell including a pair of substrates, and liquid crystal vertically aligned to the substrates when no voltage is applied thereto, and a polarizer arranged outside the liquid crystal cell, and including a linearly polarizing plate, and an optical device composed of two-axes optically anisotropic material and having retardation equal to $\lambda/4$.

SUMMARY OF THE INVENTION

In view of the above-mentioned problems in the conventional liquid crystal display devices, it is an object of the present invention to provide a liquid crystal display device which is capable of preventing light leakage in 45, 135, 225 and 315 degrees directions in darkness-displaying, and providing symmetric viewing angle characteristic.

There is explained hereinbelow the reason why the viewing angle characteristic in a liquid crystal display device including a liquid crystal cell including vertically aligned liquid crystal, a $\lambda/4$ plate (retardation plate) and a negative uniaxial optical compensation layer (optical layer having negative uniaxial retardation), such as the liquid crystal display devices suggested in Japanese Patent Publication No. 7-69536B and Japanese Patent Application Publication No. 2002-303869A, is not always symmetric.

First, hereinbelow are explained the results of simulation having been carried out with respect to viewing angle characteristic of a liquid crystal display device 100 including no $\lambda/4$ plates, illustrated in FIGS. 1A and 1B.

FIG. 1A is a cross-sectional view of the liquid crystal display device 100, and FIG. 1B is a broken perspective view of the liquid crystal display device 100.

As illustrated in FIG. 1A, the liquid crystal display device 100 is comprised of a liquid crystal cell 101 including vertically aligned liquid crystal, a first polarizer plate 102 arranged on one of surfaces of the liquid crystal cell 101, and second polarizer 103 arranged on the other surface of the liquid crystal cell 101.

As illustrated in FIG. 1B, the liquid crystal cell 101 is comprised of a pair of substrates 101a and 101b each including electrode (not illustrated) arranged thereon, and a liquid crystal layer 101c sandwiched between the substrates 101a and 101b.

Herein, it is assumed that an x-axis extends horizontally and a y-axis extends vertically in a display plane of the liquid crystal display device 100 (that is, an plane of the substrate 101a or 101b), and that an angular position of parts constituting the liquid crystal display device 100 is indicated as an angle relative to the x-axis (azimuth angle). The x- and y-axes are symmetry axes about which liquid crystals in the liquid crystal layer 101c are differently oriented.

It is also assumed that a z-axis extends in the same direction as a direction in which a normal line extends towards a viewer from the substrate 101a or 101b, and that a polar angle is defined as an angle relative to the z-axis.

In the liquid crystal display device illustrated in FIGS. 1A and 1B, the first polarizer plate 102 is designed to have an absorption axis 102a having an azimuth angle of 0 degrees, and the liquid crystal cell 101 is arranged on the first polarizer plate 102. On the liquid crystal cell 101 is arranged the second polarizer plate 103 designed to have an absorption axis 103a having an azimuth angle of 90 degrees. Thus, the first and second polarizers 102 and 103 define vertical polarizer plates.

FIG. 2A is a plan view of the alignment liquid crystal observed when no voltage is applied thereto, and FIG. 2B is a front cross-sectional view of the same. FIG. 3A is a plan view of the alignment liquid crystal observed when a voltage is applied thereto, and FIG. 3B is a front cross-sectional view of the same.

The liquid crystal layer 101c in the liquid crystal cell 101 is filled with liquid crystal having negative dielectric anisotropy.

Liquid crystal molecules E in the liquid crystal layer 101c are aligned vertically relative to the substrates 101a and 101b, when no voltage is applied thereto, as illustrated in FIGS. 2A and 2B.

In contrast, when a voltage is applied to the liquid crystal molecules E, the same amount of the liquid crystal molecules E falls down in four directions defined with azimuth angles of 45, 135, 225 and 315 degrees in four-separated areas oppositely to each of the areas, as illustrated in FIGS. 3A and 3B. Specifically, liquid crystal existing in a direction of an azimuth angle of 45 degrees falls down in a direction of an azimuth angle of 225 degrees, liquid crystal existing in a direction of an azimuth angle of 135 degrees falls down in a direction of an azimuth angle of 225 degrees, liquid crystal existing in a direction of an azimuth angle of 45 degrees falls down in a direction of an azimuth angle of 315 degrees, and liquid crystal existing in a direction of an azimuth angle of 315 degrees falls down in a direction of an azimuth angle of 135 degrees.

As mentioned above, the liquid crystal cell 101 in the liquid crystal display device 100 includes liquid crystal aligned in four different directions.

The liquid crystal cell 101 is in a normally-black mode where darkness (black) is displayed when no voltage is applied thereto and illumination (white) is displayed when a voltage is applied thereto. The liquid crystal has a birefringence rate ($\Delta n$) of 0.074, and a cell gap defined as a thickness of the liquid crystal layer 101c is 4.5 micrometers.

FIG. 4 shows a profile of transmissivity of the liquid crystal display device 100 obtained when no voltage is applied thereto (when darkness (black) is displayed), FIG. 5 shows a profile of transmissivity of the liquid crystal display device 100 obtained when a voltage is applied thereto (when illumination (white) is displayed), and FIG. 6 shows an equi-contrast curve obtained by comparison of a case where no voltage is applied to the liquid crystal to a case where a voltage is applied to the liquid crystal.

Hereinbelow is explained how to read FIGS. 4 to 6.

The center of concentric circles in FIGS. 4 to 6 indicates a direction in which a polar angle is 0 degree. A circle located remoter from the center of the concentric circles indicates a higher polar angle. The innermost circle indicates a polar angle of 22.5 degrees, the circle outwardly located adjacent to the innermost circle indicates a polar angle of 45 degrees, the circle outwardly located adjacent to the previous circle indicates a polar angle of 67.5 degrees, and the outermost circle indicates a polar angle of 90 degrees. In FIGS. 4 to 6, a direction between 0 degree and 180 degrees corresponds to a horizontal direction (an x-axis direction), and a direction between 90 degrees and 270 degrees corresponds to a vertical direction (a y-axis direction). FIGS. 4 and 5 illustrate loci where the transmissivity is kept constant among transmissivity measured with respect to certain polar angles and certain azimuth angles. Similarly, FIG. 6 illustrates a locus where contrast is kept constant among contrasts measured with respect to certain polar angles and certain azimuth angles.

In FIGS. 4 and 5, an area R1 indicates the highest transmissivity, and an area R9 indicates the lowest transmissivity. Specifically, an area R(n) indicates the transmissivity higher than the transmissivity indicated by an area R(n+1) wherein n indicates an integer from 1 to 8. In FIG. 6, an area R11 indicates the highest contrast, and an area R18 indicates the lowest contrast. Specifically, an area R(m) indicates the contrast higher than the contrast indicated by an area R(m+1) wherein n indicates an integer from 11 to 17. In FIG. 6, a boundary between the areas R16 and R17 indicates an equi-contrast curve where contrast is equal to 10.

As illustrated in FIG. 4, the transmissivity of the liquid crystal display device 100 displaying the darkness (black) becomes high in directions defined by azimuth angles of 45, 135, 225 and 315 degrees. The direction in which the transmissivity of the liquid crystal display device 100 displaying the darkness (black) becomes high is defined by a direction in which a light leaks out.

As illustrated in FIG. 5, the transmissivity of the liquid crystal display device 100 displaying the illumination (white) has a uniform profile in x- and y-axes. The contrast curve is symmetric about x- and y-axes, as illustrated in FIG. 6.

FIG. 7A is a front cross-sectional view of a liquid crystal display device 110, and FIG. 7B is a broken perspective view of the same. Hereinbelow is explained the result of simulation carried out about viewing angle characteristic of the liquid crystal display device 110.

Parts or elements constituting the liquid crystal display device 110 illustrated in FIGS. 7A and 7B, which correspond to those of the liquid crystal display device 100 illustrated in FIGS. 1A and 1B have been provided with the same reference numerals, and operate in the same manner as corresponding parts or elements in the liquid crystal display device 100.

As illustrated in FIG. 7A, the liquid crystal display device 110 is designed to additionally include first and second optical compensation layers 112 and 113 in comparison with the liquid crystal display device 100 illustrated in FIGS. 1A and 1B. The first and second optical compensation layers 112 and 113 are defined as an optical layer having negative uniaxial retardation.

Specifically, in the liquid crystal display device 110, the first optical compensation layer 112 is arranged between the liquid crystal cell 101 and the first polarizer 102, and the second optical compensation layer 113 is arranged between the liquid crystal cell 101 and the second polarizer 103. The absorption axes 102a and 103a of the first and second polarizers 102 and 103 in the liquid crystal display device 110 illustrated in FIGS. 7A and 7B are oriented in the same directions as those of the absorption axes 102a and 103a in the liquid crystal display device 100 illustrated in FIGS. 1A and 1B.

Directions in which the transmissivity of the liquid crystal display device 110 displaying darkness (black) becomes high were identical with the directions in which the transmissivity of the liquid crystal display device 100 displaying darkness (black) became high. Namely, the directions remained unchanged from azimuth angles of 45, 135, 225 and 315 degrees. The contrast curve remained symmetrical about x- and y-axes.

The inventors observed viewing angle characteristic in both a liquid crystal display device including the first and second optical compensation layers 112 and 113 having retardation of 50 nanometers in a thickness-wise direction thereof (a sum of retardation in the first and second optical compensation layers 112 and 113 is 100 nanometers) and a liquid crystal display device including the first and second optical compensation layers 112 and 113 having retardation of 100 nanometers in a thickness-wise direction thereof (a sum of retardation in the first and second optical compensation layers 112 and 113 is 200 nanometers).

FIG. 8 is a graph in which the axis of abscissa indicates a sum of retardation in the first and second optical compensation layers 112 and 113 in a thickness-wise direction thereof in the liquid crystal display device 120 illustrated in FIGS. 7A and 7B, and the axis of ordinates indicates an azimuth angle or a direction in which the transmissivity of the liquid crystal display device displaying darkness (black) is in maximum.

As shown in FIG. 8, the direction in which the transmissivity of the liquid crystal display device displaying darkness (black) is in maximum is not dependent on a sum of retardation in the first and second optical compensation layers 112 and 113 in a thickness-wise direction thereof.

As is obvious in view of FIGS. 7A, 7B and 8, in a liquid crystal display device not including a λ/4 plate, but including polarizer plates having absorption axes perpendicular to each other (the first and second polarizer plates 102 and 103), optical compensation layers having negative uniaxial retardation (the first and second optical compensation layers 112 and 113), and a liquid crystal cell containing vertically aligned liquid crystal (the liquid crystal cell 101), when the liquid crystal display device displays darkness (black), a light leaks out in directions inclining by 45 degrees relative to the absorption axes 102a and 103a of the first and second polarizer plates 102 and 103, that is, in four directions defined by azimuth angles of 45, 135, 225 and 315 degrees.

FIG. 9A is a front cross-sectional view of a liquid crystal display device 120, and FIG. 9B is a broken perspective view of the same. Hereinbelow is explained the result of simulation carried out about viewing angle characteristic of the liquid crystal display device 120.

Parts or elements constituting the liquid crystal display device 120 illustrated in FIGS. 9A and 9B, which correspond to those of the liquid crystal display device 100 illustrated in FIGS. 1A and 1B have been provided with the same reference numerals, and operate in the same manner as corresponding parts or elements in the liquid crystal display device 100.

As illustrated in FIG. 9A, the liquid crystal display device 120 is comprised of a liquid crystal cell 101, a first λ/4 plate 122 arranged on one of surfaces of the liquid crystal cell 101, a second λ/4 plate 123 arranged on the other surface of the liquid crystal cell 101, a first polarizer plate 102 arranged on the first λ/4 plate 122, and a second polarizer plate 103 arranged on the second λ/4 plate 123. In brief, the liquid crystal display device 120 is designed to additionally include the first and second λ/4 plates 122 and 123 in comparison with the liquid crystal display device 100 illustrated in FIGS. 1A and 1B. The liquid crystal display device 120 corresponds to the liquid crystal display device suggested in the above-mentioned Japanese Patent Application Publication No. 1-270024.

The first and second polarizer plates 102 and 103 in the liquid crystal display device 120 are designed to have the absorption axes 102a and 103a oriented to 0 and 90 degrees, similarly to the liquid crystal display device 100.

The first λ/4 plate 122 is designed to have a lagging axis 122a oriented to an azimuth angle of 135 degrees, and the second λ/4 plate 123 is designed to have a lagging axis 123a oriented to an azimuth angle of 45 degrees.

The first and second λ/4 plates 122 and 123 have retardation of 138 nanometers therein.

FIG. 10 shows a profile of transmissivity of the liquid crystal display device 120 obtained when no voltage is applied thereto (when darkness (black) is displayed), FIG. 11 shows a profile of transmissivity of the liquid crystal display device 120 obtained when a voltage is applied thereto (when illumination (white) is displayed), and FIG. 12 shows an equi-contrast curve obtained by comparison of a case where no voltage is applied to the liquid crystal to a case where a voltage is applied to the liquid crystal. The areas R1 to R9 and R11 to R18 in FIGS. 10 to 12 indicate the same as the areas R1 to R9 and R11 to R18 in FIGS. 4 to 6.

As shown in FIG. 12, the equi-contrast curve is asymmetrical about x- and y-axes.

As shown in FIG. 11, the profile of transmissivity of the liquid crystal display device 120 obtained when a voltage is applied thereto is symmetrical about x- and y-axes.

As shown in FIG. 10, a direction in which the transmissivity obtained when no voltage is applied to the liquid crystal display device 120 becomes high varies from the directions defined by azimuth angles of 45, 135, 225 and 315 degrees.

The reason why the viewing angle characteristic in the liquid crystal display device 120 is asymmetric is considered that a direction in which the transmissivity of the liquid crystal display device 120 displaying darkness (black) becomes high is deviated relative to the liquid crystal display devices 100 and 110, due to the first and second λ/4 plates 122 and 123.

FIG. 13A is a front cross-sectional view of a liquid crystal display device 130, FIG. 13B is a broken perspective view of the same, and FIG. 13C is a list showing arrangement angles of the parts constituting the liquid crystal display device 130. Hereinbelow is explained the result of simulation carried out about viewing angle characteristic of the liquid crystal display device 130.

Parts or elements constituting the liquid crystal display device 130 illustrated in FIGS. 13A and 13B, which correspond to those of the liquid crystal display devices 110 and 120 illustrated in FIGS. 7A, 7B and 9A, 9B have been provided with the same reference numerals, and operate in the same manner as corresponding parts or elements in the liquid crystal display devices 110 and 120.

As illustrated in FIG. 13A, the liquid crystal display device 130 is designed to additionally include first and second negative uniaxial optical compensation layers 112 and 113 in comparison with the liquid crystal display device 120 illustrated in FIGS. 9A and 9B. The liquid crystal display device 130 corresponds to the liquid crystal display device suggested in the above-mentioned Japanese Patent Publication 7-69536B.

In the liquid crystal display device 130, the first optical compensation layer 112 is arranged between the liquid crystal cell 101 and the first λ/4 plate 122, and the second optical compensation layer 113 is arranged between the liquid crystal cell 101 and the second λ/4 plate 123. The first and second polarizer plates 102 and 103 in the liquid crystal display device 130 are designed to have the absorption axes 102a and 103a oriented in the same directions as those of the liquid crystal display device 100 illustrated in FIGS. 1A and 1B. The first and second λ/4 plates 122 and 123 are designed to have lagging axes 122a and 123a oriented in the same directions as those of the liquid crystal display device 110 illustrated in FIGS. 9A and 9B. That is, the lagging axes 122a and 123a of the first and second polarizer plates 102 and 103 are oriented to a direction in which the symmetry axis about which liquid crystal is aligned in different directions in the liquid crystal layer 101c extends.

With respect to the liquid crystal display device 130 having the above-mentioned structure, the inventors observed viewing angle characteristic in six cases wherein the first and second optical compensation layers 112 and 113 have retardation of 25, 50, 75, 100, 125 and 150 nanometers in a thickness-wise direction thereof (namely, a sum of retardation in the first and second optical compensation layers 112 and 113 is 50, 100, 150, 200, 250 and 300 nanometers, respectively).

FIG. 14 is a graph in which the axis of abscissa indicates a sum of retardation of the first and second optical compensation layers 112 and 113, and the axis of ordinates indicates an azimuth angle or a direction in which the transmissivity of the liquid crystal display device 130 displaying darkness (black) is in maximum.

As shown in FIG. 14, a direction in which the transmissivity of the liquid crystal display device 130 displaying darkness (black) is in maximum is deviated from a direction defined by an azimuth angle of 45 degrees, and a degree of the deviation is dependent on the retardation of the first and second optical compensation layers 112 and 113.

Hence, in order to cancel the deviation, azimuth angles of the first and second polarizer plates 102 and 103, the first and second λ/4 plates 122 and 123, and the first and second optical compensation layers 112 and 113 were determined in accordance with the retardation of the first and second optical compensation layers 112 and 113. FIG. 15 shows the thus determined azimuth angles.

In FIG. 15, the azimuth angles of the first and second polarizer plates 102 and 103 indicate azimuth angles of the absorption axes 102a and 103a, the azimuth angles of the first and second λ/4 plates 122 and 123 indicate azimuth angles of the lagging axes 122a and 123a, and the azimuth angles of the first and second optical compensation layers 112 and 113 indicate azimuth angles of the lagging axes.

FIG. 16 shows the result of the case in which the first and second optical compensation layers 112 and 113 have retardation of 75 nanometers (a sum of retardation is 150 nanometers) in a thickness-wise direction thereof, namely, FIG. 16 shows an equi-contrast curve. In FIG. 16, the arrangement angles of the first polarizer plate 102, the first λ/4 plate 122, the first optical compensation layer 112, the second optical compensation layer 113, the second λ/4 plate 123 and the second polarizer plates 103 are 19, 154, 109, 19, 64 and 109 degrees, respectively, as shown in FIG. 15.

The areas R11 to R18 in FIGS. 16 to 19 indicate the same shown in FIG. 6.

As shown in FIG. 16, when the first and second optical compensation layers 112 and 113 had negative uniaxial retardation of 75 nanometers (a sum of the retardation is 150 nanometers) in a thickness-wise direction thereof, the absorption axes 102a and 103a of the first and second polarizer plates 102 and 103 were deviated relative to the symmetry axis about which liquid crystal was aligned in different directions in the liquid crystal layer 10c, and the arrangement angles of the first and second λ/4 plates 122 and 123 and the first and second optical compensation layers 112 and 113 were shifted accordingly such that viewing angle characteristic of the liquid crystal display device 130 was symmetric. As a result, there was obtained the symmetric viewing angle characteristic. Furthermore, a range of polar angles where contrast is greater than 10 in directions defined by azimuth angles of 45, 135, 225 and 315 degrees was 55 degrees.

FIG. 17 shows the viewing angle characteristic of a liquid crystal display device in which the first and second polarizer plates 102 and 103, the first and second λ/4 plates 122 and 123, and the first and second optical compensation layers 112 and 113 are arranged with the conventional arrangement angles (see FIG. 13C), that is, the absorption axes 102a and 103a of the first and second polarizer plates 102 and 103 are identical with the symmetry axis about which liquid crystal is aligned in different directions in the liquid crystal layer 101c, and the first and second optical compensation layers 112 and 113 have the same retardation in a thickness-wise direction thereof as those of FIG. 16. In such a liquid crystal display device, as shown in FIG. 17, the viewing angle characteristic is asymmetric about a direction from 0 degree to 180 degrees and a direction from 90 degrees to 270 degrees.

FIG. 18 shows an equi-contrast curve wherein each of the first and second optical compensation layers 112 and 113 has retardation of 100 nanometers in a thickness-wise direction thereof (a sum of retardation is 200 nanometers). The arrangement angles of the first polarizer plate 102, the first λ/4 plate 122, the first optical compensation layer 112, the second optical compensation layer 113, the second λ/4 plate 123, and the second polarizer plate 103 are 9, 144, 99, 9, 54, and 99 degrees, respectively.

As shown in FIG. 18, when the first and second optical compensation layers 112 and 113 had negative uniaxial retardation of 100 nanometers (a sum of the retardation is 200 nanometers) in a thickness-wise direction thereof, there was obtained symmetric viewing angle characteristic by selecting the angles shown in FIG. 15. Furthermore, a range of polar angles where contrast is greater than 10 in directions defined by azimuth angles of 45, 135, 225 and 315 degrees was 60 degrees.

FIG. 19 shows the viewing angle characteristic of a liquid crystal display device in which the first and second polarizer plates 102 and 103, the first and second λ/4 plates 122 and 123, and the first and second optical compensation layers 112 and 113 are arranged with the conventional arrangement angles (see FIG. 13C), and the first and second optical compensation layers 112 and 113 have the same retardation in a thickness-wise direction thereof as those of FIG. 18. In such a liquid crystal display device, as shown in FIG. 19, the viewing angle characteristic is asymmetric about a direction from 0 degree to 180 degrees and a direction from 90 degrees to 270 degrees.

Though an equi-contrast curve is not illustrated, the same results as those obtained in FIGS. 16 and 18 were obtained even when other retardations shown in FIG. 15 were selected (for instance, the retardation of the first and second optical compensation layers 112 and 113 in a thickness-wise direction thereof was 25 nanometers (a sum of the retardations is 50 nanometers), 50 nanometers (a sum of the retardations is 100 nanometers), 125 nanometers (a sum of the retardations is 250 nanometers), or 150 nanometers (a sum of the retardations is 300 nanometers).

Based on the analysis mentioned above, the inventors found out that the reason why viewing angle characteristic in a liquid crystal display device including a liquid crystal cell including vertically aligned liquid crystal cell, a λ/4 plate, and an optical compensation layer having negative uniaxial retardation, such as a liquid crystal display device illustrated in FIGS. 13A and 13B or a liquid crystal display device suggested in the above-mentioned Japanese Patent Publication No. 7-69536B or Japanese Patent Application Publication No. 2002-303869, is not always symmetric was that a direction in which transmissivity of a liquid crystal display device displaying darkness (black) becomes high is deviated from a direction at 45 degrees from an absorption axis of a polarizer plate, due to existence of the λ/4 plate, and an angle by which the above-mentioned direction is deviated from a direction at 45 degrees from an absorption axis of a polarizer plate varies in dependence on the retardation of the optical compensation layer.

The analysis made above is summarized. If a liquid crystal display device does not include a λ/4 plate, a direction in which transmissivity of a liquid crystal display device displaying darkness (black) is 45 degrees relative to an absorption axis of a polarizer plate. Such a direction in which transmissivity of a liquid crystal display device displaying darkness (black) varies by designing a liquid crystal display device to include a λ/4 plate. Furthermore, such a direction varies also by designing a liquid crystal display device to include an optical compensation layer having negative uniaxial retardation.

Hence, it is possible to ensure symmetric viewing angle characteristic by shifting arrangement angles of a polarizer plate, a λ/4 plate, and an optical compensation layer having negative uniaxial retardation, in order to cancel such variance in the direction. An optical compensation layer having negative uniaxial retardation is designed to have desired retardation. By using an optical compensation layer having negative uniaxial retardation, it would be possible to not only main a viewing angle in directions of 0 and 90 degrees, but also improve light leakage in a direction of 45 degrees.

Hereinbelow is described a liquid crystal display device in accordance with the present invention through the use of reference numerals used in later described embodiments. The reference numerals are indicated only for the purpose of clearly showing correspondence between claims and the embodiments. It should be noted that the reference numerals are not allowed to interpret of claims of the present application.

In one aspect of the present invention, there is provided a liquid crystal display device including (a) a liquid crystal cell (101) comprised of a pair of substrates each having at least one electrode formed thereon, and a liquid crystal layer sandwiched between the substrates, (b) a first polarizer (102) arranged to face the liquid crystal cell (101), (c) a second polarizer (103) arranged to face the liquid crystal cell (101) at the opposite side of the first polarizer (102), (d) a first retardation plate (122) arranged between the first polarizer (102) and the liquid crystal cell (101), (e) a second retardation plate (123) arranged between the second polarizer (103) and the liquid crystal cell (101), and (f) an optical layer (112, 113) having negative uniaxial retardation and arranged at least one of between the first retardation plate (122) and the liquid crystal cell (101), between the second retardation plate (123) and the liquid crystal cell (101), between the first retardation plate (122) and the first polarizer (102), and between the second retardation plate (123) and the second polarizer (103), wherein each of the first and second retardation plates (122, 123) has a lagging axis (122a, 123a) in a plane disposed in parallel with the substrates, and has retardation of almost λ/4, lagging axes (122a, 123a) of the first and second retardation plates (122, 123) being perpendicular with each other, the first polarizer (102) has an absorption axis (102a) inclining by about 45 degrees relative to the lagging axis (122a, 123a) of the first retardation plate (122), and inclining by about 90 degrees relative to an absorption axis (103a) of the second polarizer (103), the liquid crystal layer is composed of liquid crystal which has negative dielectric anisotropy and which is aligned vertically when no voltage is applied thereto, and aligned in four directions when a voltage is applied thereto, and the absorption axes (102a, 103a) of the first and second polarizers (102, 103) are angularly deviated such that characteristic of a viewing angle in the liquid crystal display device is rendered symmetric, relative to a symmetry axis about which the liquid crystal in the liquid crystal layer is aligned in different directions.

It is preferable that an angle at which the absorption axes of the first and second polarizers (102, 103) are angularly deviated relative to the symmetry axis is determined to be an angle at which symmetry in the characteristic of a viewing angle in the liquid crystal display device is accomplished.

It is preferable that the liquid crystal cell (101) has a first area (532) in which a light passes therethrough and a second area (531) in which a light is reflected, and the liquid crystal is aligned in four directions in each of the first and second areas (532, 531).

It is preferable that the liquid crystal layer has retardation of 333±20 nanometers in the first area (532), and 150±20 nanometers in the second area (531).

It is preferable that the optical layer (112, 113) is arranged between the first retardation plate (122) and the liquid crystal cell (101), between the first retardation plate (122) and the first polarizer (102), and between the second retardation plate (123) and the second polarizer (103).

It is preferable that the optical layer (112, 113) is arranged between the first retardation plate (122) and the liquid crystal cell (101), between the second retardation plate (123) and the liquid crystal cell (101), between the first retardation plate (122) and the first polarizer (102), and between the second retardation plate (123) and the second polarizer (103).

It is preferable that an optical layer (112, 113) arranged between the first retardation plate (122) and the first polarizer (102) has retardation of 25 nanometers in a thickness-wise direction thereof, an optical layer (112, 113) arranged between the second retardation plate (123) and the second polarizer (103) has retardation of 25 nanometers in a thickness-wise direction thereof, an optical layer (112, 113) arranged between the first retardation plate (122) and the liquid crystal cell (101) has retardation of 75 nanometers in a thickness-wise direction thereof, and an optical layer (112, 113) arranged between the second retardation plate (123) and the liquid crystal cell (101) has retardation of 75 nanometers in a thickness-wise direction thereof, and an angle at which the absorption axes (102a, 103a) of the first and second polarizers (102, 103) are angularly deviated relative to the symmetry axis is determined to be 20 degrees.

It is preferable that an optical layer (112, 113) arranged between the first retardation plate (122) and the first polarizer (102) has retardation of 25 nanometers in a thickness-wise direction thereof, an optical layer (112, 113) arranged between the second retardation plate (123) and the second polarizer (103) has retardation of 25 nanometers in a thickness-wise direction thereof, an optical layer (112, 113) arranged between the first retardation plate (122) and the liquid crystal cell (101) has retardation of 100 nanometers in a thickness-wise direction thereof, and an optical layer (112, 113) arranged between the second retardation plate (123) and the liquid crystal cell (101) has retardation of 100 nanometers in a thickness-wise direction thereof, and an angle at which the absorption axes (102a, 103a) of the first and second polarizers (102, 103) are angularly deviated relative to the symmetry axis is determined to be 5 degrees.

It is preferable that an optical layer (112, 113) arranged between the first retardation plate (122) and the first polarizer (102) is comprised of a support (132) for supporting the first polarizer (102), and an optical layer (112, 113) arranged between the second retardation plate (123) and the second polarizer (103) is comprised of a support (133) for supporting the second polarizer (103).

It is preferable that the electrode (101d, 101e) in at least one of the substrates (101a, 101b) is formed with a slit (101g, 101f).

It is preferable that the slit (101g, 101f) defines a boundary about which the liquid crystal in the liquid crystal layer (101c) is aligned in different directions.

It is preferable that the electrode (101d, 101e) in at least one of the substrates (101a, 101b) is formed at a surface facing the liquid crystal layer (101c) with an electrically insulating projection (551) defining a boundary about which the liquid crystal in the liquid crystal layer (101c) is aligned in different directions.

It is preferable that the electrode (101d, 101e) in at least one of the substrates (101a, 101b) is formed at a surface facing the liquid crystal layer (101c) with a slit (101g, 101f), and an electrically insulating projection (551) defining a boundary about which the liquid crystal in the liquid crystal layer (101c) is aligned in different directions is formed in the slit (101g, 101f).

The advantages obtained by the aforementioned present invention will be described hereinbelow.

In the liquid crystal display device in accordance with the present invention, an absorption axis of a polarizer plate is angularly deviated such that viewing angle characteristic of the liquid crystal display device is symmetric, relative to a symmetry axis about which liquid crystal is aligned in different directions in a liquid crystal layer. Hence, it is possible to reduce asymmetry in viewing angle characteristic. In other words, it is possible to present enhancement in symmetry in viewing angle characteristic about x- and y-axes. Furthermore, it is also possible to prevent light leakage (white dots in darkness) which occurs in a direction at 45 degrees from an absorption axis of a polarizer plate.

In addition, the liquid crystal display device in accordance with the present invention presents symmetric viewing angle characteristic about x- and y-axes by determining an angle by which an absorption axis of a polarizer plate is deviated relative to a symmetry axis about which liquid crystal is aligned in different directions, to be an angle at which viewing angle characteristic in the liquid crystal display device in accordance with the present is symmetric. Furthermore, it is also possible to prevent light leakage (white dots in darkness) which occurs in a direction at 45 degrees from an absorption axis of a polarizer plate, that is, to prevent light leakage in directions defined by azimuth angles of 45, 135, 225 and 315 degrees when the liquid crystal display device displays darkness (black).

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 15 shows azimuth angles of polarizer plates, λ/4 plates, and optical compensation layers for rendering viewing angle characteristic symmetric in the liquid crystal display device illustrated in FIGS. 13A and 13B.

FIG. 20A is a front cross-sectional view illustrating a layered-structure of the liquid crystal display device in accordance with the first embodiment of the present invention.

FIG. 20B is a broken perspective view of the liquid crystal display device illustrated in FIG. 20A.

FIG. 21 is a front cross-sectional view of alignment of vertically aligned liquid crystal in the liquid crystal display device in accordance with the first embodiment.

FIG. 27 shows azimuth angles of polarizer plates, λ/4 plates, and optical compensation layers for rendering viewing angle characteristic symmetric in the liquid crystal display device illustrated in FIGS. 1A and 1B (the retardation of the polarizer-supports is 25 nanometers).

Figure 30:
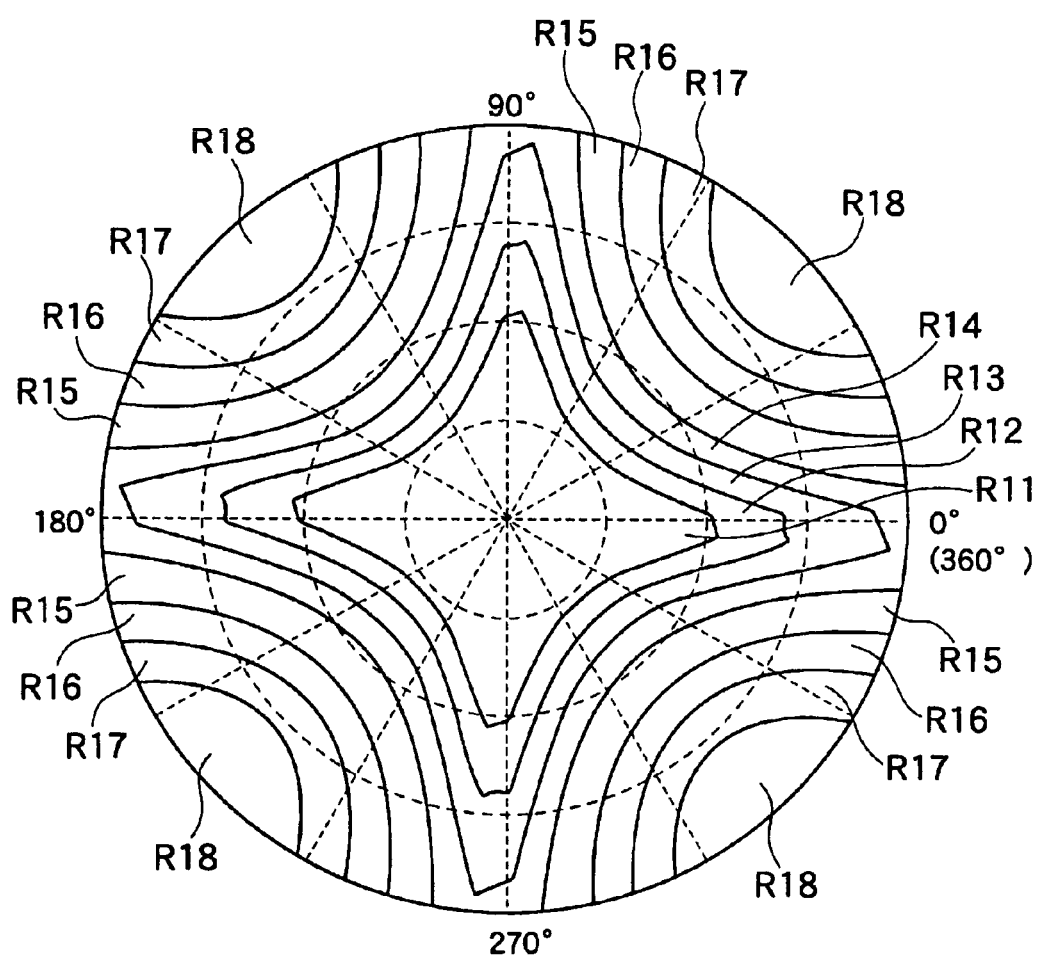
FIG. 30 shows an equi-contrast curve where the negative uniaxial optical compensation layers have retardation of 100 nanometers in a thickness-wise direction thereof (a sum of the retardation is 200 nanometers) under the conditions indicated in FIG. 27.
Figure 31:
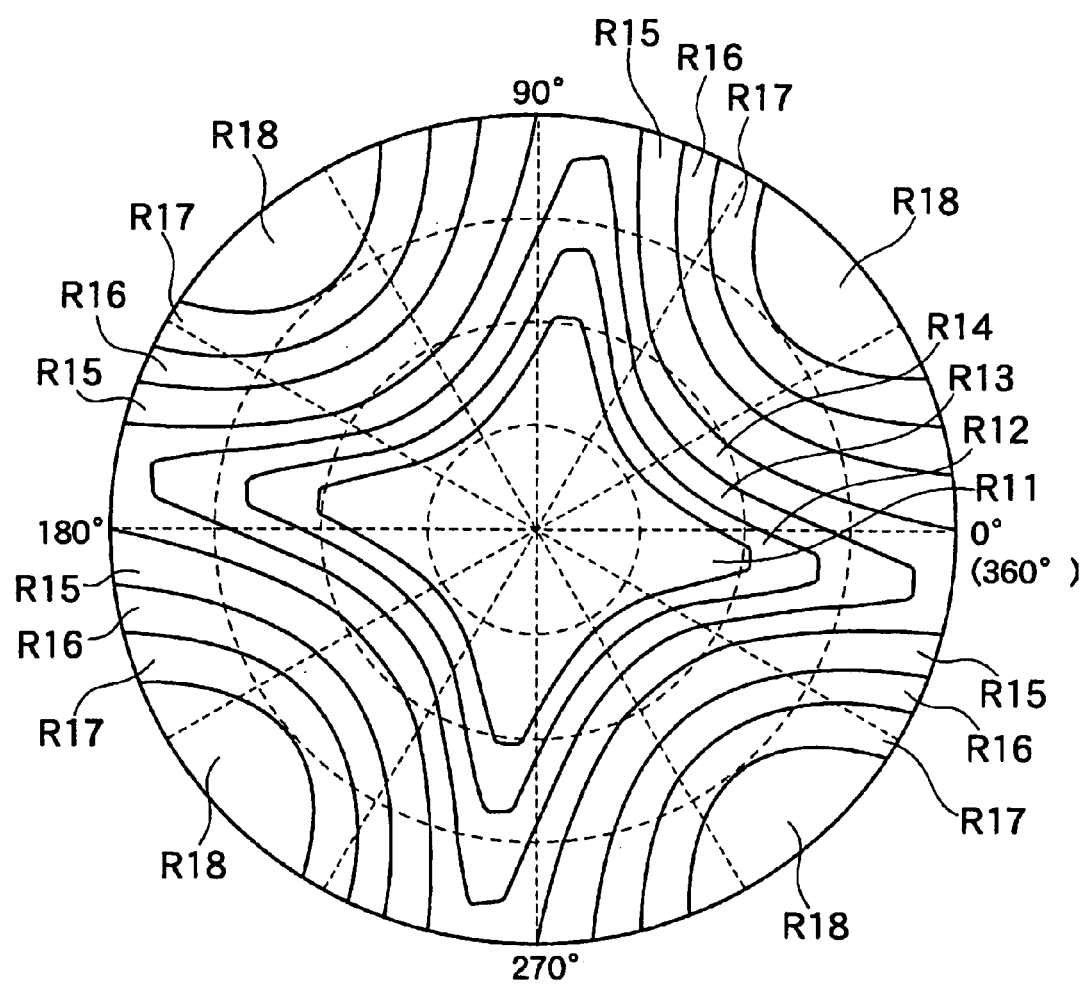

FIG. 31 shows an equi-contrast curve of a reference example of FIG. 30.

Figure 28:
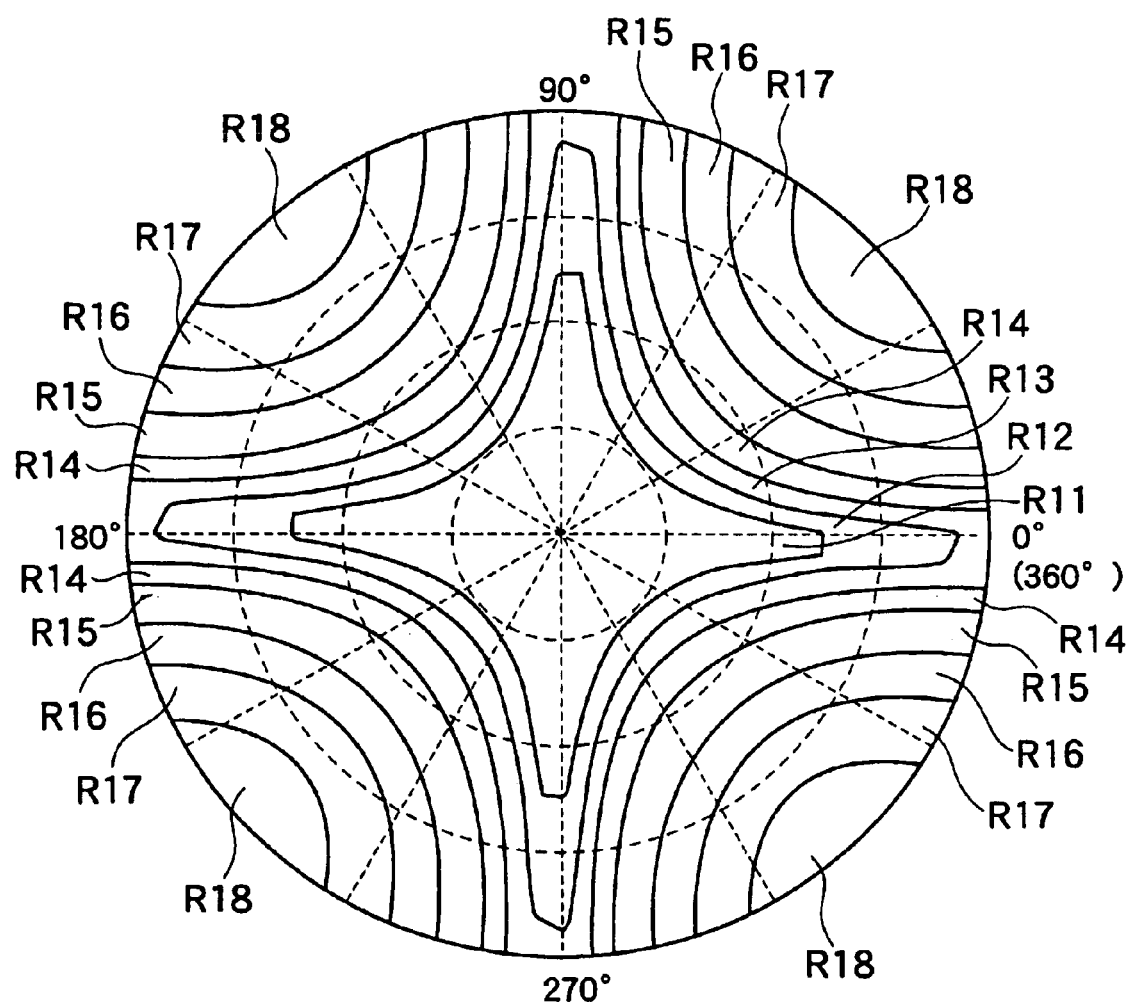
FIG. 28 shows an equi-contrast curve where the negative uniaxial optical compensation layers have retardation of 75 nanometers in a thickness-wise direction thereof (a sum of the retardation is 150 nanometers) under the conditions indicated in FIG. 27.
Figure 32:
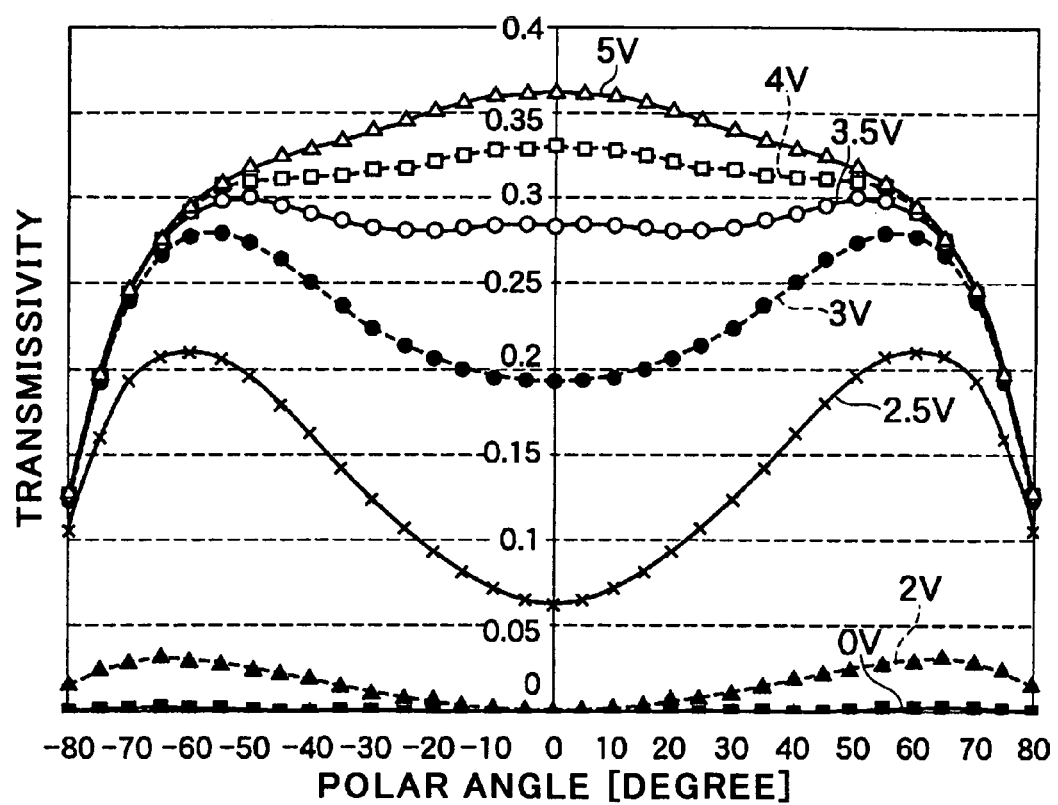

FIG. 32 shows the dependency of a relation between a polar angle and transmissivity on a voltage in a direction from 0 to 180 degrees in azimuth angle, in FIG. 28.

Figure 33:
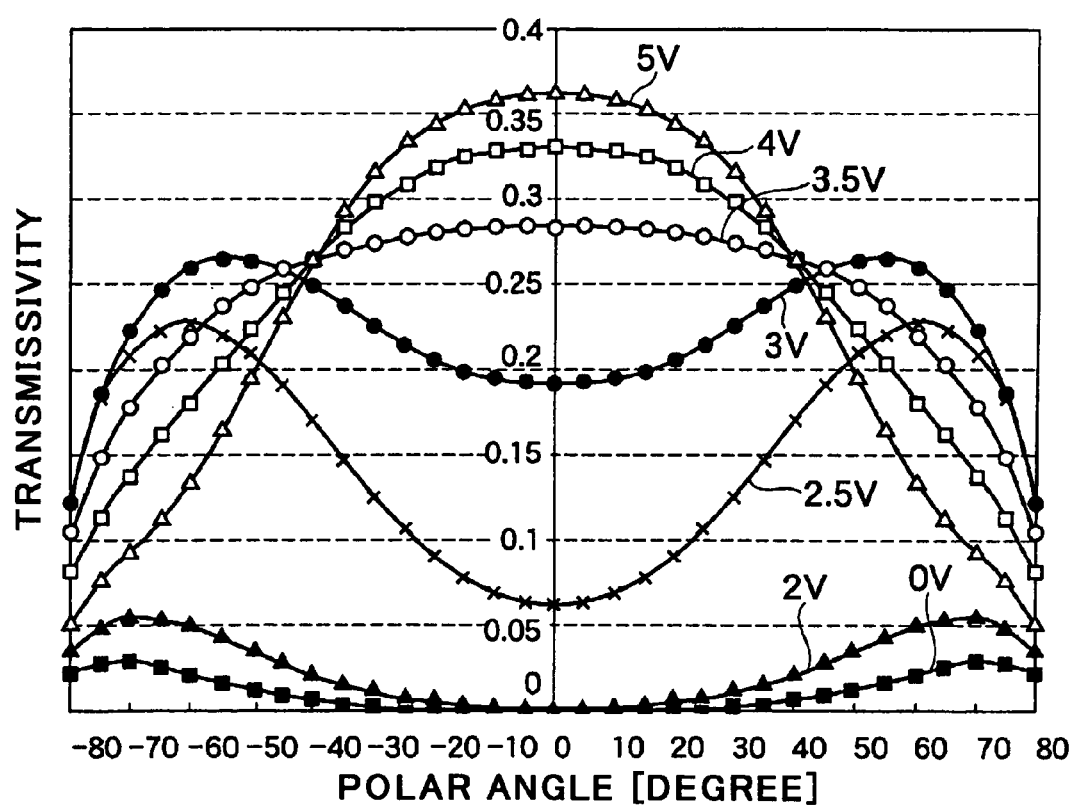

FIG. 33 shows the dependency of a relation between a polar angle and transmissivity on a voltage in a direction from 45 to 135 degrees in azimuth angle, in FIG. 28.

Figure 1B:
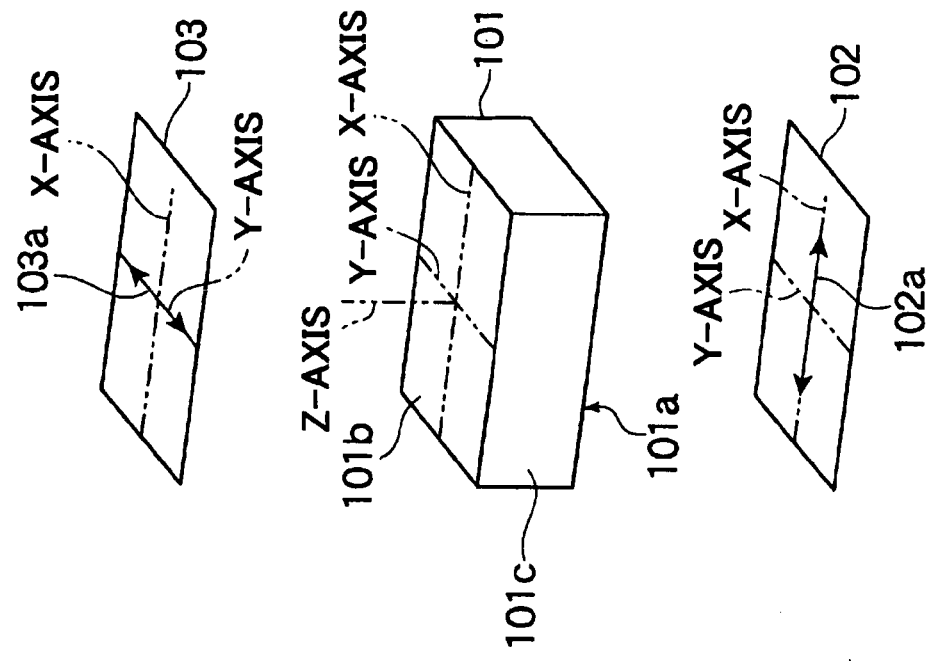
FIG. 1B is a broken perspective view of the liquid crystal display device illustrated in FIG. 1A.
Figure 1A:
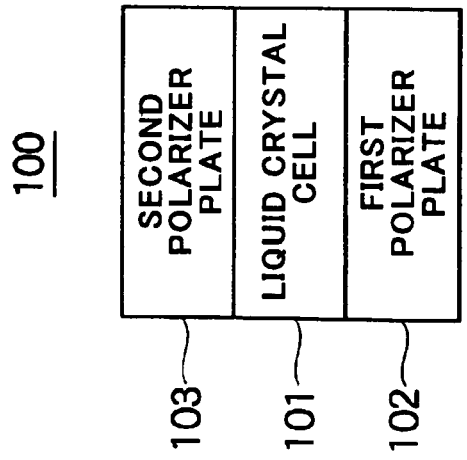
FIG. 1A is a front cross-sectional view illustrating a layered-structure of a liquid crystal display device including no λ/4 plate, as a reference example to be compared with the liquid crystal display device in accordance with the present invention.
Figure 2A:
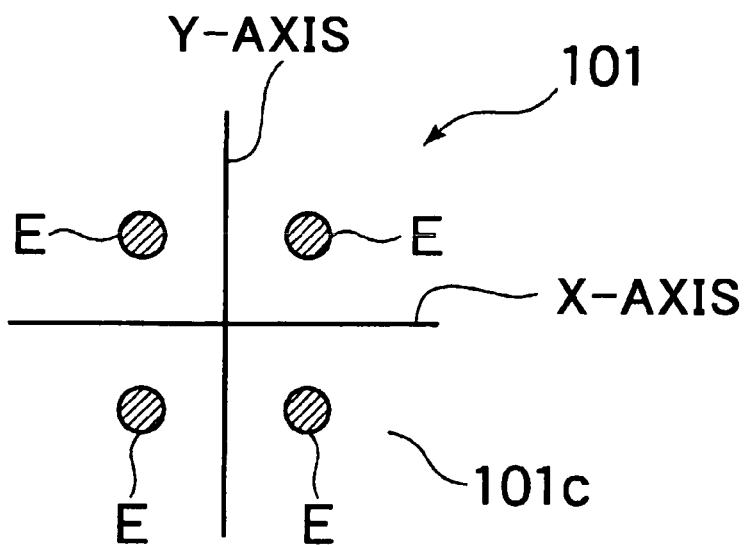
FIG. 2A is a plan view of alignment of liquid crystal observed when no voltage is applied thereto.
Figure 2B:
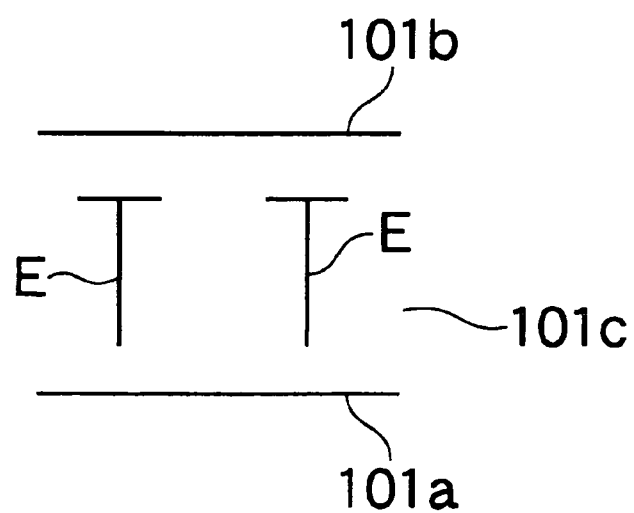
FIG. 2B is a front cross-sectional view of the alignment of liquid crystal illustrated in FIG. 2A.
Figure 3A:
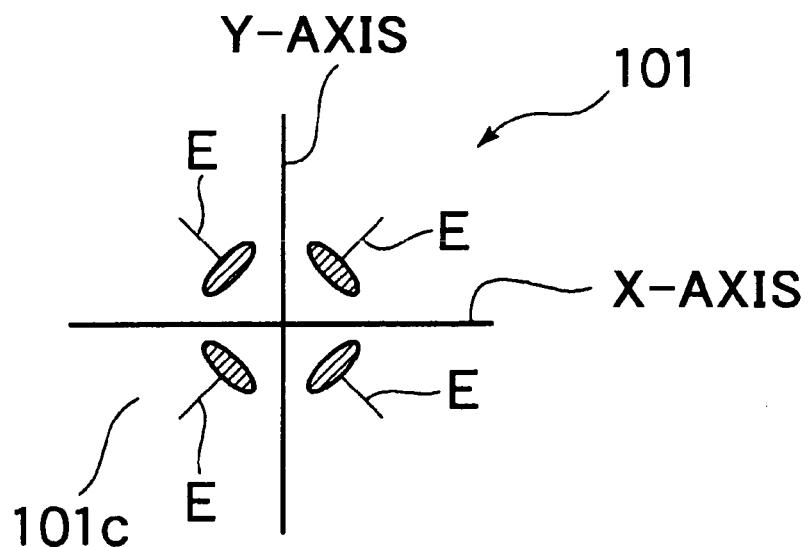
FIG. 3A is a plan view of alignment of liquid crystal observed when a voltage is applied thereto.
Figure 3B:
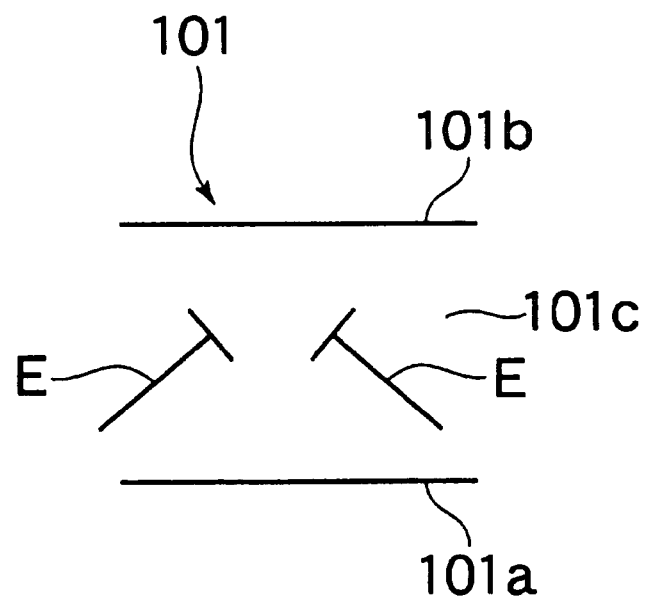
FIG. 3B is a front cross-sectional view of the alignment of liquid crystal illustrated in FIG. 3A.
Figure 4:
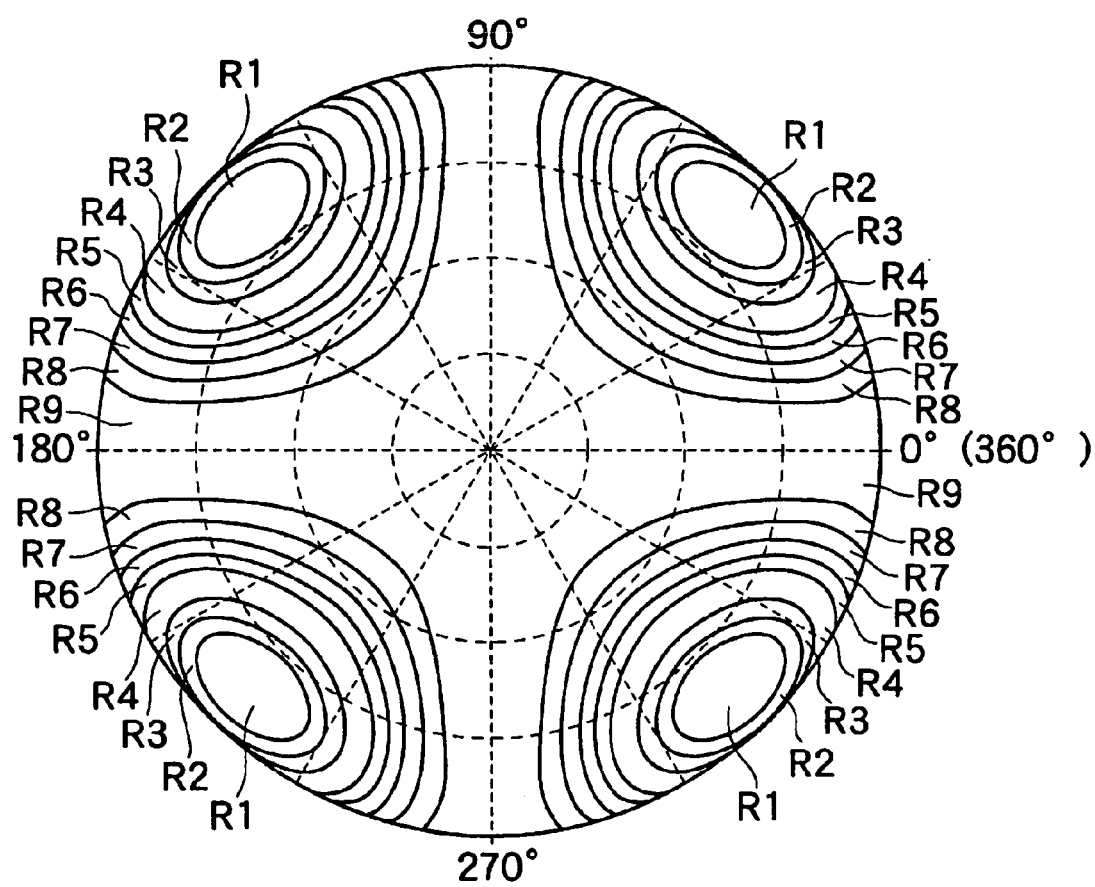
FIG. 4 shows a profile of transmissivity of the liquid crystal display device illustrated in FIGS. 1A and 1B, obtained when no voltage is applied thereto (when darkness (black) is displayed).
Figure 5:
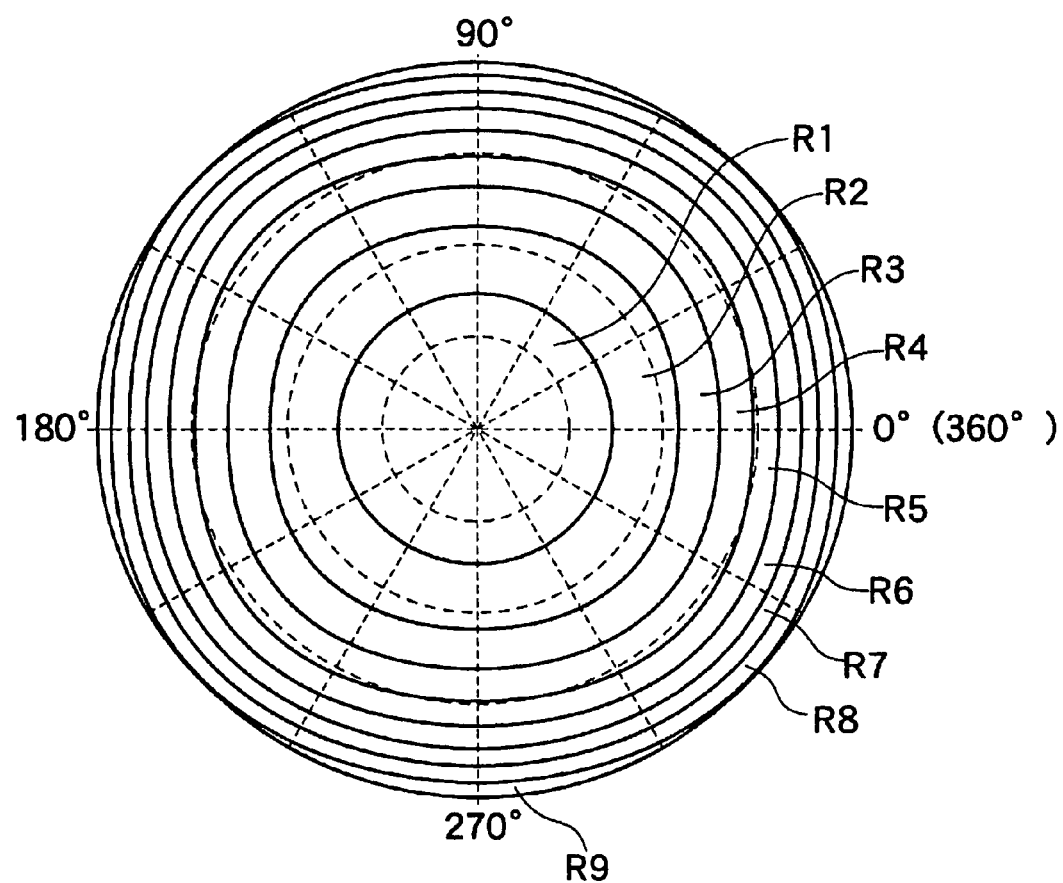
FIG. 5 shows a profile of transmissivity of the liquid crystal display device illustrated in FIGS. 1A and 1B, obtained when a voltage is applied thereto (when illumination (white) is displayed).
Figure 34:
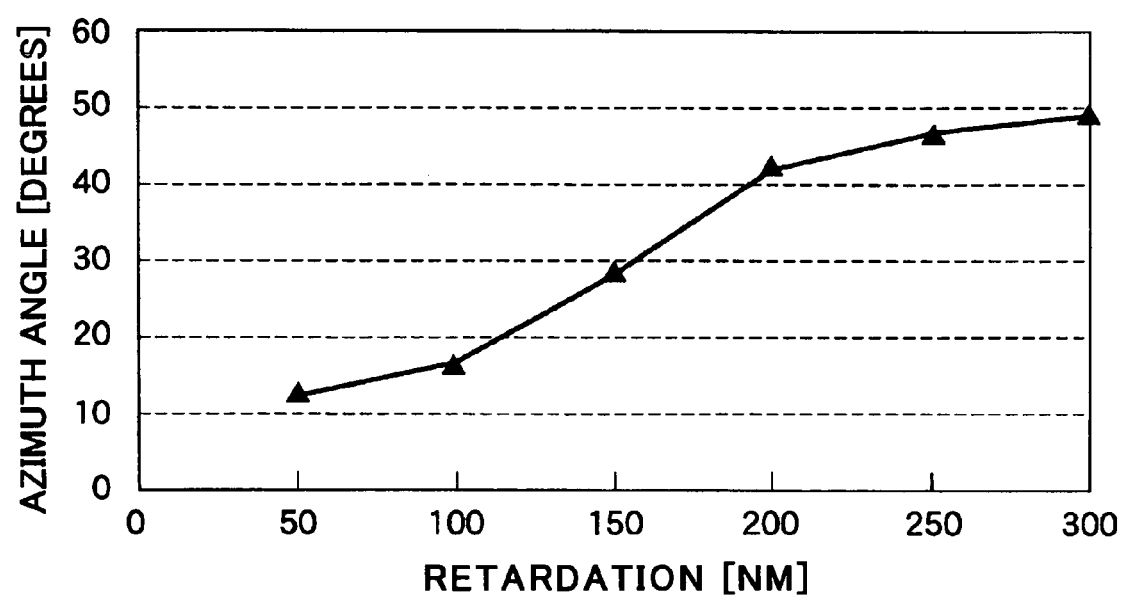

FIG. 34 is a graph having the axis of abscissa indicating a sum of retardations of the first and second optical compensation layers, and the axis of ordinates indicating a direction or an azimuth angle in which the transmissivity of a liquid crystal display device displaying darkness (black) is in maximum in a liquid crystal display device which has the same structure as that of the liquid crystal display device illustrated in FIGS. 1A and 1B, but in which the first and second polarizer plates, the first and second λ/4 plates, and the first and second optical compensation layers are arranged in the conventional arrangement angles (see FIG. 13C) (the retardation of the polarizer-supports is 50 nanometers).

FIG. 35 shows azimuth angles of polarizer plates, λ/4 plates, and optical compensation layers for rendering viewing angle characteristic symmetric in the liquid crystal display device illustrated in FIGS. 1A and 1B (the retardation of the polarizer-supports is 50 nanometers).

Figure 36:
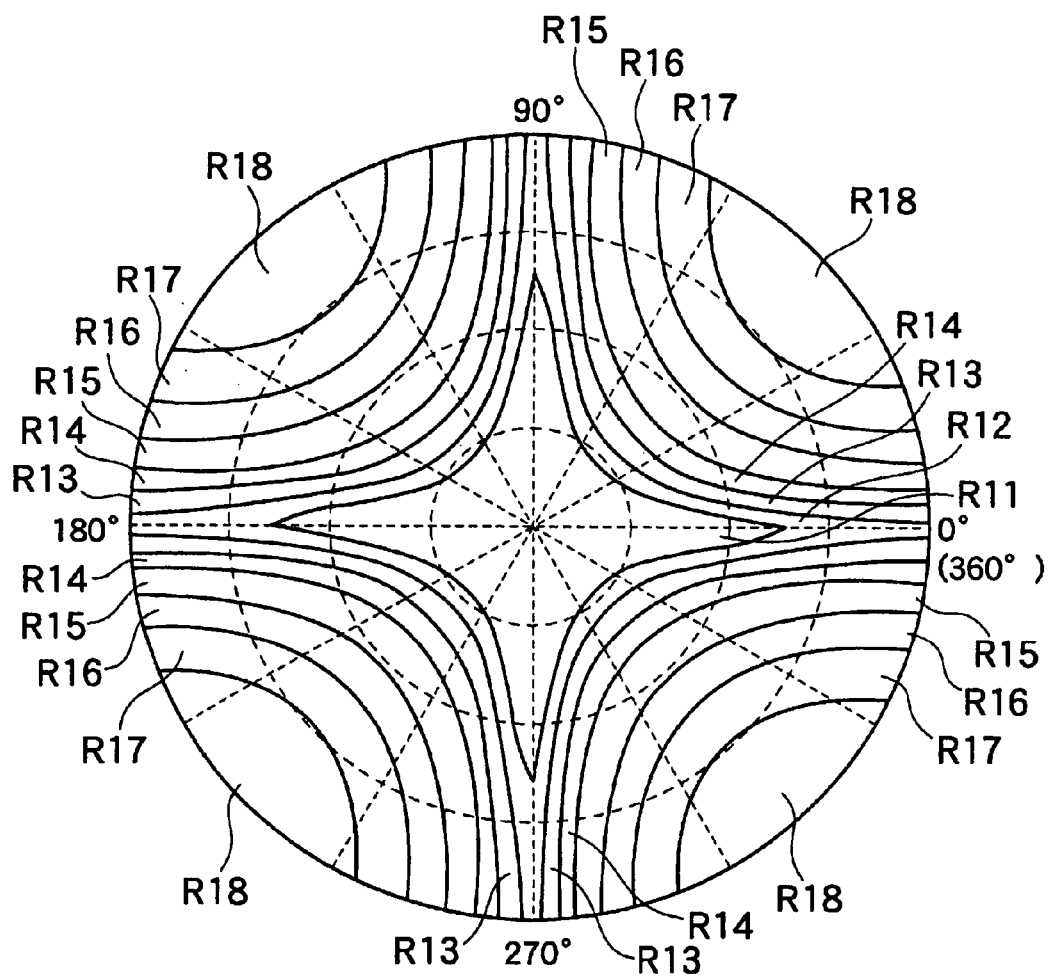

FIG. 36 shows an equi-contrast curve where the negative uniaxial optical compensation layers have retardation of 50 nanometers in a thickness-wise direction thereof (a sum of the retardation is 100 nanometers) under the conditions indicated in FIG. 35.

Figure 37:
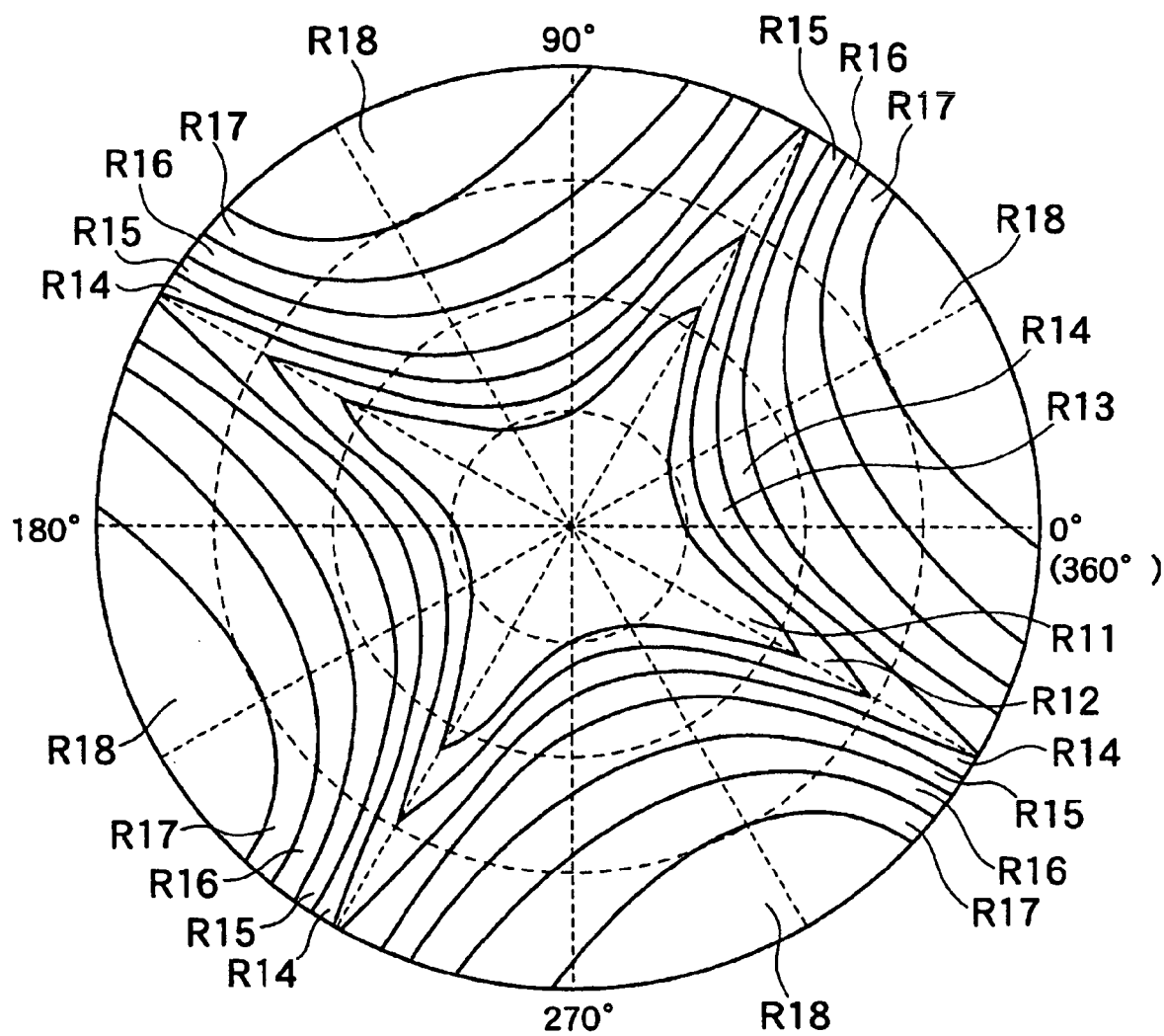

FIG. 37 shows an equi-contrast curve of a reference example of FIG. 36.

Figure 38:
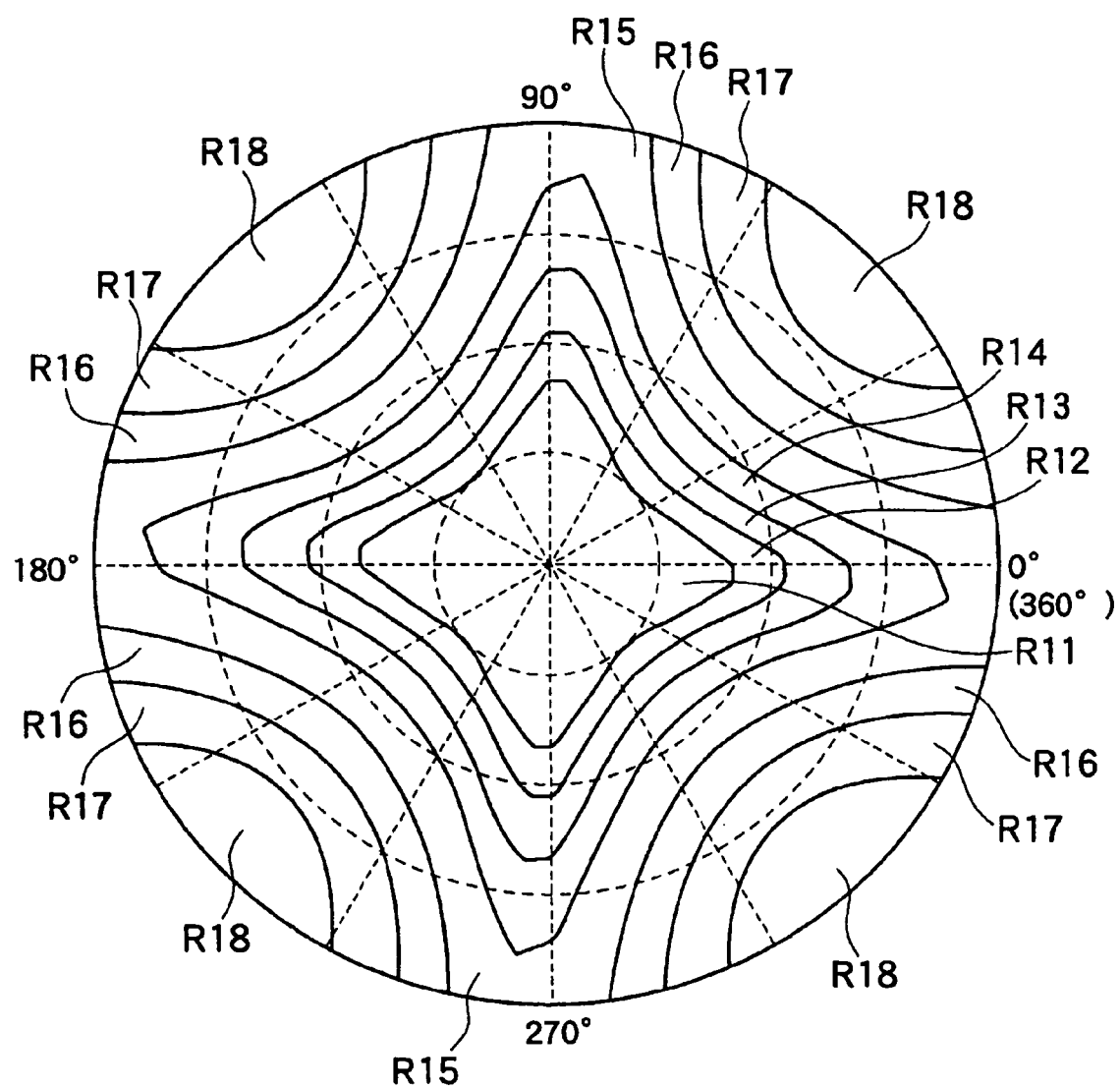

FIG. 38 shows an equi-contrast curve where the negative uniaxial optical compensation layers have retardation of 75 nanometers in a thickness-wise direction thereof (a sum of the retardation is 150 nanometers) under the conditions indicated in FIG. 35.

Figure 39:
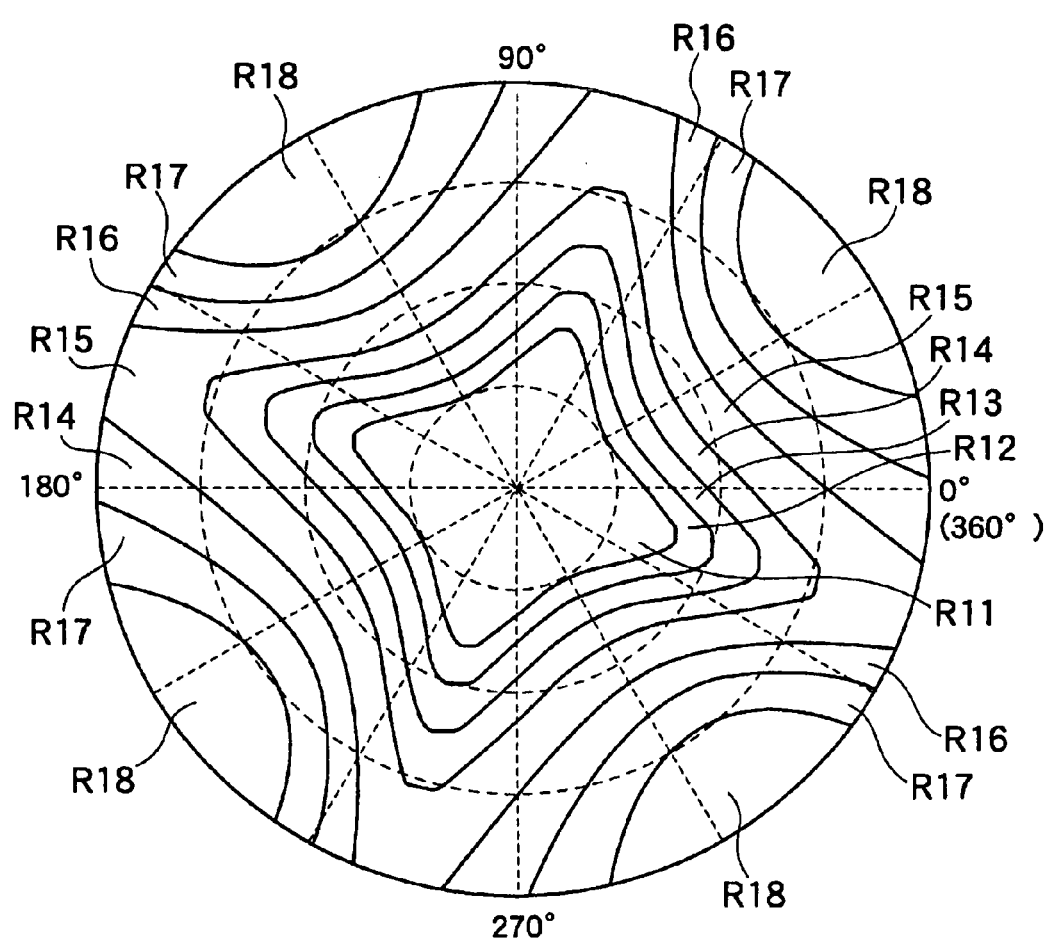

FIG. 39 shows an equi-contrast curve of a reference example of FIG. 38.

Figure 40A:
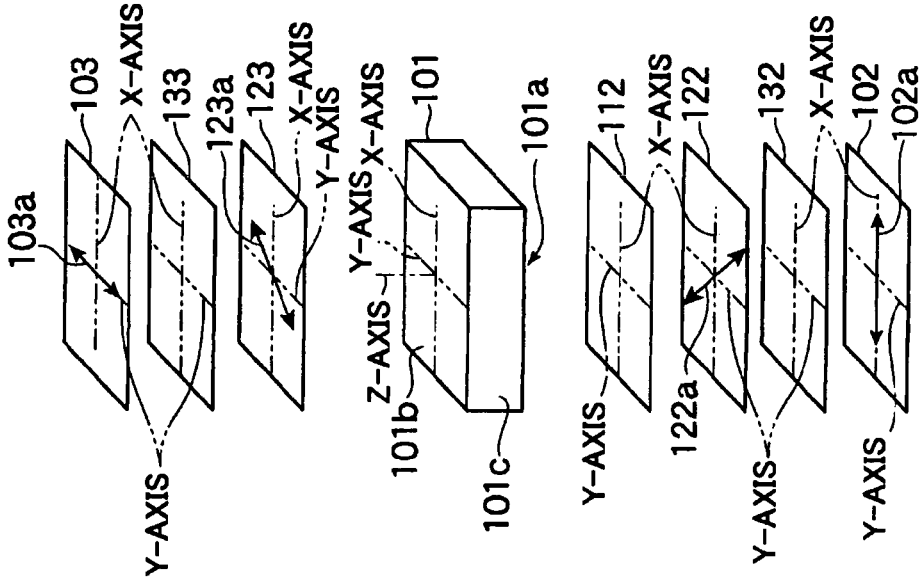

FIG. 40A is a front cross-sectional view illustrating a layered-structure of the liquid crystal display device in accordance with the second embodiment of the present invention.

Figure 40B:
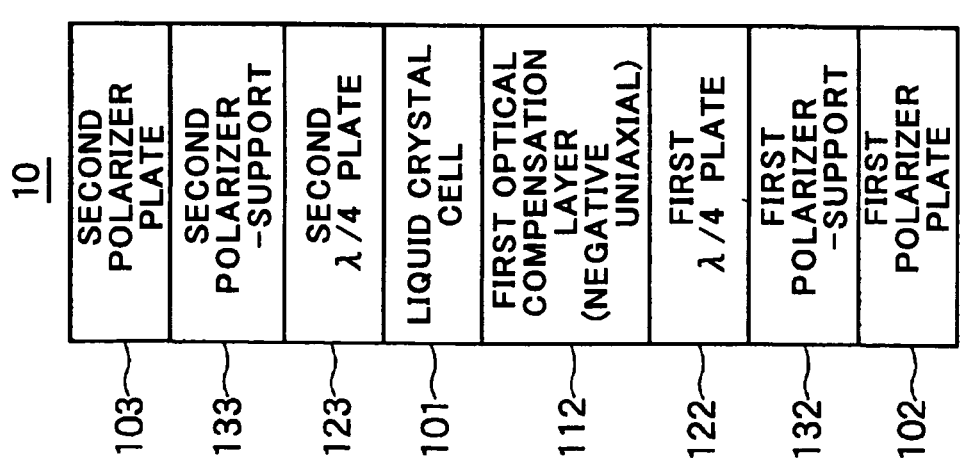

FIG. 40B is a broken perspective view of the liquid crystal display device illustrated in FIG. 40A.

Figure 41:
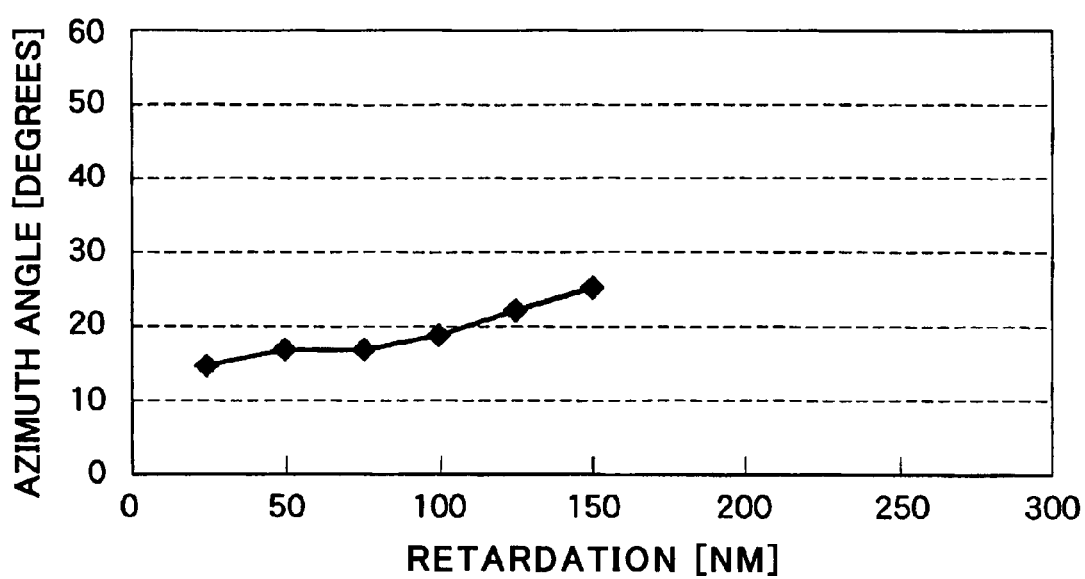

FIG. 41 is a graph having the axis of abscissa indicating a sum of retardations of the first and second optical compensation layers, and the axis of ordinates indicating a direction or an azimuth angle in which the transmissivity of a liquid crystal display device displaying darkness (black) is in maximum in a liquid crystal display device which has the same structure as that of the liquid crystal display device illustrated in FIGS. 40A and 40B, but in which the first and second polarizer plates, the first and second λ/4 plates, and the first and second optical compensation layers are arranged in the conventional arrangement angles (see FIG. 13C) (the retardation of the polarizer-supports is 25 nanometers).

FIG. 42 shows azimuth angles of polarizer plates, λ/4 plates, and optical compensation layers for rendering viewing angle characteristic symmetric in the liquid crystal display device illustrated in FIGS. 40A and 40B (the retardation of the polarizer-supports is 25 nanometers).

Figure 43:
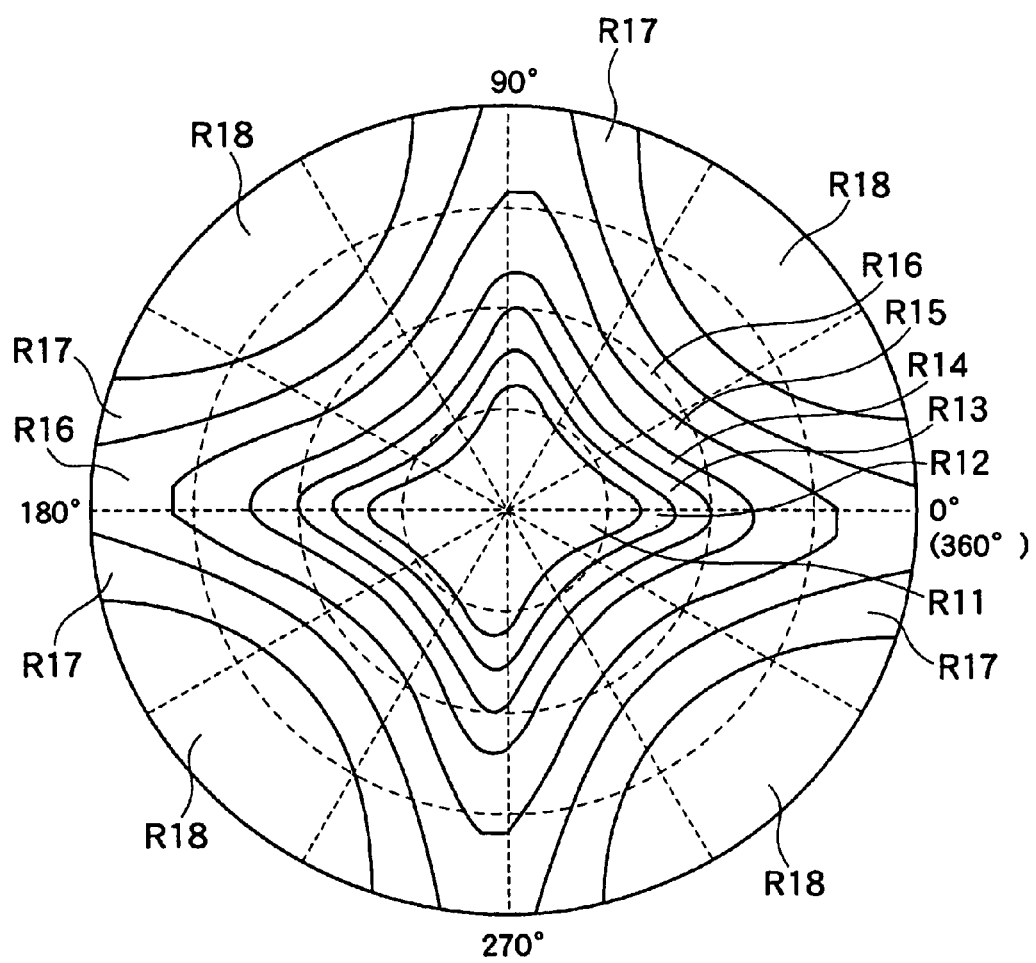

FIG. 43 shows an equi-contrast curve where the negative uniaxial optical compensation layer has retardation of 50 nanometers in a thickness-wise direction thereof under the conditions indicated in FIG. 42.

Figure 44:
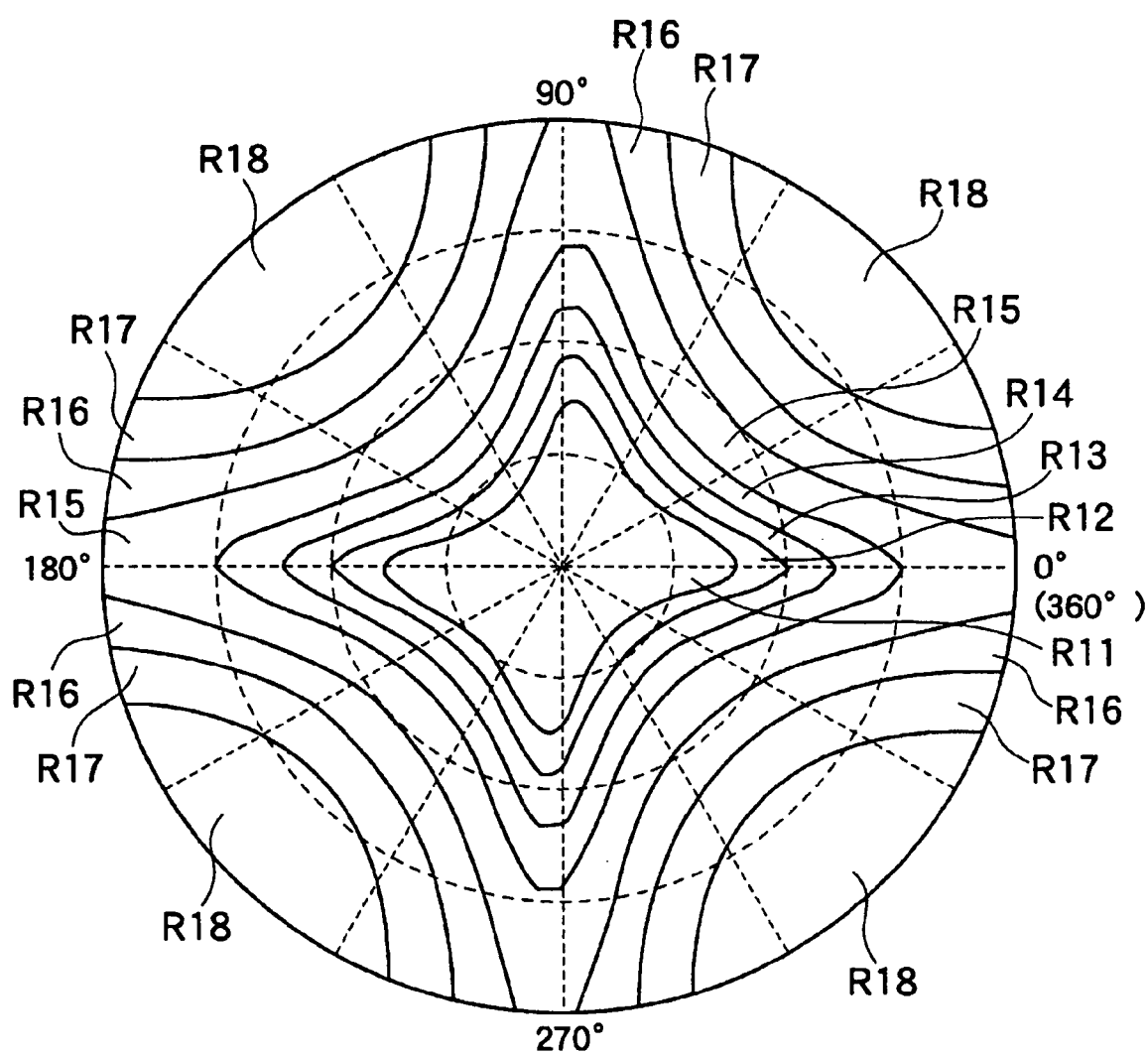

FIG. 44 shows an equi-contrast curve where the negative uniaxial optical compensation layer has retardation of 75 nanometers in a thickness-wise direction thereof under the conditions indicated in FIG. 42.

Figure 45:
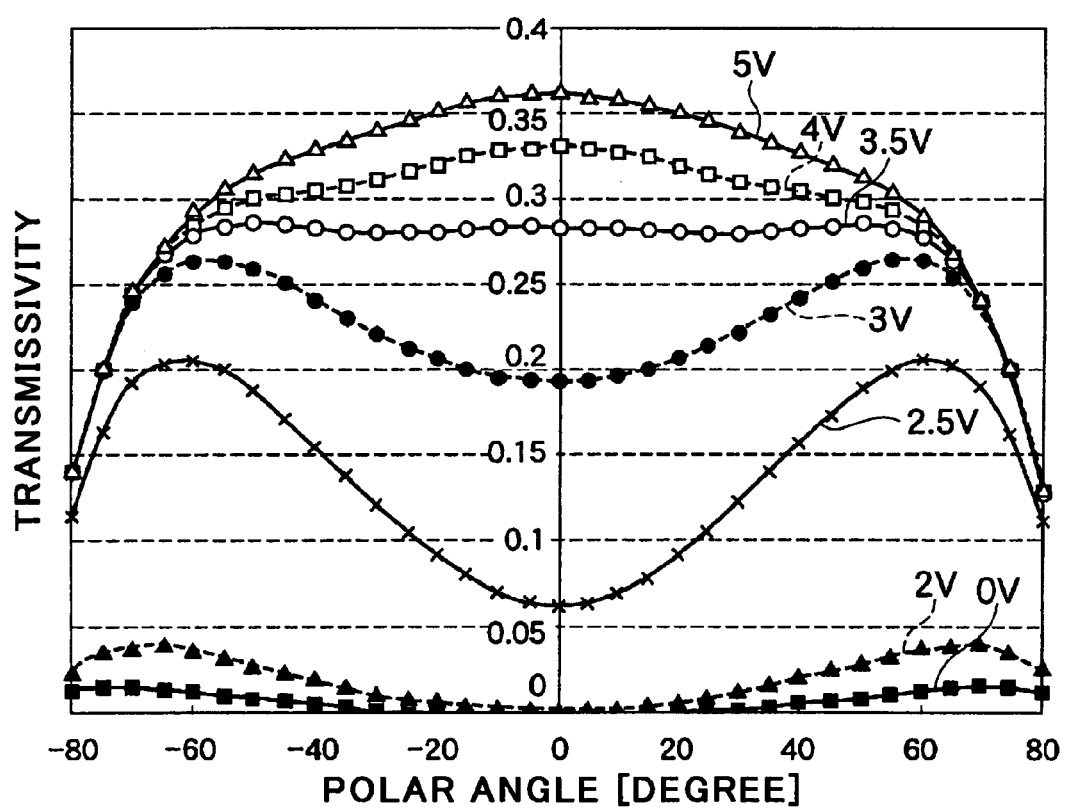

FIG. 45 shows the dependency of a relation between a polar angle and transmissivity on a voltage in a direction from 0 to 180 degrees in azimuth angle, in FIG. 43.

Figure 46:
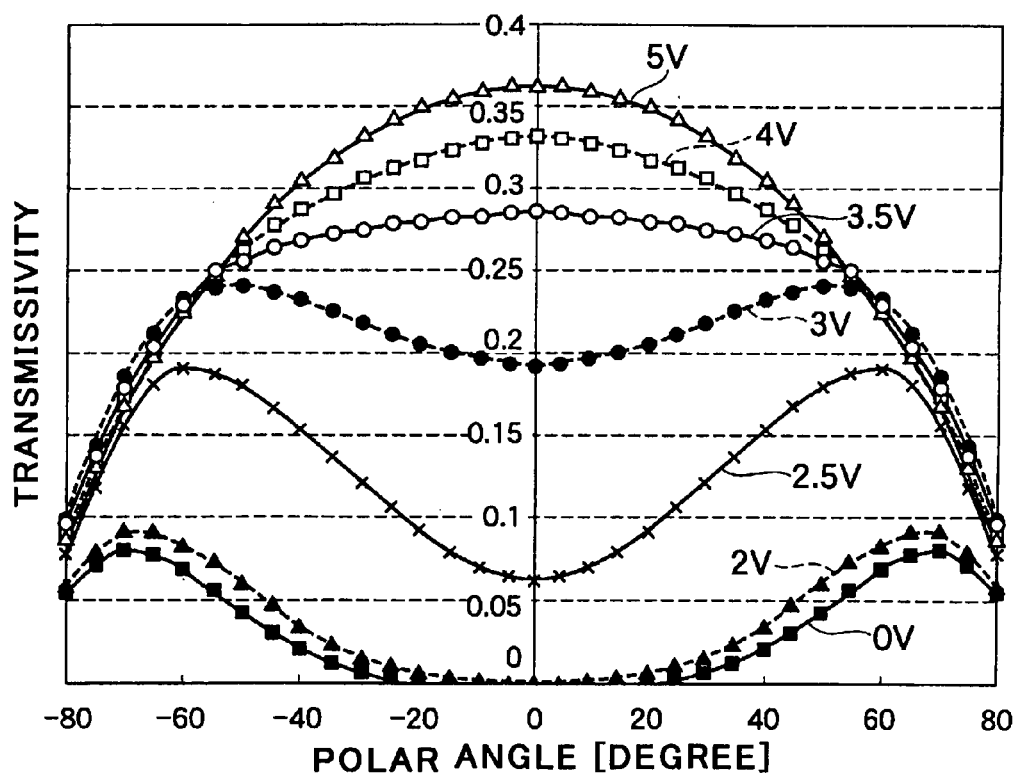

FIG. 46 shows the dependency of a relation between a polar angle and transmissivity on a voltage in a direction from 45 to 135 degrees in azimuth angle, in FIG. 43.

Figure 47:
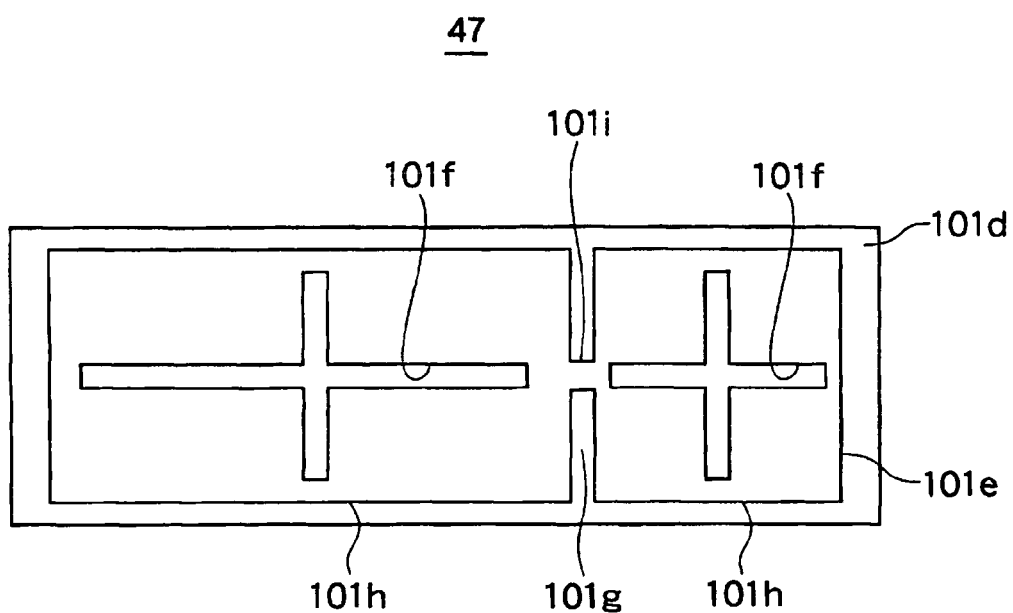

FIG. 47 is a plan view of another example of the vertically aligned liquid crystal cell.

Figure 48:
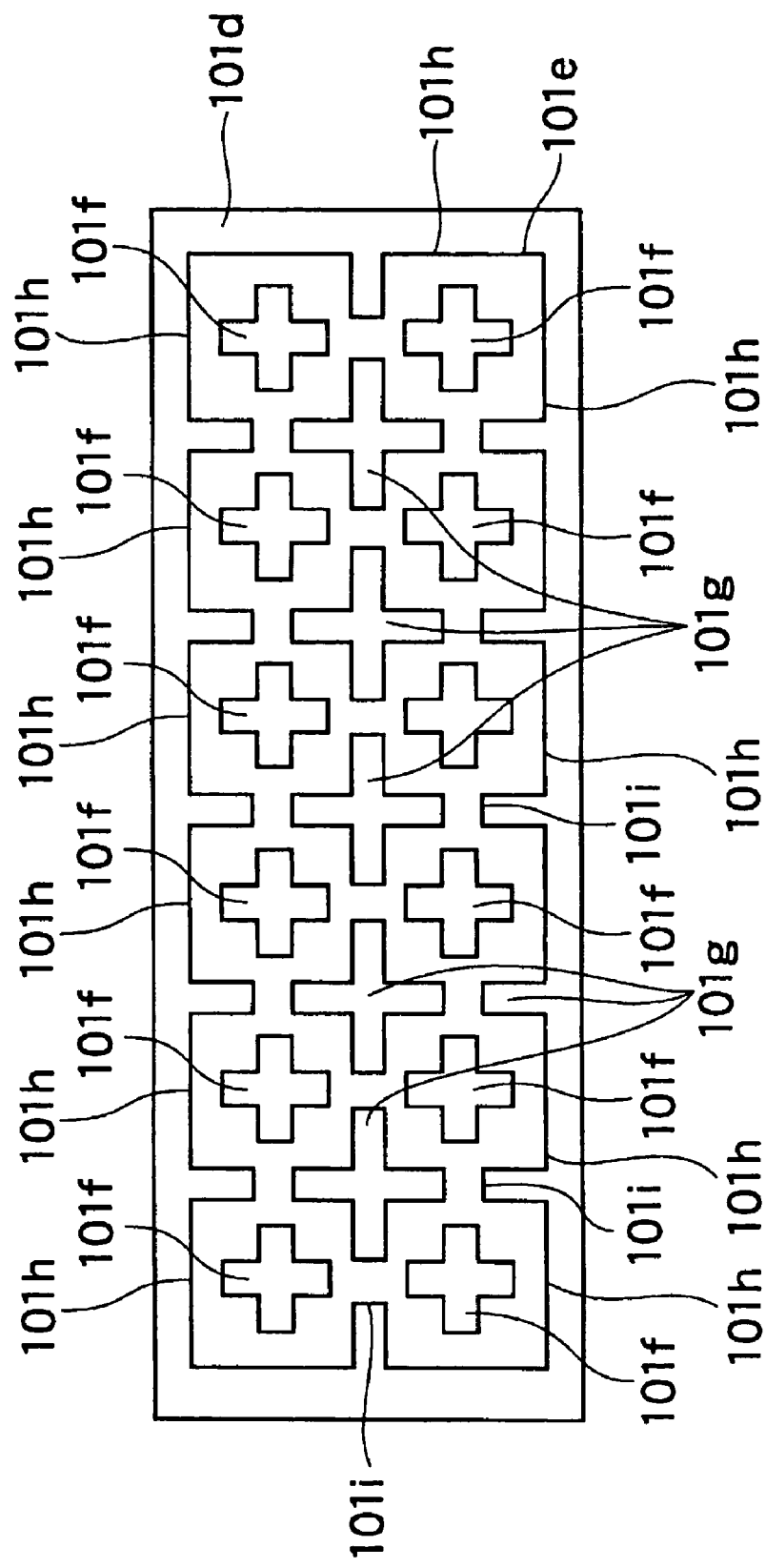

FIG. 48 is a plan view of still another example of the vertically aligned liquid crystal cell.

Figure 49:
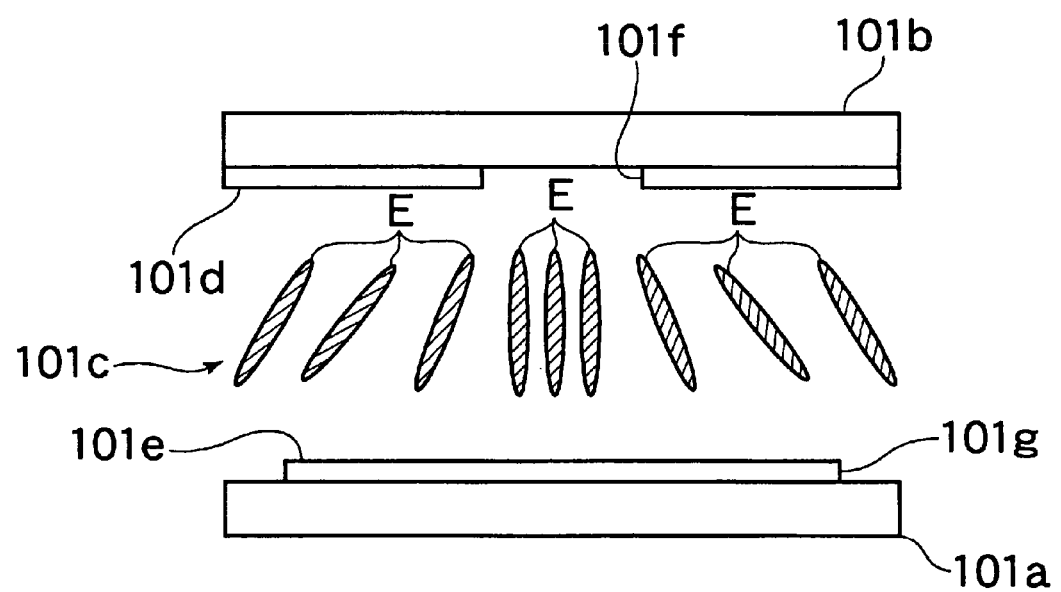

FIG. 49 is a cross-sectional view of the vertically aligned liquid crystal cell, used for explaining a relation a width of the slit and stability of liquid crystal alignment against external pressure.

Figure 50:
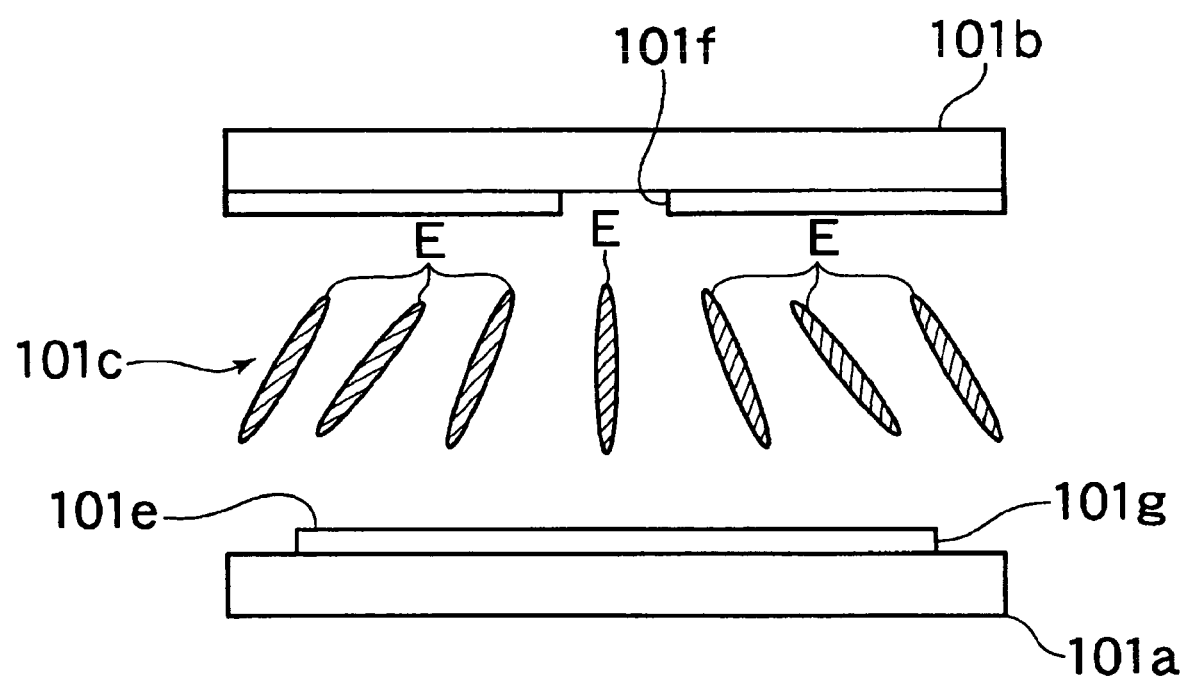

FIG. 50 is a cross-sectional view of the vertically aligned liquid crystal cell, used for explaining a relation a width of the slit and stability of liquid crystal alignment against external pressure.

Figure 51:
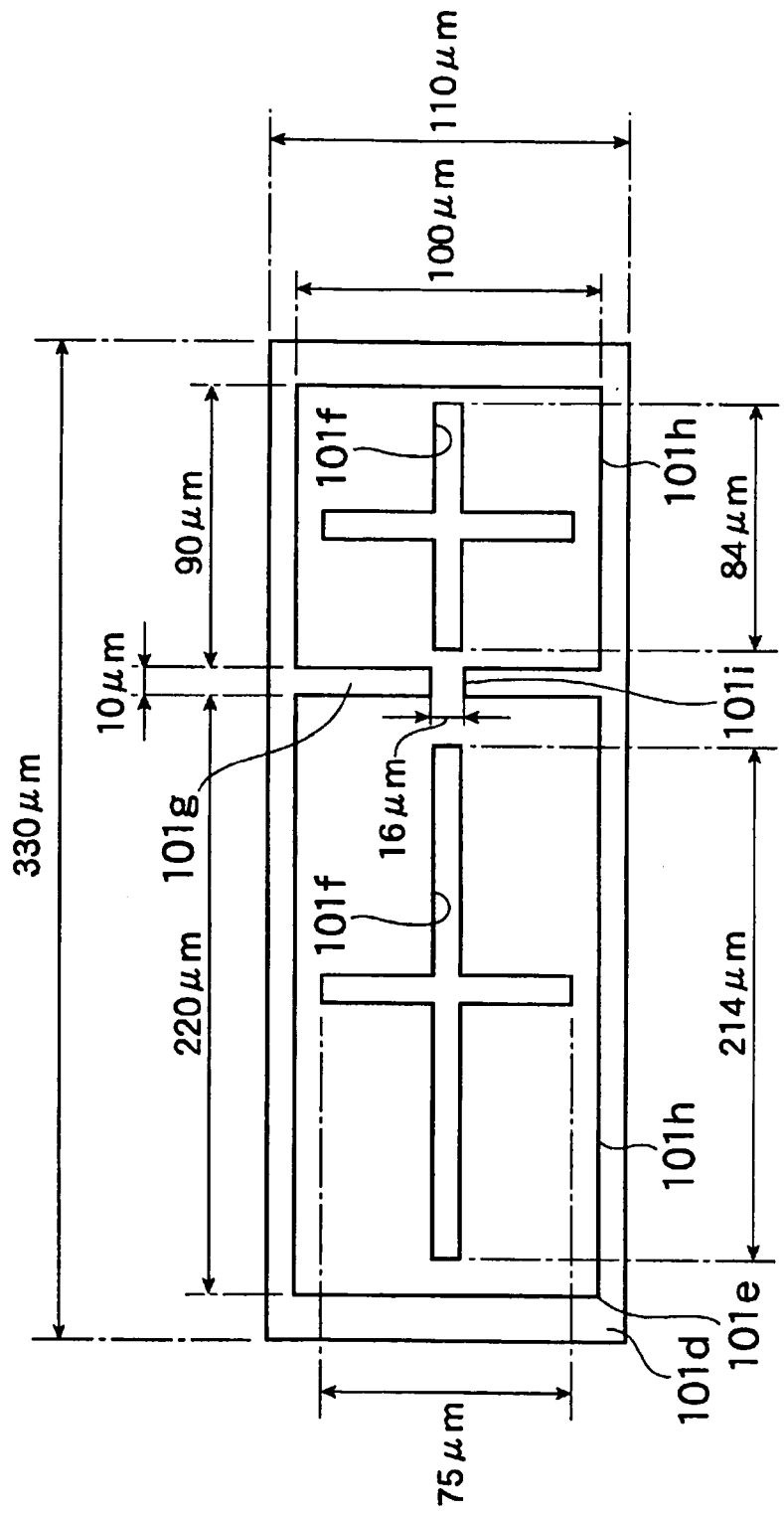

FIG. 51 shows an example of dimension of the slits in the vertically aligned liquid crystal cell illustrated in FIG. 47.

Figure 52:
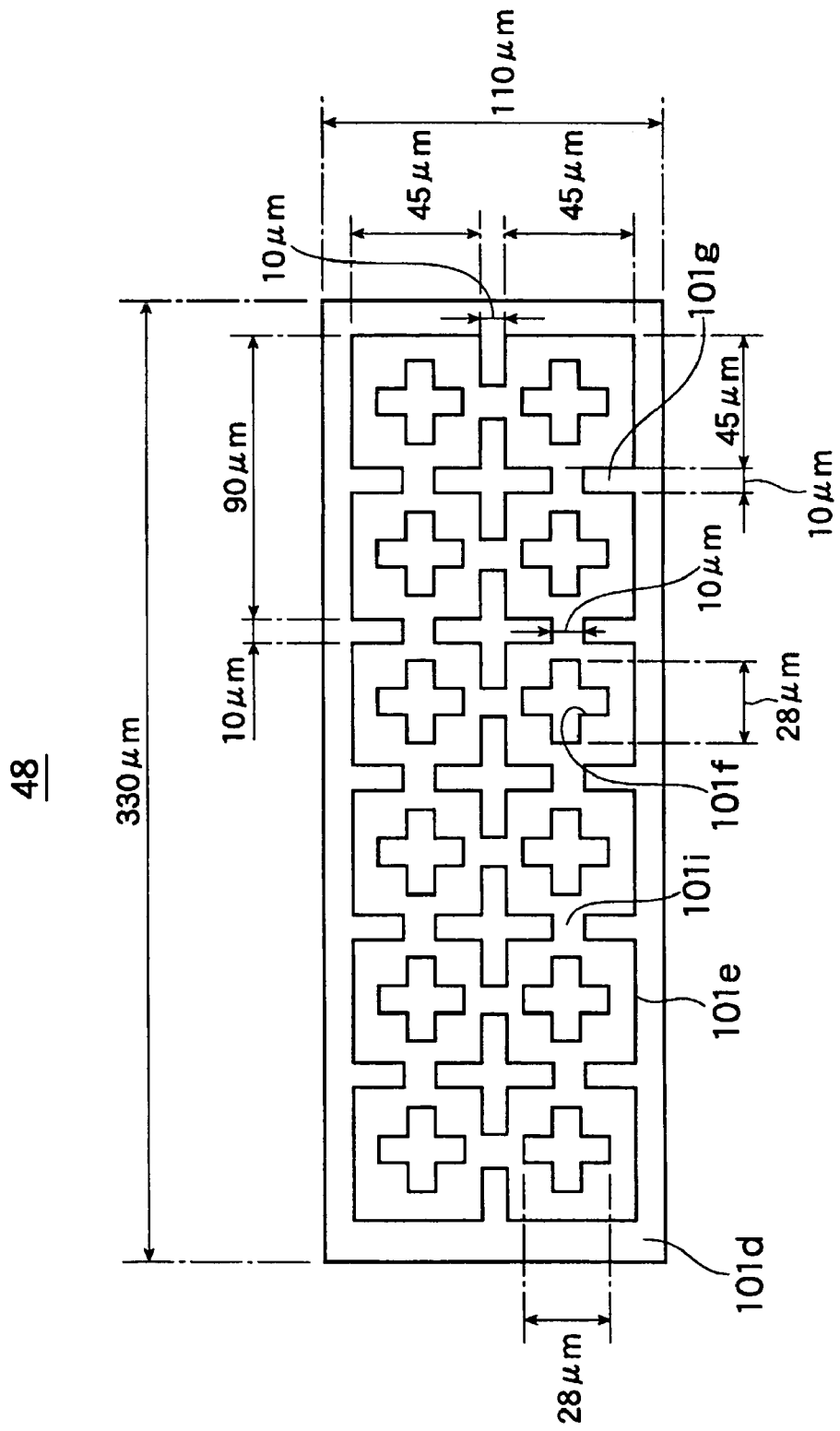

FIG. 52 shows an example of dimension of the slits in the vertically aligned liquid crystal cell illustrated in FIG. 48.

Figure 53:
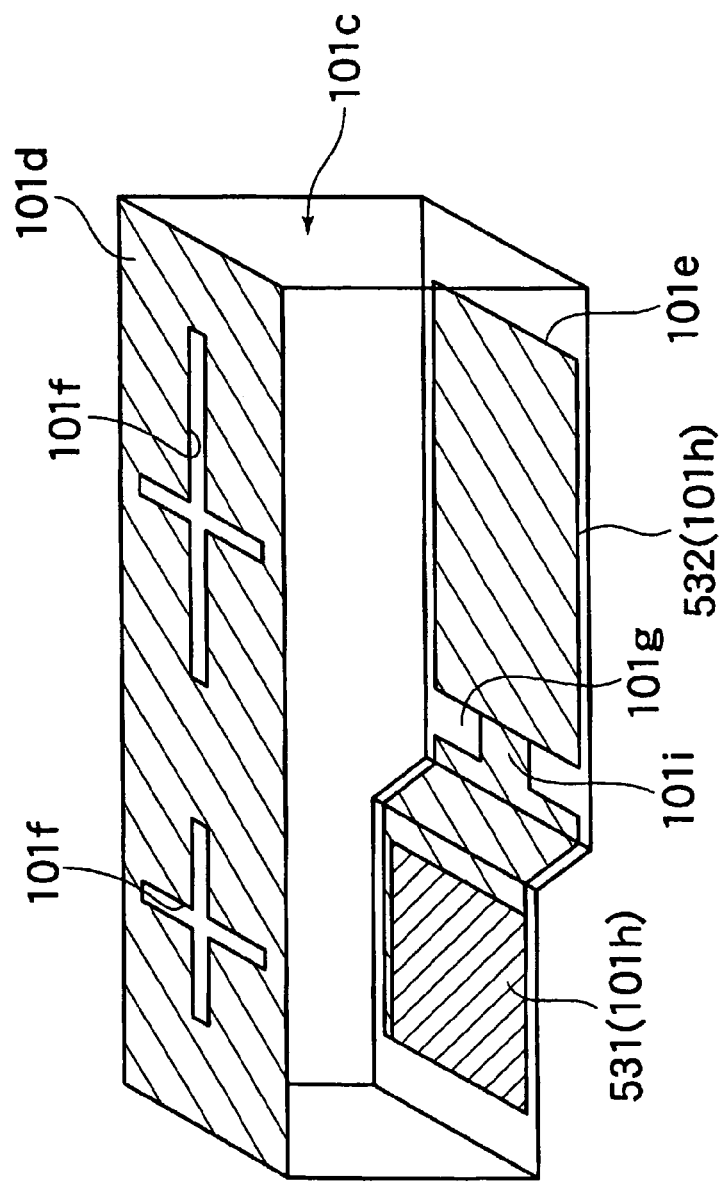

FIG. 53 is a perspective view of vertically aligned liquid crystal cell in the liquid crystal display device in accordance with the third embodiment of the present invention.

Figure 54:
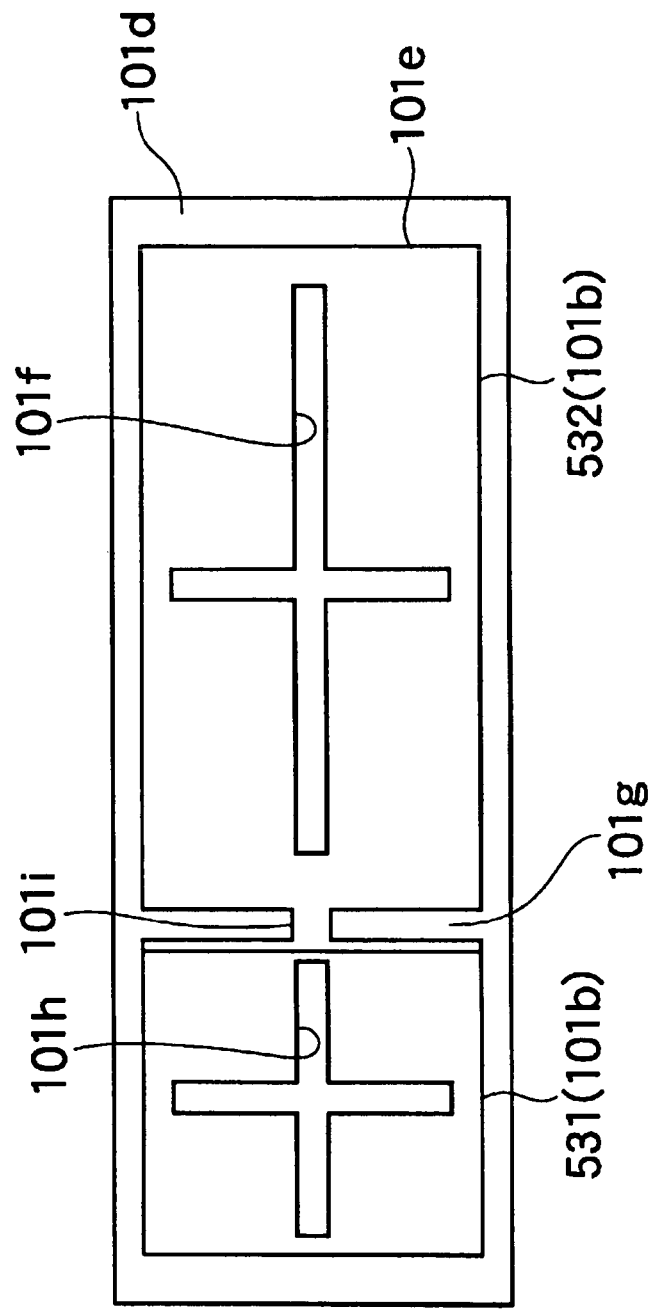

FIG. 54 is a plan view of the vertically aligned liquid crystal cell in FIG. 53.

Figure 55:
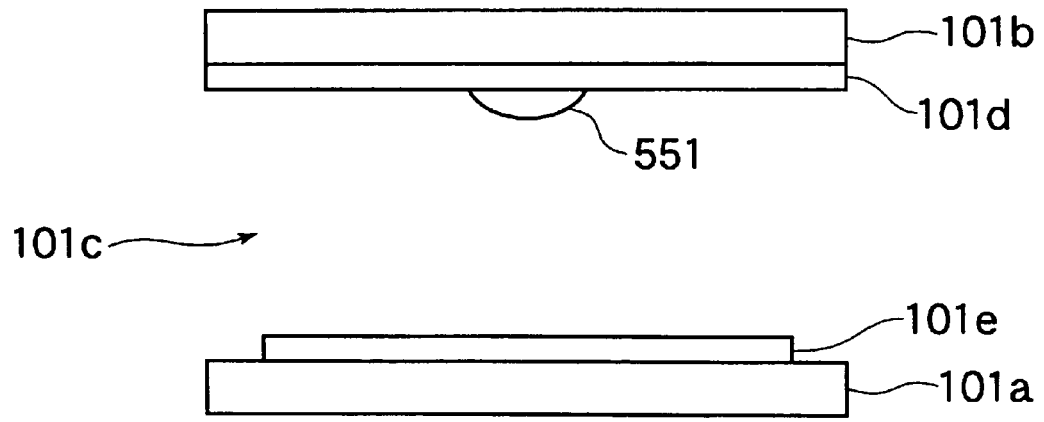

FIG. 55 is a cross-sectional view of vertically aligned liquid crystal cell in the liquid crystal display device in accordance with the fourth embodiment of the present invention.

Figure 56:
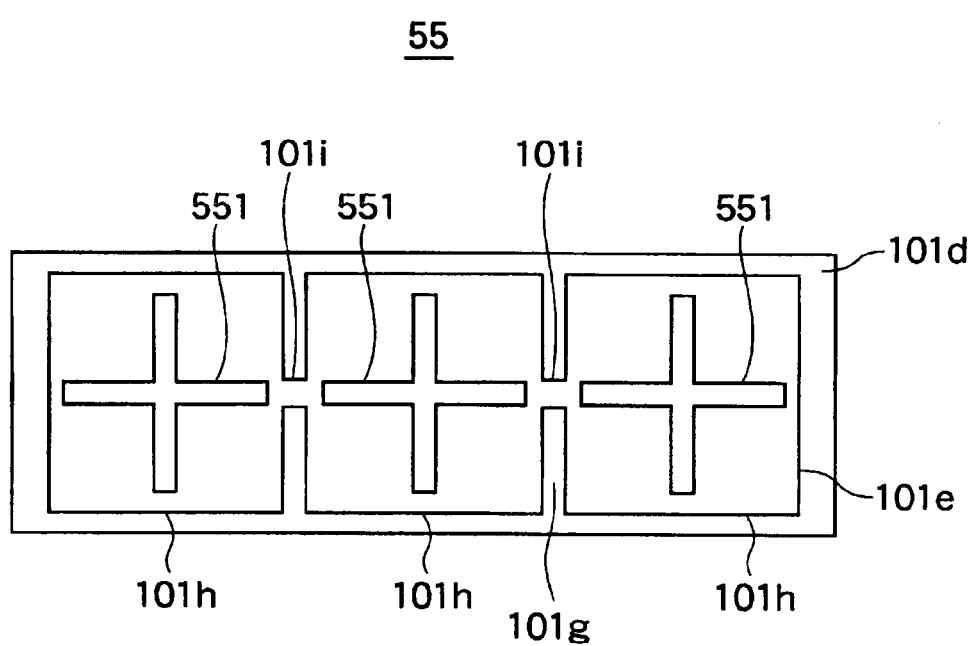

FIG. 56 is a plan view of the vertically aligned liquid crystal cell in FIG. 55.

Figure 57:
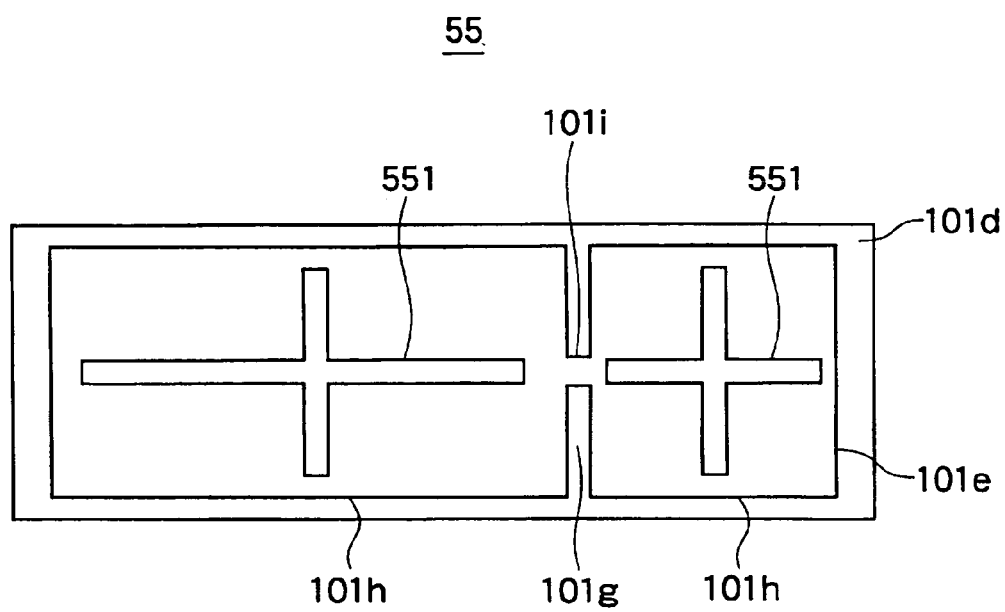

FIG. 57 is a plan view of another example of the vertically aligned liquid crystal cell in FIG. 55.

Figure 58:
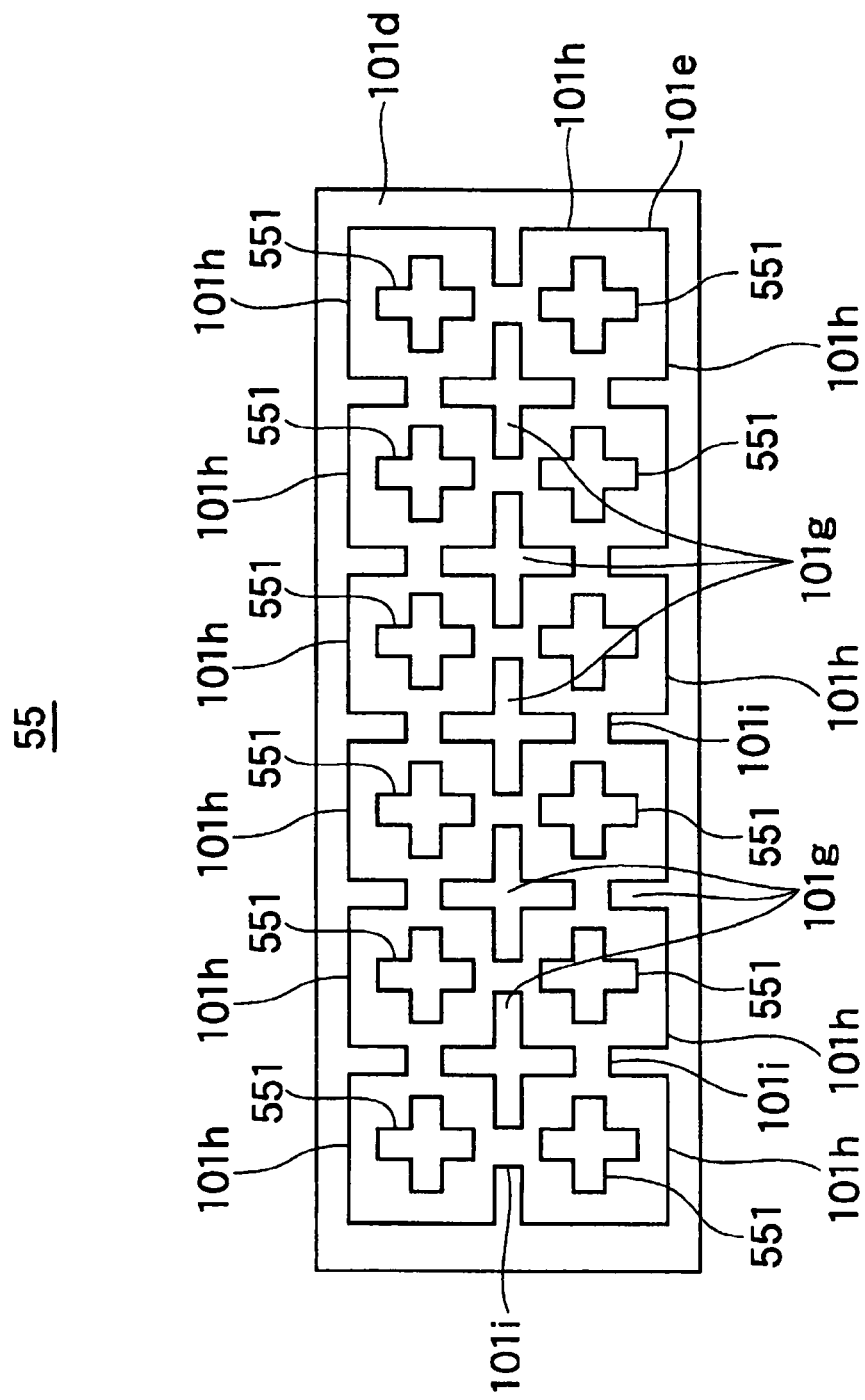

FIG. 58 is a plan view of still another example of the vertically aligned liquid crystal cell in FIG. 55.

DESCRIPTION OF THE PREFERRED EMBODIMENTS

Preferred embodiments in accordance with the present invention will be explained hereinbelow with reference to drawings.

First Embodiment

FIG. 20A is a front cross-sectional view illustrating a layered-structure of a liquid crystal display device 1 in accordance with the first embodiment of the present invention, and FIG. 20B is a broken perspective view of the liquid crystal display device 1.

As illustrated in FIG. 20A, the liquid crystal display device 1 is comprised of a liquid crystal cell 101 including vertically aligned liquid crystal, a first polarizer plate 102 arranged on one of surfaces of the liquid crystal cell 101, a second polarizer plate 103 arranged on the other surface of the liquid crystal cell 101, a first λ/4 plate 122 arranged between the liquid crystal cell 101 and the first polarizer plate 102, a second λ/4 plate 123 arranged between the liquid crystal cell 101 and the second polarizer plate 103, a first optical compensation layer 112 arranged between the liquid crystal cell 101 and the first λ/4 plate 122, and having negative uniaxial retardation, a second optical compensation layer 113 arranged between the liquid crystal cell 101 and the second λ/4 plate 123, and having negative uniaxial retardation, a first polarizer-support 132 arranged between the first polarizer plate 102 and the first λ/4 plate 122, and a second polarizer-support 133 arranged between the second polarizer plate 103 and the second λ/4 plate 123.

First, the liquid crystal cell 101 is explained hereinbelow.

Figure 22:
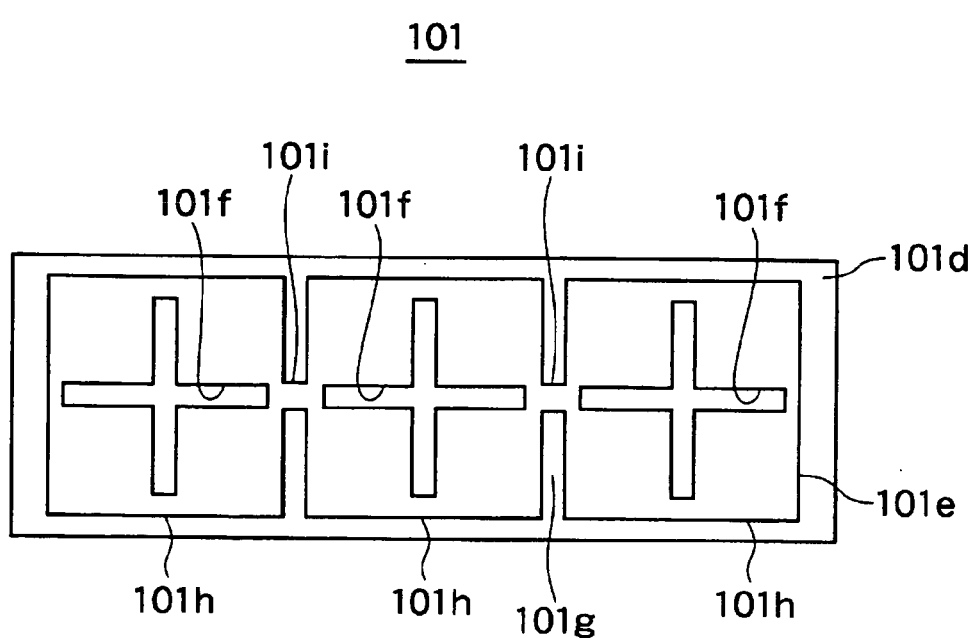
FIG. 22 is a plan view of the vertically aligned liquid crystal in the liquid crystal display device in accordance with the first embodiment.
Figure 23:
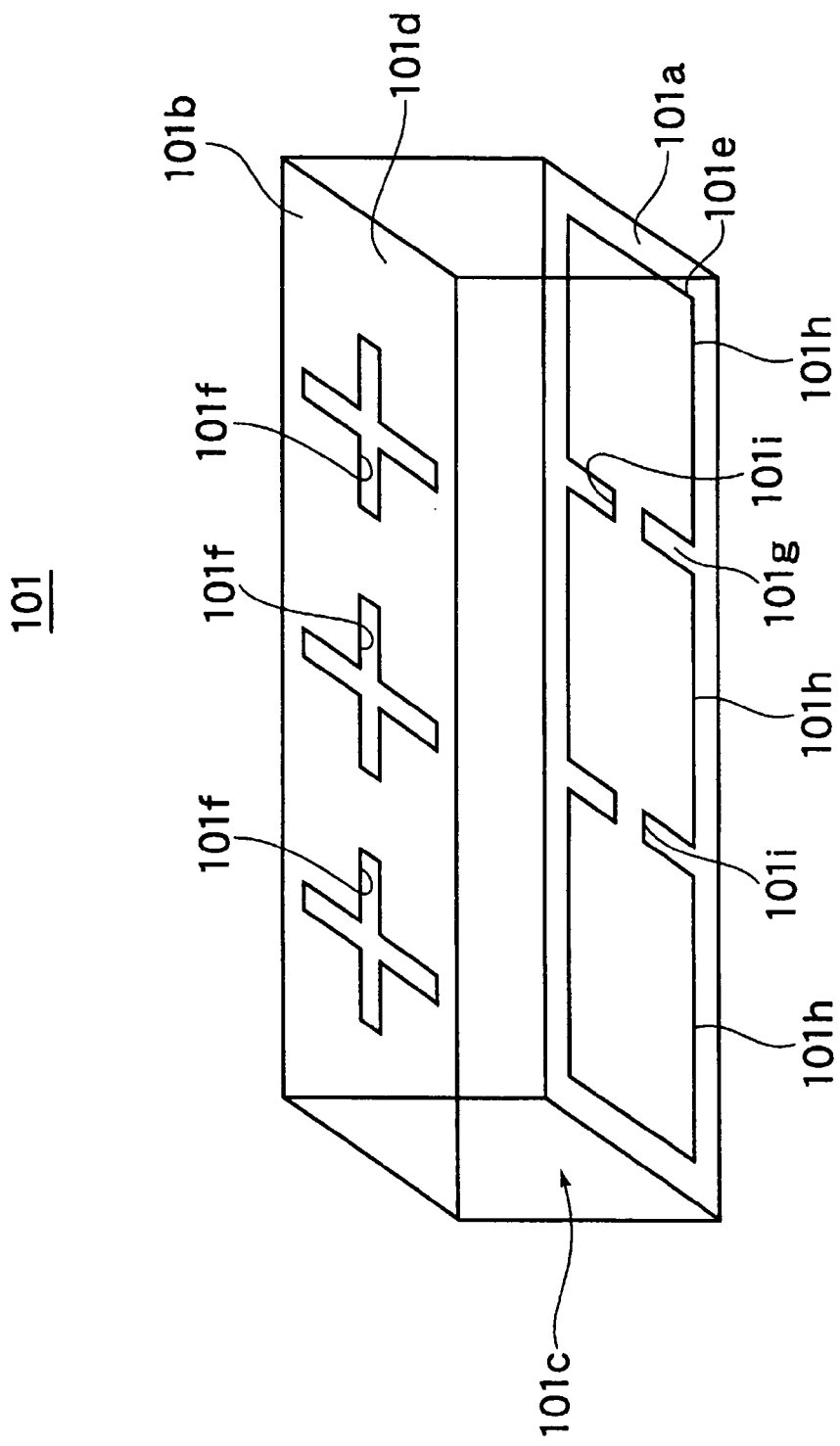
FIG. 23 is a perspective view of the vertically aligned liquid crystal in the liquid crystal display device in accordance with the first embodiment.

FIG. 21 is a front cross-sectional view of the liquid crystal cell 101, FIG. 22 is a plan view of the liquid crystal cell 101, and FIG. 23 is a perspective view of the liquid crystal cell 101. In FIGS. 21 to 23, parts such as a thin film transistor (TFT) or various electrodes are omitted for simplification.

As illustrated in FIG. 21, the liquid crystal cell 101 is comprised of a first substrate 101a, a second substrate 101b facing the first substrate 101a, and a liquid crystal layer 101c sandwiched between the first and second substrates 101a and 101b.

The first substrate 101a is formed at a surface thereof facing the liquid crystal layer 101c with a pixel electrode 101e. The second substrate 101b is formed at a surface thereof facing the liquid crystal layer 101c with a common electrode 101d. The pixel and common electrodes 101e and 101d in the first embodiment are formed as transparent electrodes. This means that a light (for instance, a light emitted from a back-light source) passes through the liquid crystal cell 101.

The first substrate 101a may be designed to have a switching device such as TFT, and a wiring electrode, if necessary. The second substrate 101b may be designed to have a color filter layer and an over-coat layer.

As illustrated in FIGS. 21 and 23, the pixel electrode 101e is formed with slits 101g defining an area in which a pixel electrode does not exist. As a result of formation of the slits 101g, the pixel electrode 101e is comprised of a plurality of (for instance, three) rectangles 101h, and connectors 101i each connecting the rectangles 101h disposed adjacent to each other, to each other.

The common electrode 101d is formed with slits 101f defining an area in which a common electrode does not exist. As illustrated in FIGS. 22 and 23, the slits 101f are cross-shaped. Each of the slits 101f is disposed in alignment with each of the rectangles 101h of the pixel electrode 101e in a direction of a normal line of the first substrate 101a.

Figure 24:
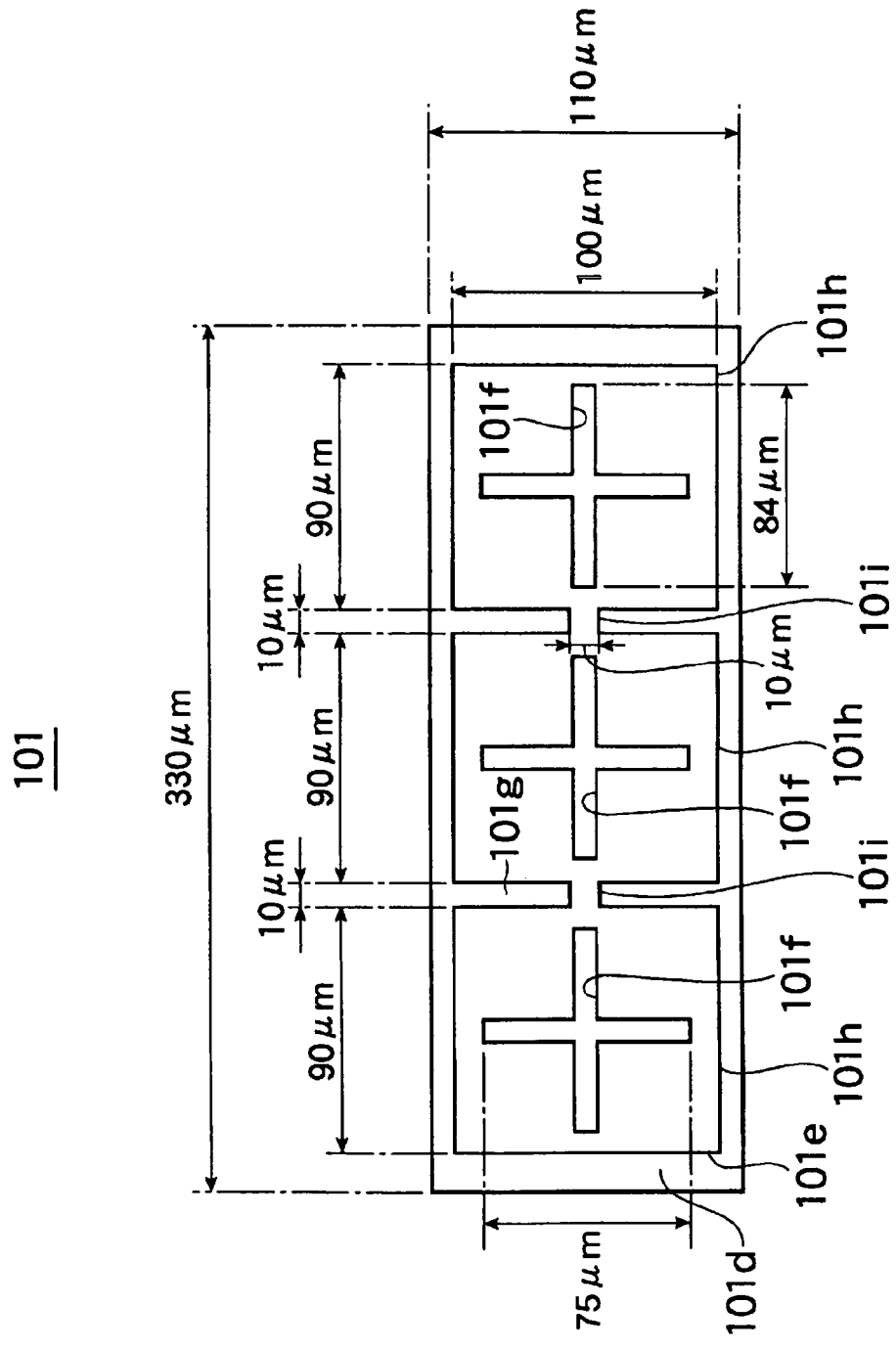
FIG. 24 shows an example of dimension of the slits.

FIG. 24 shows an example of dimension of the slits 101f and 101g.

With reference to FIG. 24, a unit device has a dimension of 110 micrometers×330 micrometers, and the rectangle 101h has a dimension of 90 micrometers×100 micrometers. The slit 101g of the pixel electrode 101e has a width defined as a space between adjacent rectangles 101h, of 10 micrometers. The cross-shaped slit 101f of the common electrode 101d has a dimension of 84 micrometers×75 micrometers, and a width of 10 micrometers.

On the surfaces of the pixel electrode 101e and the common electrode 101d facing the liquid crystal layer 101c are formed alignment films (not illustrated), and the liquid crystal layer 101c is sandwiched between the alignment films.

The liquid crystal layer 101c is filled with liquid crystal molecules having negative dielectric anisotropy.

In the first embodiment, liquid crystal contained in the liquid crystal layer 110c has a birefringence rate (Δn) of 0.0741, and a cell gap D (that is, a thickness of the liquid crystal layer 101c) of 4.5 micrometers. Accordingly, the liquid crystal layer 101c has retardation of 333 nanometers (Δn×D) in a thickness-wise direction thereof. It is preferable that the liquid crystal layer 101c has retardation of 333±20 nanometers in a thickness-wise direction thereof, and it is more preferable that the liquid crystal layer 101c has retardation of 333±15 nanometers in a thickness-wise direction thereof.

Liquid crystal in the liquid crystal cell 101 is aligned almost perpendicularly to the first substrate 101a when no voltage is applied thereto. When a voltage is applied to the liquid crystal, an oblique electric field is generated at ends of the pixel electrode 101e or the slits 101g, and resultingly, the liquid crystal molecules are aligned obliquely to the first substrate 101a.

Figure 25:
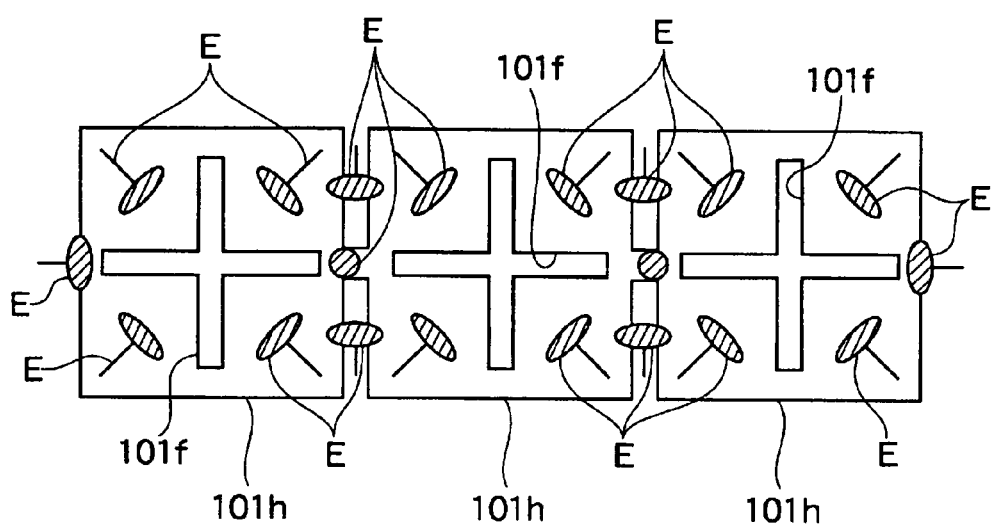
FIG. 25 is a plan view of the vertically aligned liquid crystal to which a voltage is applied.

Specifically, as illustrated in FIG. 25, liquid crystal molecules E existing in the vicinity of a center in the liquid crystal layer 101c in a thickness-wise direction thereof are aligned, when a voltage is applied thereto, in four directions in directions defined by azimuth angles of 45, 135, 225 and 315 degrees because of the oblique electric field and continuity of alignment of liquid crystal molecules. Specifically, liquid crystal molecules existing in a direction defined by an azimuth angle of 45 degrees are inclined in a direction defined by an azimuth angle of 225 degrees, liquid crystal molecules existing in a direction defined by an azimuth angle of 135 degrees are inclined in a direction defined by an azimuth angle of 315 degrees, liquid crystal molecules existing in a direction defined by an azimuth angle of 225 degrees are inclined in a direction defined by an azimuth angle of 45 degrees, and liquid crystal molecules existing in a direction defined by an azimuth angle of 315 degrees are inclined in a direction defined by an azimuth angle of 135 degrees.

The liquid crystal layer 101c is filled with liquid crystal having negative dielectric anisotropy, and is vertically aligned when no voltage is applied thereto, whereas aligned in different four directions when a voltage is applied thereto.

As is obvious in FIG. 25, the cross-shaped slit 101f of the common electrode 101d, that is, an area in which the common electrode 101d does not exist is a boundary about which liquid crystal is aligned in different directions. Thus, four domains are formed between each of the rectangles 101h of the pixel electrode 101e and the common electrode 101d. The slit 101f defines a boundary or a symmetry axis about which liquid crystal is aligned in different directions in the liquid crystal layer 101c.

The liquid crystal cell 101 has such a structure as mentioned above.

Hereinbelow other parts constituting the liquid crystal display device 1 are explained.

Each of the first and second λ/4 plates 122 and 123 is comprised of a retardation plate having retardation of about λ/4.

As illustrated in FIG. 20B, the first λ/4 plate 122 has a lagging axis 122a extending in parallel with the first or second substrate 101a or 110b, and similarly, the second λ/4 plate 123 has a lagging axis 123a extending in parallel with the first or second substrate 101a or 110b.

Furthermore, the first and second λ/4 plates 122 and 123 are positioned such that the lagging axes 122a and 123a of them are perpendicular to each other.

Again, the first and second λ/4 plates 122 and 123 have the lagging axes 122a or 123a in parallel with the first substrate 110a and perpendicular to each other, and have retardation of about λ/4.

The first polarizer plate 102 has an absorption axis 102a inclining by 45 degrees relative to the lagging axis 122a of the first λ/4 plate 122, and the second polarizer plate 103 has an absorption axis 103a inclining by 45 degrees relative to the lagging axis 123a of the second λ/4 plate 123. In addition, the absorption axis 102a of the first polarizer plate 102 and the absorption axis 103a of the second polarizer plate 103 are perpendicular to each other, and thus, the first and second polarizer plates 102 and 103 define perpendicular polarizer plates.

The first polarizer-plate 132 supports a polarizing layer (not illustrated) of the first polarizer plate 102, and similarly, the second polarizer-plate 133 supports a polarizing layer (not illustrated) of the second polarizer plate 103.

For instance, the first and second polarizer-supports 132 and 133 are composed of TAC (triacethyl cellulose).

The liquid crystal display device 1 in accordance with the first embodiment has such a structure as mentioned above.

The inventors tested viewing angle characteristic in six liquid crystal display devices each of which had the same structure as that of the liquid crystal display device 1 in accordance with the first embodiment except that the first and second polarizer-supports 132 and 133 had retardation of 25 nanometers in a thickness-wise direction thereof, and in which the first and second optical compensation layers 112 and 113 had retardation of 25, 50, 75, 100, 125 and 150 nanometers, respectively, in a thickness-wise direction thereof (a sum of retardations of the first and second optical compensation layers 112 and 113 is 50, 100, 150, 200, 250 and 300 nanometers, respectively). Hereinbelow are explained the results of the test.

Figure 13C:
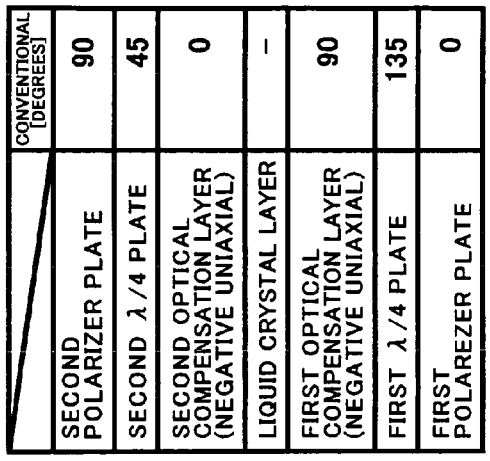
FIG. 13C shows a direction in which parts constituting the liquid crystal display device illustrated in FIGS. 13A and 13B are arranged.
Figure 13B:
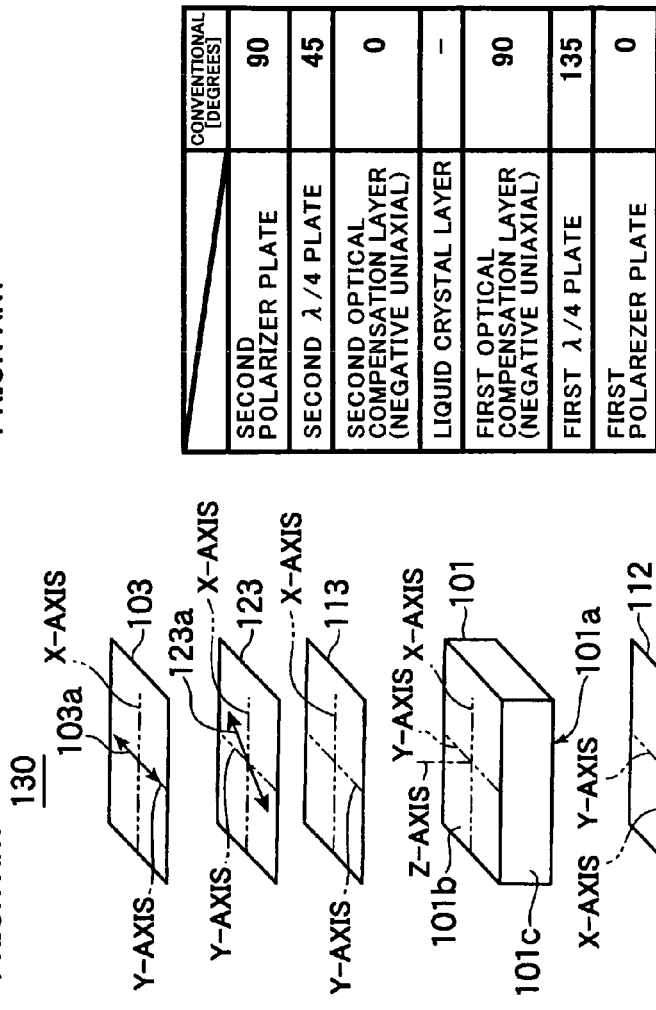
FIG. 13B is a broken perspective view of the liquid crystal display device illustrated in FIG. 13A.
Figure 13A:
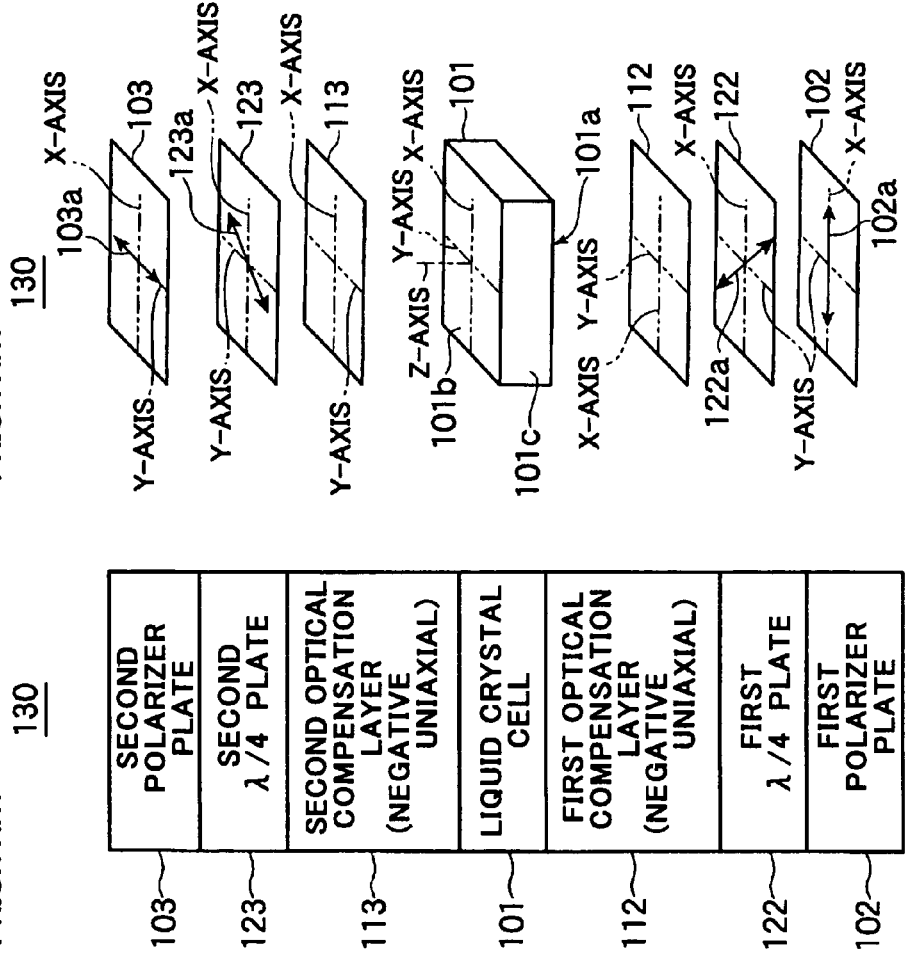
FIG. 13A is a front cross-sectional view illustrating a layered-structure of a liquid crystal display device including a liquid crystal cell containing vertically aligned cell, a λ/4 plate, and a negative uniaxial optical compensation layer, as a reference example to be compared with the liquid crystal display device in accordance with the present invention.
Figure 26:
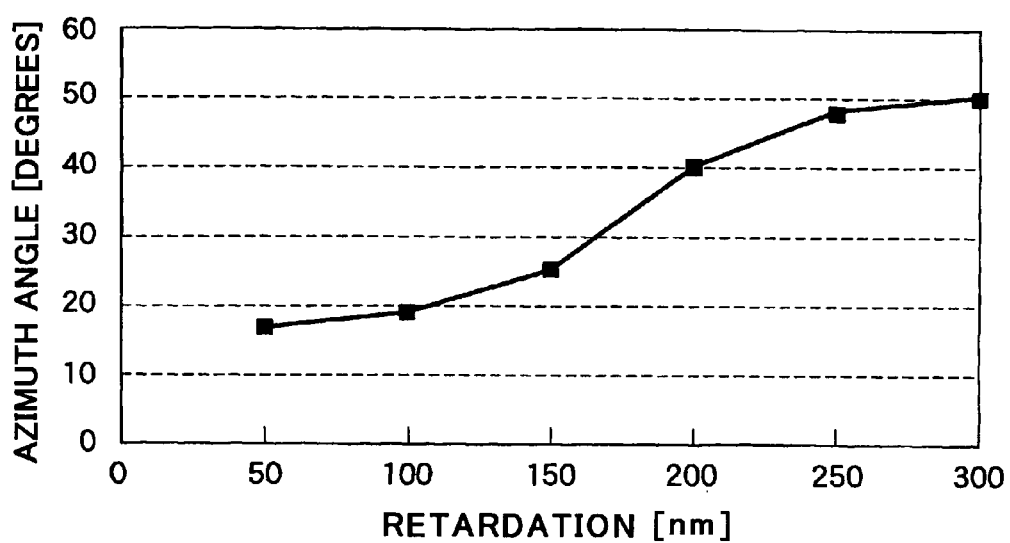
FIG. 26 is a graph having the axis of abscissa indicating a sum of retardations of the first and second optical compensation layers, and the axis of ordinates indicating a direction or an azimuth angle in which the transmissivity of a liquid crystal display device displaying darkness (black) is in maximum in a liquid crystal display device which has the same structure as that of the liquid crystal display device illustrated in FIGS. 1A and 1B, but in which the first and second polarizer plates, the first and second λ/4 plates, and the first and second optical compensation layers are arranged in the conventional arrangement angles (see FIG. 13C) (the retardation of the polarizer-supports is 25 nanometers).

FIG. 26 is a graph having the axis of abscissa indicating a sum of retardations of the first and second optical compensation layers 112 and 113, and the axis of ordinates indicating a direction or an azimuth angle in which the transmissivity of a liquid crystal display device displaying darkness (black) is in maximum in a liquid crystal display device which has the same structure as that of the liquid crystal display device 1, but in which the first and second polarizer plates 102 and 103, the first and second λ/4 plates 122 and 123, and the first and second optical compensation layers 112 and 113 are arranged in the conventional arrangement angles (see FIG. 13C).

Figure 14:
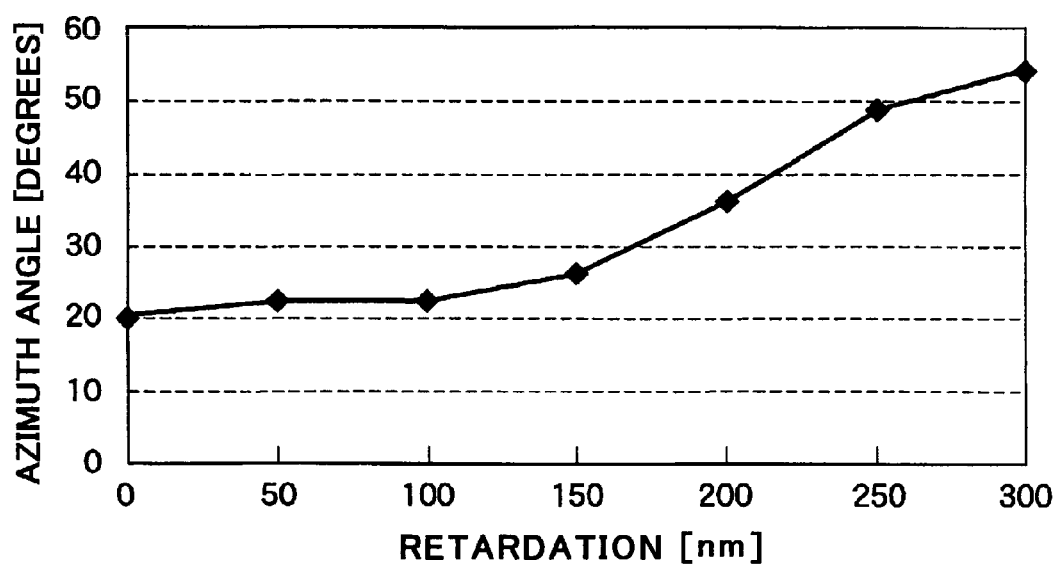
FIG. 14 is a graph in which the axis of abscissa indicates a sum of retardation of the optical compensation layers, and the axis of ordinates indicates an azimuth angle or a direction in which the transmissivity of the liquid crystal display device displaying darkness (black) is in maximum, in the liquid crystal display device illustrated in FIGS. 13A and 13B.
Figure 16:
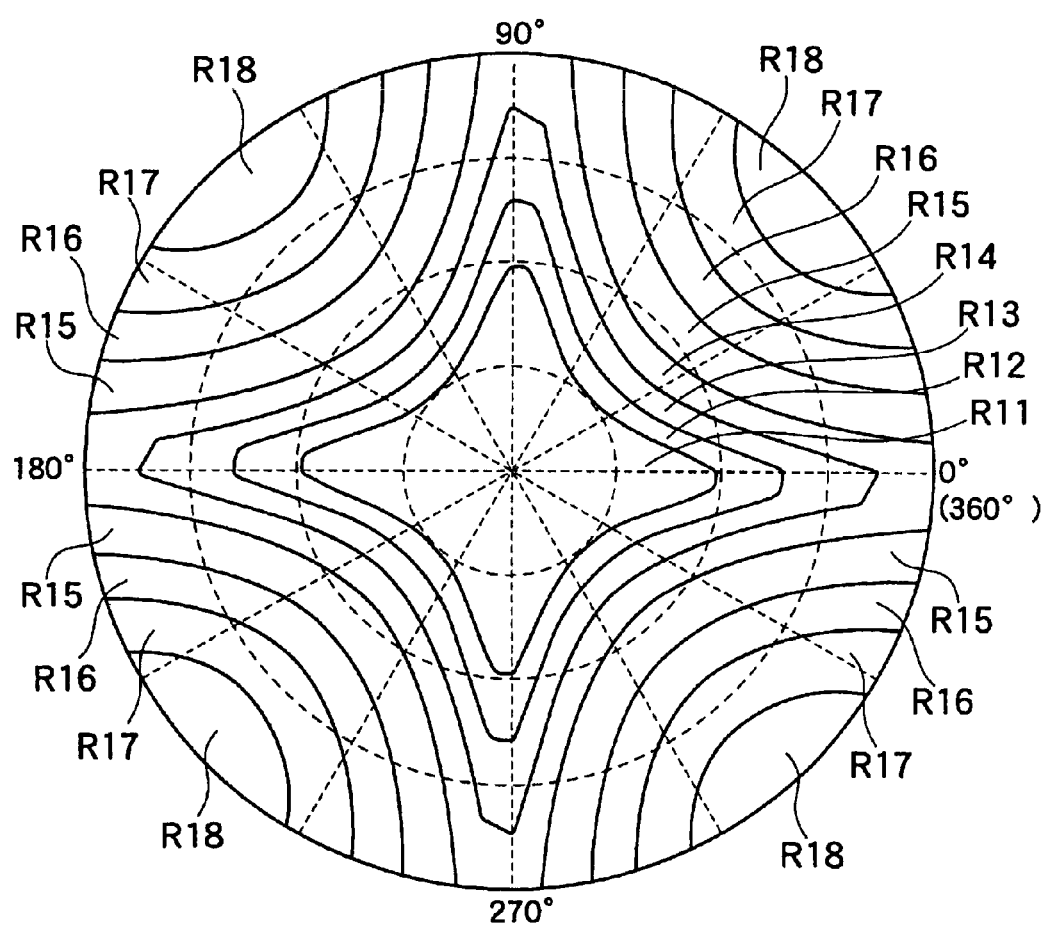
FIG. 16 shows an equi-contrast curve where the negative uniaxial optical compensation layers have retardation of 75 nanometers in a thickness-wise direction thereof (a sum of the retardation is 150 nanometers) under the conditions indicated in FIG. 15.
Figure 17:
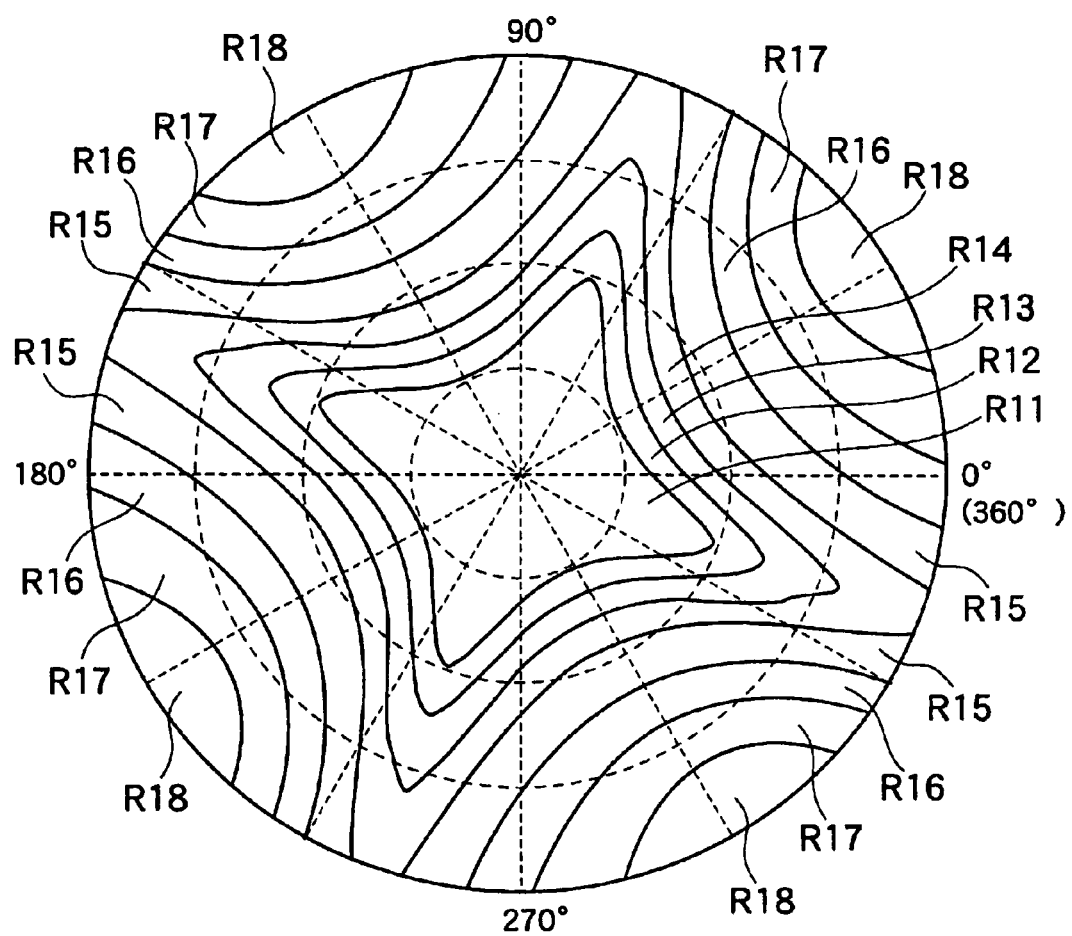
FIG. 17 shows an equi-contrast curve of a reference example of FIG. 16.
Figure 18:
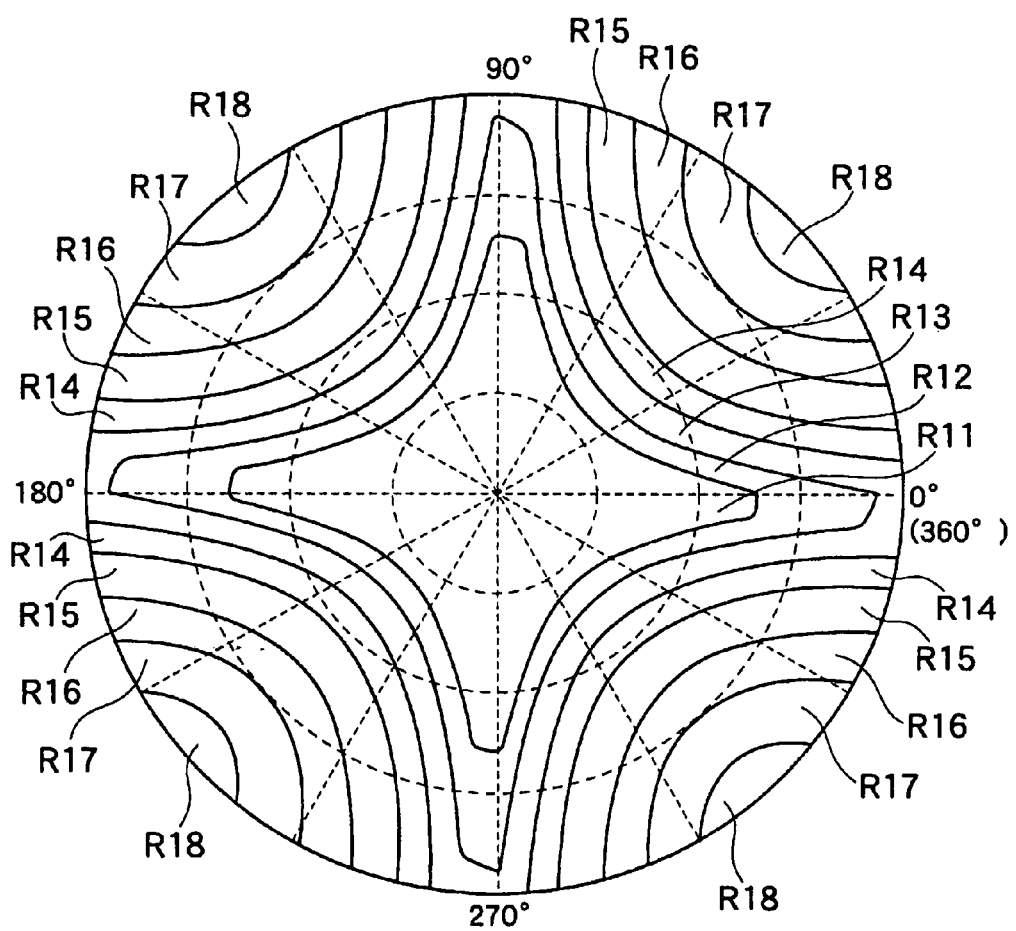
FIG. 18 shows an equi-contrast curve where the negative uniaxial optical compensation layers have retardation of 100 nanometers in a thickness-wise direction thereof (a sum of the retardation is 200 nanometers) under the conditions indicated in FIG. 15.
Figure 19:
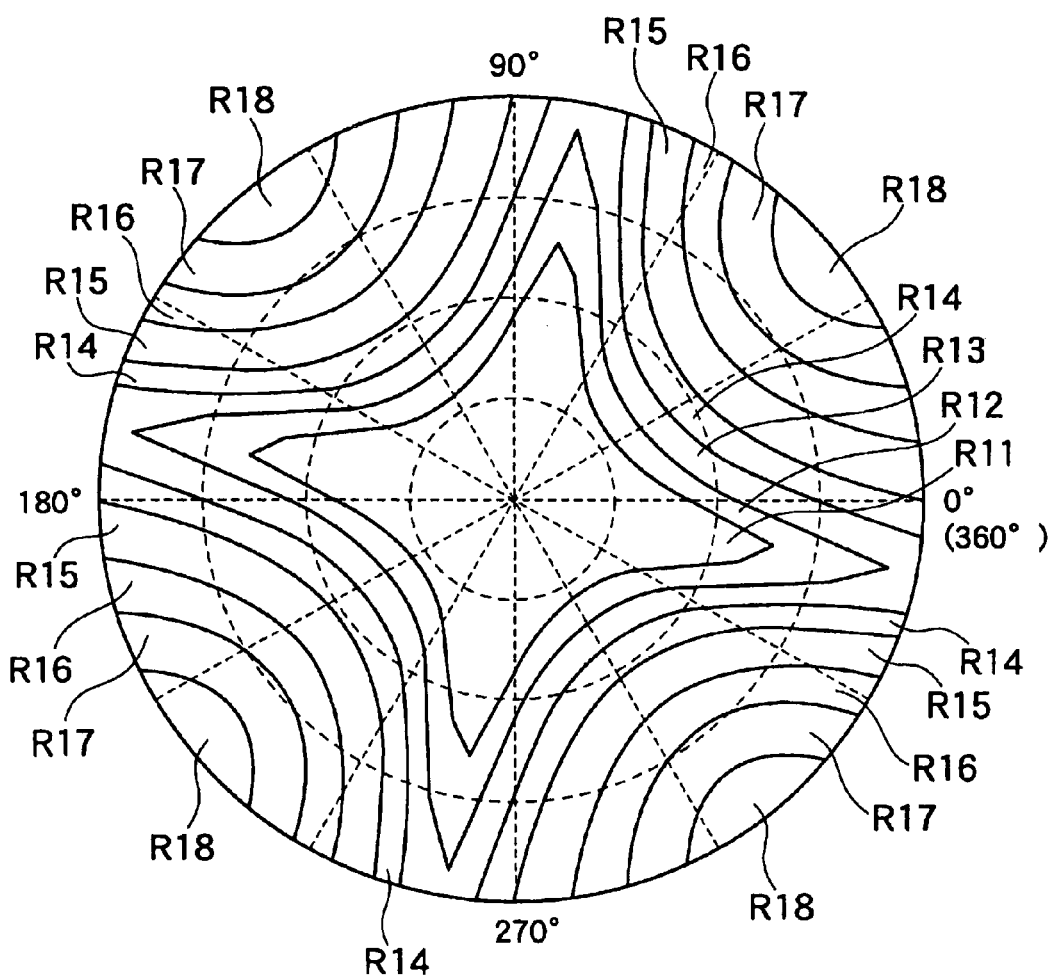
FIG. 19 shows an equi-contrast curve of a reference example of FIG. 18.

With reference to FIG. 26, similarly to FIG. 14, it is understood that a direction in which the transmissivity of a liquid crystal display device displaying darkness (black) is in maximum is deviated from an azimuth angle of 45 degrees, and that, the deviation in angle is dependent on the retardation of the first and second optical compensation layers 112 and 113.

However, the deviation in angle in FIG. 26 is slightly different from the same in FIG. 14 due to the retardation of the first and second polarizer-supports 132 and 133 composed of TAC.

Considering the deviation in angle, the inventors determined the arrangement angles of the first and second polarizer plates 102 and 103, the first and second λ/4 plates 122 and 123 and the first and second optical compensation layers 112 and 113, and the retardation of the first and second optical compensation layers 112 and 113 in a thickness-wise direction thereof, as shown in FIG. 27, in order to cancel the deviation in angle. The inventors tested viewing angle characteristic of a liquid crystal display device including the liquid crystal cell 101 together with the above-mentioned parts 102, 103, 122, 123, 112 and 113.

Specifically, in the tested liquid crystal display device, the absorption axes 102a and 103a of the first and second polarizer plates 102 and 103 were deviated from a symmetry axis about which liquid crystal is aligned in different directions in the liquid crystal layer 10c, and the arrangement angles of the first and second λ/4 plates 122 and 123 and the first and second optical compensation layers 112 and 113 are shifted accordingly.

FIG. 27 shows the azimuth angles determined in the same way as in FIG. 15.

By selecting the azimuth angles shown in FIG. 27, a high-contrast area was narrow in directions defined by azimuth angles of 45, 135, 225 and 315 degrees, and there was obtained viewing angle characteristic symmetric about x- and y-axes, as explained in detail later.

FIG. 28 shows an equi-contrast curve wherein each of the first and second optical compensation layers 112 and 113 has retardation of 75 nanometers in a thickness-wise direction thereof (a sum of retardation is 150 nanometers). The arrangement angles of the first polarizer plate 102, the first λ/4 plate 122, the first optical compensation layer 112, the second optical compensation layer 113, the second λ/4 plate 123, and the second polarizer plate 103 are 20, 155, 110, 20, 65 and 110 degrees, respectively, as shown in FIG. 27. Specifically, the first and second polarizer-supports 132 and 133 have retardation of 25 nanometers in a thickness-wise direction thereof, the first and second optical compensation layers 112 and 113 have retardation of 75 nanometers in a thickness-wise direction thereof, the absorption axis 102a of the first polarizer plate 102 is deviated in angle from an x-axis (a symmetry axis about which liquid crystal is aligned in different directions) by 20 degrees, and the absorption axis 103a of the second polarizer plate 103 is deviated in angle from a y-axis (a symmetry axis about which liquid crystal is aligned in different directions) by 20 degrees.

Figure 6:
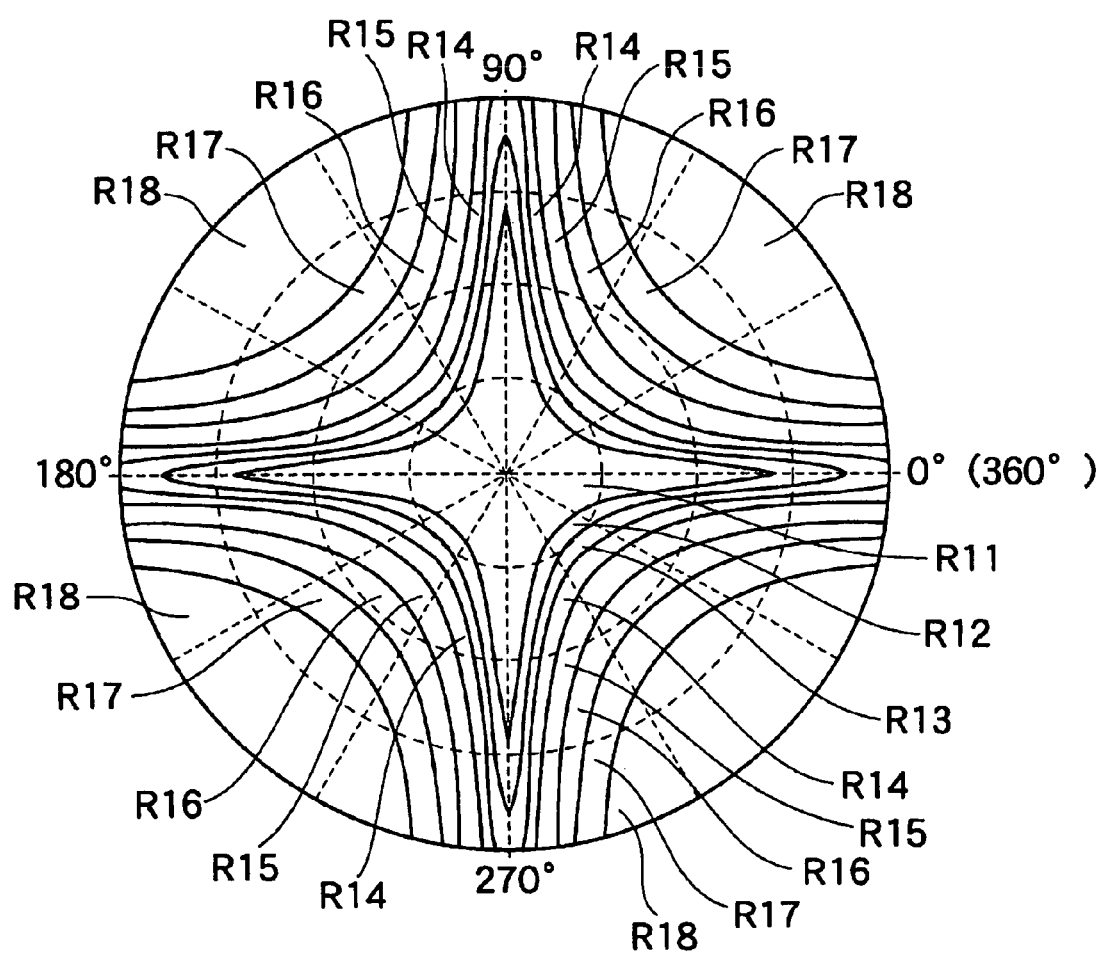
FIG. 6 shows an equi-contrast curve in the liquid crystal display device illustrated in FIGS. 1A and 1B.
Figure 7B:
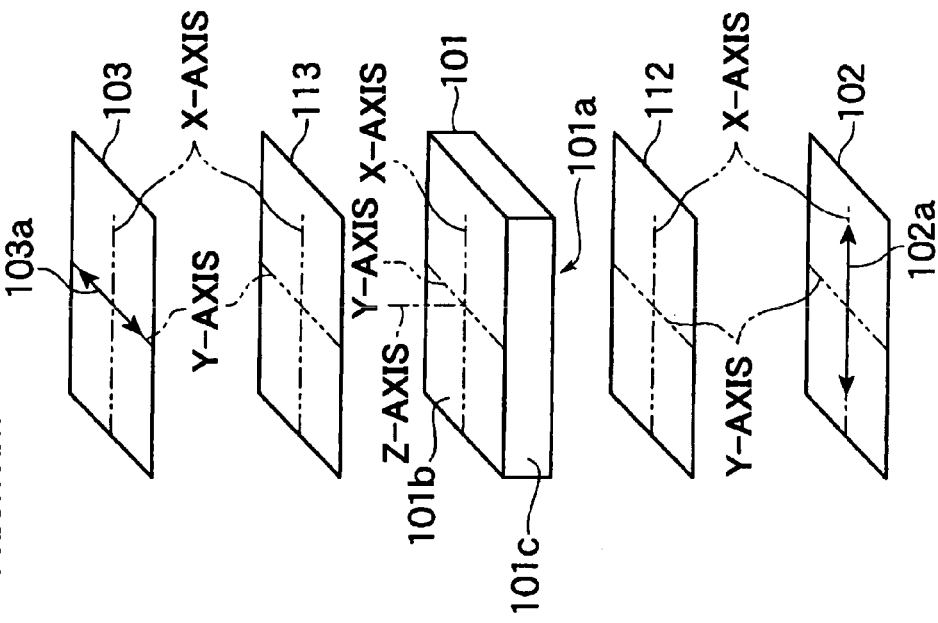
FIG. 7B is a broken perspective view of the liquid crystal display device illustrated in FIG. 7A.
Figure 7A:
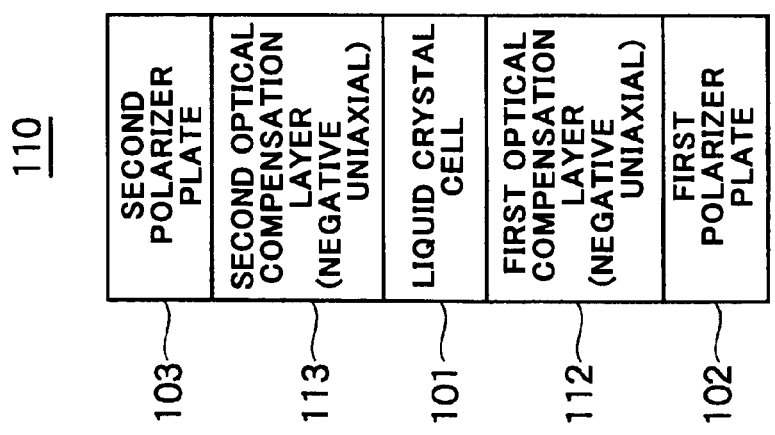
FIG. 7A is a front cross-sectional view illustrating a layered-structure of a liquid crystal display device additionally including an optical compensation layer having negative uniaxial retardation, in comparison with the liquid crystal display device illustrated in FIGS. 1A and 1B, as a reference example to be compared with the liquid crystal display device in accordance with the present invention.
Figure 8:
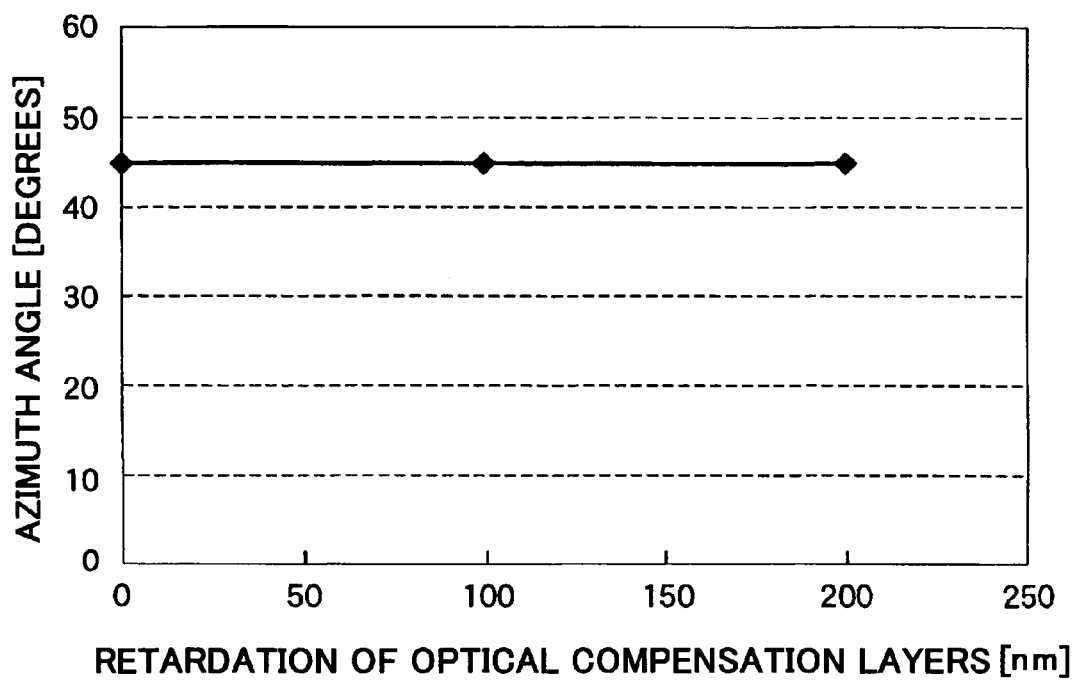
FIG. 8 is a graph in which the axis of abscissa indicates a sum of retardation in the optical compensation layers, and the axis of ordinates indicates an azimuth angle or a direction in which the transmissivity of the liquid crystal display device displaying darkness (black) is in maximum, in the liquid crystal display device illustrated in FIGS. 7A and 7B.
Figure 9B:
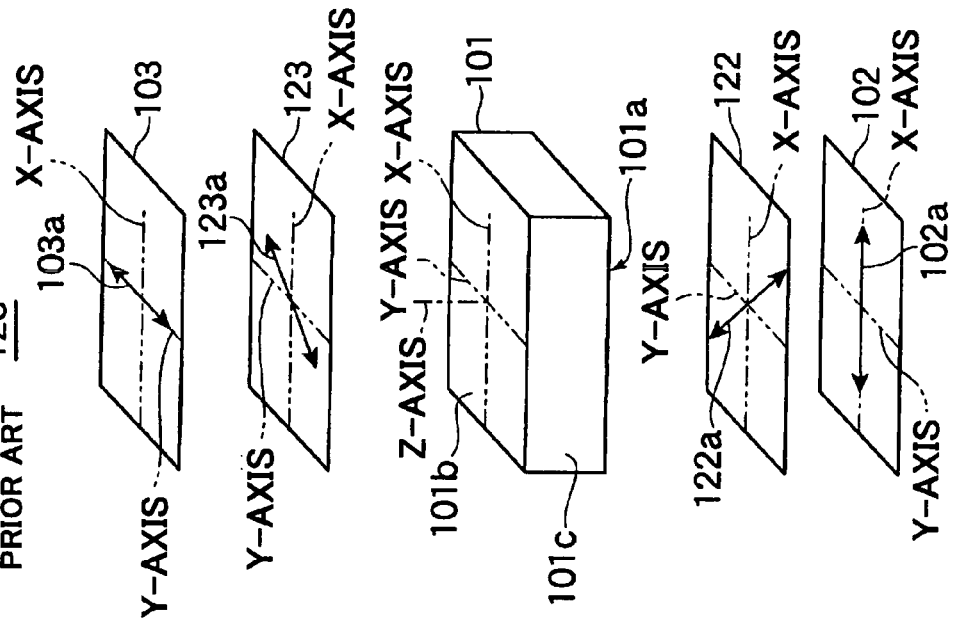
FIG. 9B is a broken perspective view of the liquid crystal display device illustrated in FIG. 9A.
Figure 9A:
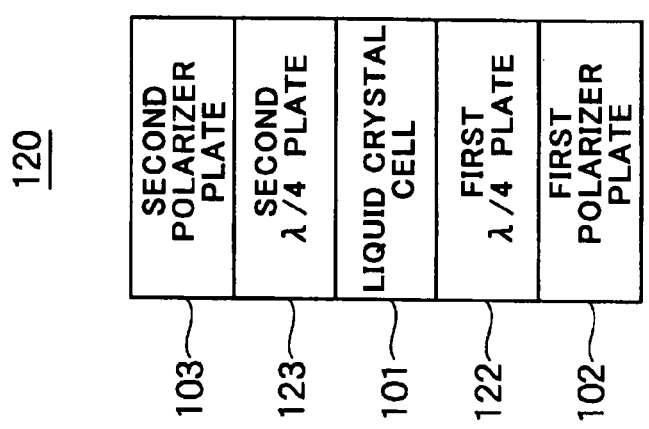
FIG. 9A is a front cross-sectional view illustrating a layered-structure of a liquid crystal display device including a liquid crystal cell containing vertically aligned cell, and a λ/4 plate, as a reference example to be compared with the liquid crystal display device in accordance with the present invention.
Figure 10:
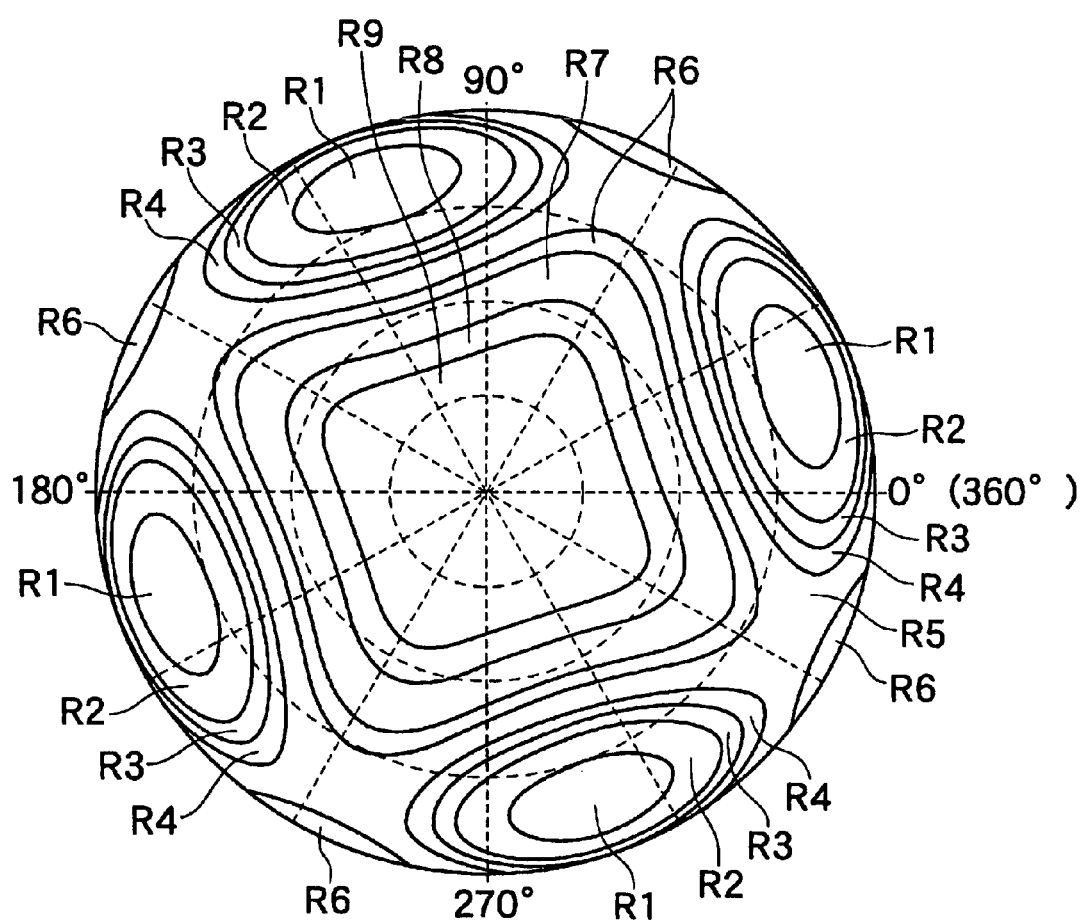
FIG. 10 shows a profile of transmissivity of the liquid crystal display device illustrated in FIGS. 9A and 9B, obtained when no voltage is applied thereto (when darkness (black) is displayed).
Figure 11:
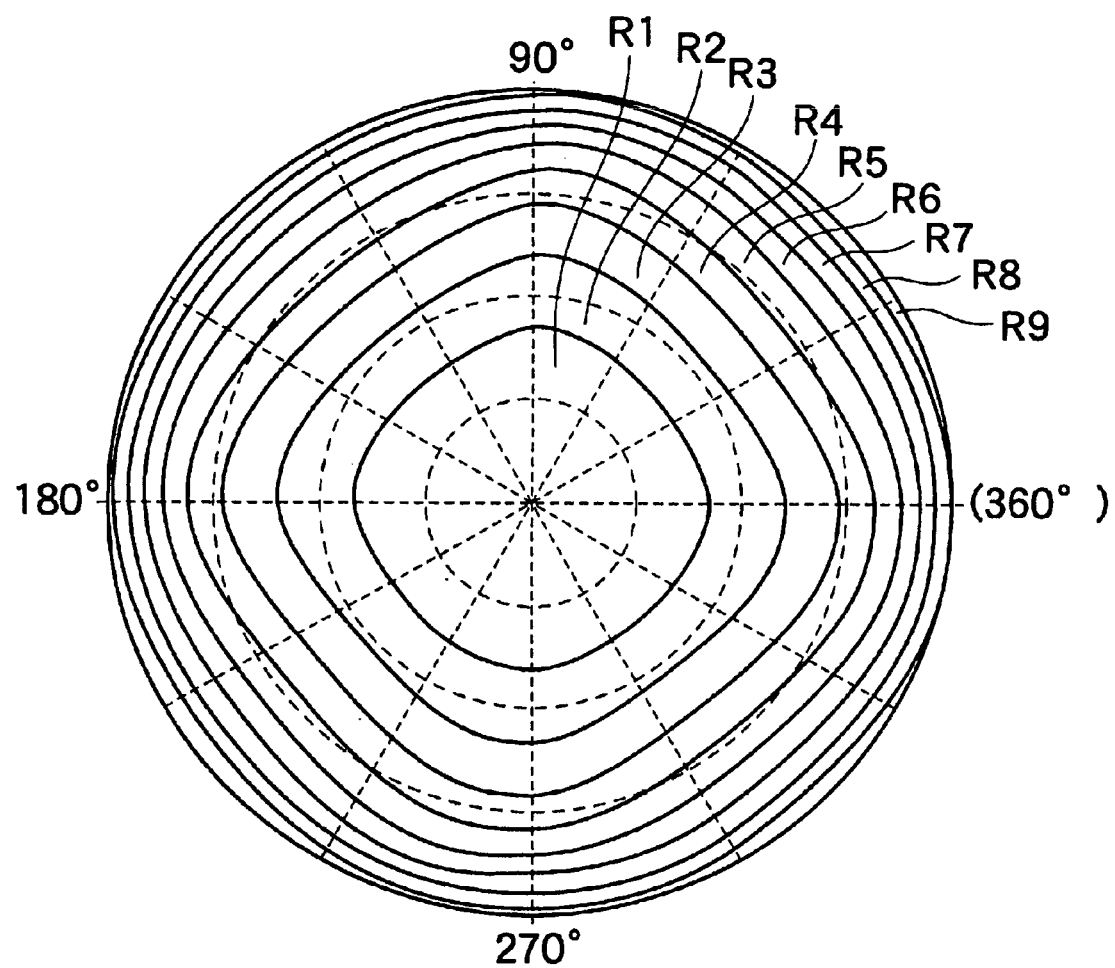
FIG. 11 shows a profile of transmissivity of the liquid crystal display device illustrated in FIGS. 9A and 9B, obtained when a voltage is applied thereto (when illumination (white) is displayed).
Figure 12:
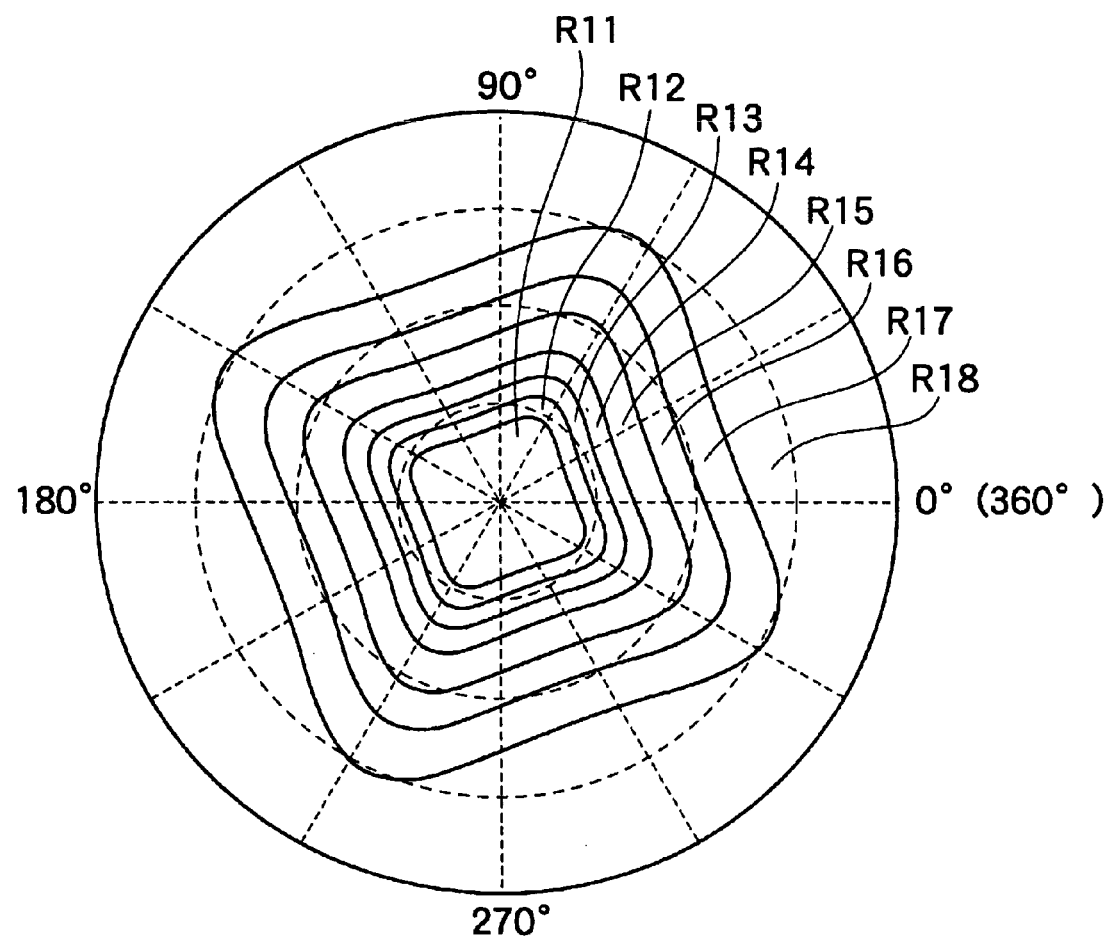
FIG. 12 shows an equi-contrast curve in the liquid crystal display device illustrated in FIGS. 9A and 9B.

The areas R11 to R18 in FIGS. 28 to 31 indicate the same shown in FIG. 6, and a boundary between the areas R16 and R17 indicates an equi-contrast curve where contrast is equal to ten.

As shown in FIG. 28, there was obtained the symmetric viewing angle characteristic by selecting the azimuth angles shown in FIG. 27, when the first and second optical compensation layers 112 and 113 had retardation of 75 nanometers in a thickness-wise direction thereof (a sum of the retardations was 150 nanometers). Furthermore, a range of polar angles where contrast is greater than 10 in directions defined by azimuth angles of 45, 135, 225 and 315 degrees was 55 degrees.

Figure 29:
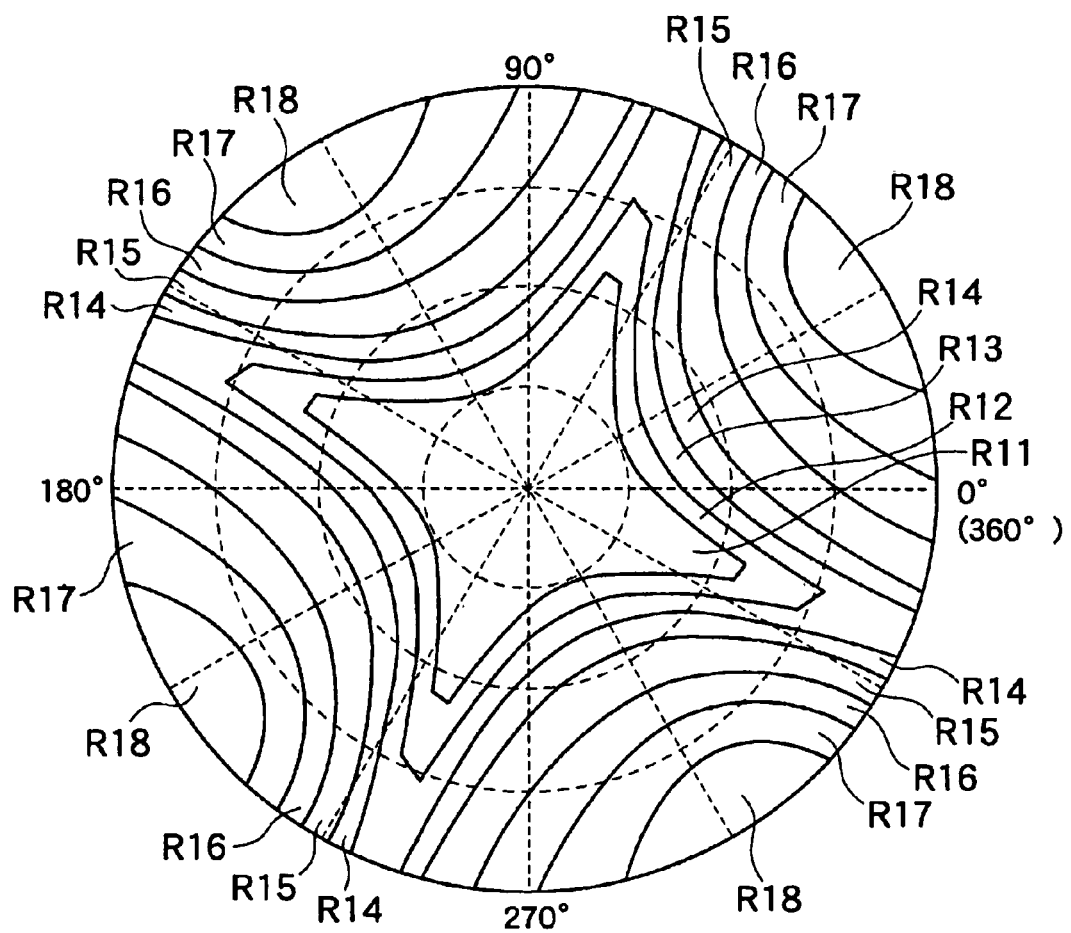
FIG. 29 shows an equi-contrast curve of a reference example of FIG. 28.

FIG. 29 shows the viewing angle characteristic of a liquid crystal display device in which the first and second polarizer plates 102 and 103, the first and second λ/4 plates 122 and 123, and the first and second optical compensation layers 112 and 113 are arranged with the conventional arrangement angles (see FIG. 13C), and the first and second optical compensation layers 112 and 113 have the same retardation in a thickness-wise direction thereof as those of FIG. 28. In such a liquid crystal display device, as shown in FIG. 29, the viewing angle characteristic is asymmetric about a direction from 0 degree to 180 degrees and a direction from 90 degrees to 270 degrees.

FIG. 30 shows an equi-contrast curve wherein each of the first and second optical compensation layers 112 and 113 has retardation of 100 nanometers in a thickness-wise direction thereof (a sum of retardation is 200 nanometers). The arrangement angles of the first polarizer plate 102, the first λ/4 plate 122, the first optical compensation layer 112, the second optical compensation layer 113, the second λ/4 plate 123, and the second polarizer plate 103 are 5, 140, 95, 5, 50, and 95 degrees, respectively, as shown in FIG. 27. Specifically, the first and second polarizer-supports 132 and 133 have retardation of 25 nanometers in a thickness-wise direction thereof, the first and second optical compensation layers 112 and 113 have retardation of 100 nanometers in a thickness-wise direction thereof, the absorption axis 102a of the first polarizer plate 102 is deviated in angle from an x-axis (a symmetry axis about which liquid crystal is aligned in different directions) by 5 degrees, and the absorption axis 103a of the second polarizer plate 103 is deviated in angle from a y-axis (a symmetry axis about which liquid crystal is aligned in different directions) by 5 degrees.

As shown in FIG. 30, when the first and second optical compensation layers 112 and 113 had negative uniaxial retardation of 100 nanometers (a sum of the retardation is 200 nanometers) in a thickness-wise direction thereof, there was obtained symmetric viewing angle characteristic by selecting the azimuth angles shown in FIG. 27. Furthermore, a range of polar angles where contrast is greater than 10 in directions defined by azimuth angles of 45, 135, 225 and 315 degrees was 54 degrees.

FIG. 31 shows the viewing angle characteristic of a liquid crystal display device in which the first and second polarizer plates 102 and 103, the first and second λ/4 plates 122 and 123, and the first and second optical compensation layers 112 and 113 are arranged with the conventional arrangement angles (see FIG. 13C), and the first and second optical compensation layers 112 and 113 have the same retardation in a thickness-wise direction thereof as those of FIG. 30. In such a liquid crystal display device, as shown in FIG. 31, the viewing angle characteristic is asymmetric about a direction from 0 degree to 180 degrees and a direction from 90 degrees to 270 degrees.

Though an equi-contrast curve is not illustrated, there was obtained the same result as the result obtained in FIGS. 28 and 30, even when the first and second optical compensation layers 112 and 113 had negative uniaxial retardation of 25 nanometers (a sum of the retardation is 50 nanometers), 50 nanometers (a sum of the retardation is 100 nanometers), 125 nanometers (a sum of the retardation is 250 nanometers), or 150 nanometers (a sum of the retardation is 300 nanometers) in a thickness-wise direction thereof.

FIG. 32 shows the dependency of a relation between a polar angle and transmissivity on a voltage in a direction from 0 to 180 degrees in azimuth angle, observed when the first and second optical compensation layers 112 and 113 have retardation of 75 nanometers (a sum of the retardation is 150 nanometers) in a thickness-wise direction thereof, and the parts 101, 102, 103, 112, 113, 122, and 123 are arranged as shown in FIG. 27. FIG. 33 shows the dependency of a relation between a polar angle and transmissivity on a voltage in a direction from 45 to 135 degrees in azimuth angle, observed when the first and second optical compensation layers 112 and 113 have retardation of 75 nanometers (a sum of the retardation is 150 nanometers) in a thickness-wise direction thereof, and the parts 101, 102, 103, 112, 113, 122, and 123 are arranged as shown in FIG. 27.

As is understood in view of FIGS. 32 and 33, it is possible to prevent an increase in transmissivity of a liquid crystal display device which displays darkness (black) or in which no voltage is applied to liquid crystal in both FIGS. 32 and 33, though there is observed gray-scale reversal in FIG. 33 when a high voltage is applied to liquid crystal.

Hereinbelow are explained cases where the first and second polarizer-supports 132 and 133 have retardation of 50 nanometers in a thickness-wise direction thereof in place of 25 nanometers.

FIG. 34 is a graph having the axis of abscissa indicating a sum of retardations of the first and second optical compensation layers 112 and 113, and the axis of ordinates indicating a direction or an azimuth angle in which the transmissivity of a liquid crystal display device displaying darkness (black) is in maximum in a liquid crystal display device in which the first and second polarizer plates 102 and 103, the first and second λ/4 plates 122 and 123, and the first and second optical compensation layers 112 and 113 are arranged in the conventional arrangement angles (see FIG. 13C), and the first and second polarizer-supports 132 and 133 have retardation of 50 nanometers in a thickness-wise direction thereof.

With reference to FIG. 34, similarly to FIG. 26, it is understood that a direction in which the transmissivity of a liquid crystal display device displaying darkness (black) is in maximum is deviated from an azimuth angle of 45 degrees, and that, the deviation in angle is dependent on the retardation of the first and second optical compensation layers 112 and 113.

However, the deviation in angle in FIG. 34 is slightly different from the same in FIG. 26 due to an increase in the retardation of the first and second polarizer-supports 132 and 133 composed of TAC, specifically, an increase from 25 nanometers to 50 nanometers.

Considering the deviation in angle, the inventors determined the arrangement angles of the first and second polarizer plates 102 and 103, the first and second λ/4 plates 122 and 123 and the first and second optical compensation layers 112 and 113, and the retardation of the first and second optical compensation layers 112 and 113 in a thickness-wise direction thereof, as shown in FIG. 35, in order to cancel the deviation in angle. The inventors tested viewing angle characteristic of a liquid crystal display device including the liquid crystal cell 101 together with the above-mentioned parts 102, 103, 122, 123, 112 and 113. FIG. 35 should be read in the same manner as FIGS. 15 and 27.

FIG. 35 shows the azimuth angles determined in the same way as in FIGS. 15 and 27.

By selecting the azimuth angles shown in FIG. 35, a high-contrast area was narrow in directions defined by azimuth angles of 45, 135, 225 and 315 degrees, similarly to selecting the azimuth angles shown in FIG. 27, and there was obtained viewing angle characteristic symmetric about x- and y-axes.

FIG. 36 shows an equi-contrast curve wherein each of the first and second optical compensation layers 112 and 113 has retardation of 50 nanometers in a thickness-wise direction thereof (a sum of retardation is 100 nanometers). The arrangement angles of the first polarizer plate 102, the first λ/4 plate 122, the first optical compensation layer 112, the second optical compensation layer 113, the second λ/4 plate 123, and the second polarizer plate 103 are 28, 163, 118, 28, 73 and 118 degrees, respectively, as shown in FIG. 35.

The areas R11 to R18 in FIGS. 36 to 39 indicate the same shown in FIG. 6, and a boundary between the areas R16 and R17 indicates an equi-contrast curve where contrast is equal to ten.

As shown in FIG. 36, there was obtained the symmetric viewing angle characteristic by selecting the azimuth angles shown in FIG. 35, when the first and second optical compensation layers 112 and 113 had retardation of 50 nanometers in a thickness-wise direction thereof (a sum of the retardations was 100 nanometers). Furthermore, a range of polar angles where contrast is greater than 10 in directions defined by azimuth angles of 45, 135, 225 and 315 degrees was 50 degrees.

FIG. 37 shows the viewing angle characteristic of a liquid crystal display device in which the first and second polarizer plates 102 and 103, the first and second λ/4 plates 122 and 123, and the first and second optical compensation layers 112 and 113 are arranged with the conventional arrangement angles (see FIG. 13C), and the first and second optical compensation layers 112 and 113 have the same retardation in a thickness-wise direction thereof as those of FIG. 36. In such a liquid crystal display device, as shown in FIG. 37, the viewing angle characteristic is asymmetric about a direction from 0 degree to 180 degrees and a direction from 90 degrees to 270 degrees.

FIG. 38 shows an equi-contrast curve wherein each of the first and second optical compensation layers 112 and 113 has retardation of 75 nanometers in a thickness-wise direction thereof (a sum of retardation is 150 nanometers). The arrangement angles of the first polarizer plate 102, the first λ/4 plate 122, the first optical compensation layer 112, the second optical compensation layer 113, the second λ/4 plate 123, and the second polarizer plate 103 are 16, 151, 106, 16, 61, and 106 degrees, respectively, as shown in FIG. 35.

As shown in FIG. 38, when the first and second optical compensation layers 112 and 113 had retardation of 75 nanometers (a sum of the retardation is 150 nanometers) in a thickness-wise direction thereof, there was obtained symmetric viewing angle characteristic by selecting the azimuth angles shown in FIG. 35. Furthermore, a range of polar angles where contrast is greater than 10 in directions defined by azimuth angles of 45, 135, 225 and 315 degrees was 53 degrees.

FIG. 39 shows the viewing angle characteristic of a liquid crystal display device in which the first and second polarizer plates 102 and 103, the first and second λ/4 plates 122 and 123, and the first and second optical compensation layers 112 and 113 are arranged with the conventional arrangement angles (see FIG. 13C), and the first and second optical compensation layers 112 and 113 have the same retardation in a thickness-wise direction thereof as those of FIG. 38. In such a liquid crystal display device, as shown in FIG. 39, the viewing angle characteristic is asymmetric about a direction from 0 degree to 180 degrees and a direction from 90 degrees to 270 degrees.

Though an equi-contrast curve is not illustrated, there was obtained the same result as the result obtained in FIGS. 36 and 38, even when the first and second optical compensation layers 112 and 113 had negative uniaxial retardation of 25 nanometers (a sum of the retardation is 50 nanometers), 50 nanometers (a sum of the retardation is 100 nanometers), 125 nanometers (a sum of the retardation is 250 nanometers), or 150 nanometers (a sum of the retardation is 300 nanometers) in a thickness-wise direction thereof. In the liquid crystal display device 1 in accordance with the first embodiment, the absorption axes 102a and 103a of the first and second polarizer plates 102 and 103 are deviated about a symmetry axis about which liquid crystal is aligned in different directions in the liquid crystal layer 101c in order to ensure symmetry in viewing angle characteristic in the liquid crystal display device 1, and the arrangement angles of the first and second λ/4 plates 122 and 123 and the first and second optical compensation layers 112 and 113 are shifted accordingly. Thus, the liquid crystal display device 1 ensures the viewing angle characteristic symmetric about x- and y-axes. Furthermore, it is also possible to prevent light leakage (white dots in darkness) which occurs in directions at 45 degrees from the absorption axes 102a and 103a of the first and second polarizer plates 102 and 103, namely, directions defined by azimuth angles of 45, 135, 225 and 315 degrees, when the liquid crystal display device 1 displays darkness (black).

Other examples of the liquid crystal cell 101 are illustrated in FIGS. 47 and 48.

First, how an area and a width of a slit for a liquid crystal cell should be determined is explained hereinbelow.

It is more difficult to apply a voltage to liquid crystal existing in the vicinity of a slit than to apply a voltage to liquid crystal sandwiched between a pixel electrode and a common electrode. Hence, an efficiency with which a light is used is low at a slit.

Accordingly, it is necessary to reduce an area of a slit in order to raise transmissivity of light. From this standpoint, a liquid crystal cell 47 containing vertically aligned liquid crystal, illustrated in FIG. 47, has the reduced number of the rectangles 101h per a unit area in comparison with the liquid crystal cell illustrated in FIG. 22, to thereby reduce a total area of the slits 101g and 101f and raise transmissivity.

On the other hand, it is necessary to increase liquid crystal exposed to oblique electric field in order to better a response time. From this standpoint, a liquid crystal cell 48 containing vertically aligned liquid crystal, illustrated in FIG. 48, has the increased number of the rectangles 101h per a unit area in comparison with the liquid crystal cell illustrated in FIG. 22, to thereby increase a total area of the slits 101g and 101f. An efficiency with which light is used is lowered in the liquid crystal cell 48 in accordance with an increase in an area of the slits 101g and 101f.

It is preferable that the slits 101g and 101f are as wide as possible in view of stability of liquid crystal alignment against external pressure such as pushing with a finger. The reason is explained hereinbelow with reference to FIGS. 49 and 50.

The slits 101g and 101f act as a boundary of liquid crystal alignment, that is, a boundary about which liquid crystal is inclined in different directions. Hence, liquid crystal existing in alignment with the slits 101g and 101f stand neutral, that is, are kept vertically aligned even when a voltage is applied thereto. Hence, the slits 101g and 101f having a greater width (FIG. 49) could increase an amount of liquid crystal kept vertically aligned relative to the slits 101g and 101f having a smaller width (FIG. 50), and hence, liquid crystal existing in alignment with the slits 101g and 101f could have an increased resistance against external pressure.

However, the wider the slits 101g and 101f are, the smaller transmissivity is. It is necessary to reduce an area of the slits 101g and 101f by narrowing them in order to raise transmissivity, but if the slits 101g and 101f are too narrow, it would not be possible to keep liquid crystal aligned in different directions about the slits.

Considering the above-mentioned matters, the inventors concluded that it was preferable for a slit to have a width in the range of 6 micrometers to 12 micrometers both inclusive.

FIG. 51 illustrates an example of preferable dimension of the liquid crystal cell 47 illustrated in FIG. 47, and FIG. 52 illustrates an example of preferable dimension of the liquid crystal cell 48 illustrated in FIG. 48.

Second Embodiment

FIG. 40A is a front cross-sectional view of a liquid crystal display device 10 in accordance with the second embodiment of the present invention, and FIG. 40B is a broken perspective view of the liquid crystal display device 10.

As illustrated in FIG. 40A, the liquid crystal display device 10 in accordance with the second embodiment is designed not to include the second optical compensation layer 113 in comparison with the liquid crystal display device 1 illustrated in FIGS. 20A and 20B. The liquid crystal display device 10 in accordance with the second embodiment has the same structure as that of the liquid crystal display device 1 except in not including the second optical compensation layer 113.

The first and second polarizer-supports 132 and 133 in the second embodiment have retardation of 25 nanometers in a thickness-wise direction thereof.

The inventors tested viewing angle characteristic in six liquid crystal display devices each of which had the same structure as that of the liquid crystal display device 10 in accordance with the second embodiment and in which the first optical compensation layer 112 had retardation of 25, 50, 75, 100, 125 and 150 nanometers, respectively, in a thickness-wise direction thereof. Hereinbelow are explained the results of the test.

FIG. 41 is a graph having the axis of abscissa indicating retardation of the first optical compensation layer 112, and the axis of ordinates indicating a direction or an azimuth angle in which the transmissivity of a liquid crystal display device displaying darkness (black) is in maximum in a liquid crystal display device which has the same structure as that of the liquid crystal display device 10, but in which the first and second polarizer plates 102 and 103, the first and second λ/4 plates 122 and 123, and the first optical compensation layer 112 are arranged in the conventional arrangement angles (see FIG. 13C).

With reference to FIG. 41, similarly to FIG. 34, it is understood that a direction in which the transmissivity of a liquid crystal display device displaying darkness (black) is in maximum is deviated from an azimuth angle of 45 degrees, and that, the deviation in angle is dependent on the retardation of the first optical compensation layer 112.

The deviation in angle in FIG. 41 is different from the same in FIG. 34 because the liquid crystal display device 10 does not include the second optical compensation layer 113.

Considering the deviation in angle, the inventors determined the arrangement angles of the first and second polarizer plates 102 and 103, the first and second λ/4 plates 122 and 123 and the first optical compensation layer 112, and the retardation of the first optical compensation layer 112 in a thickness-wise direction thereof, as shown in FIG. 42, in order to cancel the deviation in angle. The inventors tested viewing angle characteristic of a liquid crystal display device including the liquid crystal cell 101 together with the above-mentioned parts 102, 103, 122, 123, and 112.

FIG. 42 shows the azimuth angles determined in the same way as in FIGS. 15, 27 and 35.

FIG. 43 shows an equi-contrast curve wherein the first optical compensation layer 112 has retardation of 50 nanometers in a thickness-wise direction thereof. The arrangement angles of the first polarizer plate 102, the first λ/4 plate 122, the first optical compensation layer 112, the second λ/4 plate 123, and the second polarizer plate 103 in FIG. 43 are 28, 163, 118, 73, and 118 degrees, respectively, as shown in FIG. 42.

The areas R11 to R18 in FIGS. 43 and 44 indicate the same shown in FIG. 6, and a boundary between the areas R16 and R17 indicates an equi-contrast curve where contrast is equal to ten.

As shown in FIG. 43, there was obtained the symmetric viewing angle characteristic by selecting the azimuth angles shown in FIG. 42, when the first optical compensation layer 112 had retardation of 50 nanometers in a thickness-wise direction thereof. Furthermore, a range of polar angles where contrast is greater than 10 in directions defined by azimuth angles of 45, 135, 225 and 315 degrees was 44 degrees.

FIG. 44 shows an equi-contrast curve wherein the first optical compensation layer 112 has retardation of 75 nanometers in a thickness-wise direction thereof. The arrangement angles of the first polarizer plate 102, the first λ/4 plate 122, the first optical compensation layer 112, the second λ/4 plate 123, and the second polarizer plate 103 in FIG. 44 are 28, 163, 118, 73, and 118 degrees, respectively, as shown in FIG. 42.

As shown in FIG. 44, when the first optical compensation layer 112 had retardation of 75 nanometers in a thickness-wise direction thereof, there was obtained symmetric viewing angle characteristic by selecting the azimuth angles shown in FIG. 42. Furthermore, a range of polar angles where contrast is greater than 10 in directions defined by azimuth angles of 45, 135, 225 and 315 degrees was 46 degrees, which was slightly broader than the same in FIG. 43. However, the symmetry in FIG. 44 is slightly degraded relative to the symmetry in FIG. 43.

FIG. 45 shows the dependency of a relation between a polar angle and transmissivity on a voltage in a direction from 0 to 180 degrees in azimuth angle, observed when the first optical compensation layer 112 has retardation of 50 nanometers in a thickness-wise direction thereof, and the parts 101, 102, 103, 112, 122, and 123 are arranged as shown in FIG. 42. FIG. 46 shows the dependency of a relation between a polar angle and transmissivity on a voltage in a direction from 45 to 135 degrees in azimuth angle, observed when the first optical compensation layer 112 has retardation of 50 nanometers in a thickness-wise direction thereof, and the parts 101, 102, 103, 112, 122, and 123 are arranged as shown in FIG. 42.

As is understood in view of FIGS. 45 and 46, it is possible to prevent an increase in transmissivity of a liquid crystal display device which displays darkness (black) or in which no voltage is applied to liquid crystal in both FIGS. 45 and 46, though there is observed slight increase in the transmissivity due to variation in a polar angle.

As illustrated in FIG. 46, gray-scale reversal observed in a direction from 45 to 135 degrees in azimuth angle when a high voltage is applied to liquid crystal can be lowered in comparison with FIG. 33.

As mentioned above, the liquid crystal display device 10 in accordance with the second embodiment provides the same advantages as those provided by the liquid crystal display device 1 in accordance with the above-mentioned first embodiment. Furthermore, since the liquid crystal display device 10 in accordance with the second embodiment is not necessary to include the second optical compensation layer 113, the liquid crystal display device 10 can be fabricated at lower costs than the liquid crystal display device 1 in accordance with the above-mentioned first embodiment. In addition, gray-scale reversal observed in a direction from 45 to 135 degrees in azimuth angle when a high voltage is applied to liquid crystal can be lowered in comparison with the above-mentioned first embodiment.

Third Embodiment

In the above-mentioned first and second embodiments, a liquid crystal cell allows a light to pass therethrough. In the third embodiment explained hereinbelow, a liquid crystal cell has a pixel electrode both having a first area in which a light is allowed to pass therethrough, and a second area in which a light is reflected.

FIG. 53 is a perspective view of a liquid crystal cell 53 in a liquid crystal display device in accordance with the third embodiment, and FIG. 54 is a plan view of the liquid crystal cell 53. For simplification, general parts constituting a liquid crystal display device, such as a thin film transistor (TFT) and a wiring electrode, are omitted in FIGS. 53 and 54.

As illustrated in FIGS. 53 and 54, the liquid crystal cell 53 is of so-called half-transmission type, that is, the liquid crystal cell 53 has a pixel electrode 101e comprised of a transparent electrode 532 in which a light is allowed to pass therethrough, and a light-reflection electrode 531 in which a light is reflected.

Though the light-reflection electrode 531 is illustrated in FIG. 54 as having a planar surface, the light-reflection electrode 531 in the third embodiment actually has a roughened surface in order to enhance its reflectivity.

As illustrated in FIGS. 53 and 54, a common electrode 101d is formed with slits 101f in alignment with the light-reflection electrode 531 and the transparent electrode 532. The slits 101f cause liquid crystal to be aligned in different four directions in each of the light-reflection electrode 531 and the transparent electrode 532.

In the liquid crystal cell 53, the light-reflection electrode 531 has smaller retardation in a thickness-wise direction thereof than retardation of the transparent electrode 532 in a thickness-wise direction. For instance, when liquid crystal has a birefringence rate (Δn) of 0.0741, a cell gap in the transparent electrode 532 is set equal to 4.5 micrometers, in which case, it is preferable that the retardation of the light-reflection electrode 531 is equal to about 44% of the transparent electrode 532, for instance, though dependent on sharpness of a roughened surface of the light-reflection electrode 531. Hence, for instance, the liquid crystal layer is designed to have retardation of 333±20 nanometers (preferably, 333±15) in alignment with the transparent electrode 532, and retardation of 150±20 nanometers (preferably, 150±15) in alignment with the light-reflection electrode 531.

By designing the retardation of the light-reflection electrode 531 in a thickness-wise direction thereof to be smaller than the retardation of the transparent electrode 532 in a thickness-wise direction thereof, it is possible to display images with high quality both in the light-reflection electrode 531 and the transparent electrode 532.

Even if the light-reflection electrode 531 is not formed with the slits 101f, the viewing angle characteristic is not degraded. However, since the light-reflection electrode 531 is roughened at a surface thereof, reproducibility of liquid crystal alignment becomes weak, if there is no alignment controller other than the slits 101f, resulting in that images may be seen with unclearness. Hence, the slits 110f are formed in alignment with the light-reflection electrode 531 in the common electrode 110d to thereby enhance reproducibility in liquid crystal alignment.

The inventors tested viewing angle characteristic of a liquid crystal display device having the same structure as that of the liquid crystal display device 1 in accordance with the first embodiment except that the tested liquid crystal display device includes the liquid crystal cell 53 in place of the liquid crystal cell 101, and the first and second polarizer-supports 132 and 133 have retardation of 25 nanometers in a thickness-wise direction thereof. The result of the test is explained hereinbelow.

The first and second optical compensation layers 112 and 113 have negative uniaxial retardation of 100 nanometers in a thickness-wise direction thereof (a sum of the retardation is 200 nanometers).

With respect to light-transmission characteristic, there was obtained symmetric viewing angle characteristic. Furthermore, a range of polar angles where contrast is greater than 10 in directions defined by azimuth angles of 45, 135, 225 and 315 degrees was 54 degrees.

With respect to light-reflection characteristic, a reflection rate of darkness could be lowered, ensuring better contrast. Images could be seen without unclearness.

The liquid crystal display device in accordance with the third embodiment provides the same advantages as those provided by the liquid crystal display device 1 in accordance with the above-mentioned first embodiment. In addition, the liquid crystal display device in accordance with the third embodiment makes it possible to suppress a reflection rate of darkness (black), ensure better contrast, and enable images to be seen without unclearness.

Fourth Embodiment

In the above-mentioned first to third embodiments, slits formed at electrodes define a boundary about which liquid crystal is aligned in different directions. In the fourth embodiment explained hereinbelow, an electrically insulating projection formed at a surface of an electrode defines a boundary about which liquid crystal is aligned in different directions.

FIG. 55 is a cross-sectional view of a liquid crystal cell 55 in the fourth embodiment, and FIG. 56 is a plan view of the liquid crystal cell 55.

As illustrated in FIGS. 55 and 56, the liquid crystal cell 55 in a liquid crystal display device in accordance with the fourth embodiment is structurally different from the liquid crystal cell 101 in the first embodiment in that the common electrode 101d in the liquid crystal cell 55 is not formed with the slits 101f, and that the common electrode 101d is formed with an electrically insulating projection 551 in place of the slits 101f. The liquid crystal cell 55 has the same structure as that of the liquid crystal cell 101 except having the electrically insulating projection 551 in place of the slits 101f.

The common electrode 101d of the liquid crystal cell 55 is formed at a surface thereof facing the liquid crystal layer 101c with the electrically insulating projection 551.

A planar shape and a location of the electrically insulating projection 551 are identical with those of the slit 101f in the liquid crystal cell 101. Specifically, the electrically insulating projection 551 is cross-shaped, and is disposed overlapping each of the rectangles 101h of the pixel electrode 101e in a direction of a normal line of the first substrate 101a.

The electrically insulating projection 551 defines a boundary about which liquid crystal is aligned in different directions in the liquid crystal layer 101c.

Since the electrically insulating projection 551 reinforces the liquid crystal cell 55, it would be possible to have stability in liquid crystal alignment against external pressure such as pushing with a finger.

The electrically insulating projection 551 may be composed of acrylic photosensitive material, for instance.

If the rectangle 101h in the liquid crystal cell 55 is identical in shape with the rectangle in the liquid crystal cell 47 illustrated in FIG. 47, it is preferable that the electrically insulating projection 551 is shaped as shown in FIG. 57. If the rectangle 101h in the liquid crystal cell 55 is identical in shape with the rectangle in the liquid crystal cell 48 illustrated in FIG. 48, it is preferable that the electrically insulating projection 551 is shaped as shown in FIG. 58.

In the above-mentioned fourth embodiment, since the common electrode 101d is formed at a surface thereof facing the liquid crystal layer 101c with the electrically insulating projection 551, the electrically insulating projection 551 defines a boundary about which liquid crystal is aligned in different directions in the liquid crystal layer 101c, and stability in liquid crystal alignment is ensured against external pressure such as pushing with a finger.

Apart from the above-mentioned arrangements, the optical compensation layer having negative uniaxial retardation may be arranged at least one of between the first λ/4 plate 122 and the liquid crystal cell 101, between the second λ/4 plate 123 and the liquid crystal cell 101, between the first λ/4 plate 122 and the first polarizer plate 102, and between the second λ/4 plate 123 and the second polarizer plate 103.

Retardation of the optical compensation layer having negative uniaxial retardation may be determined to be any retardation, and the arrangement angles of the parts constituting the liquid crystal display device in accordance with the above-mentioned embodiments may be varied accordingly.

The cross-shaped slit 101f acting as a boundary about which liquid crystal is aligned in different directions may be formed not only in the common electrode 101d, but also in the pixel electrode 101e, or may be formed only in the pixel electrode 101e.

Similarly, the electrically insulating projection 551 may be formed not only in the common electrode 101d, but also in the pixel electrode 101e, or may be formed only in the pixel electrode 101e.

As an alternative, when the common electrode 101d and/or the pixel electrode 101e is(are) formed with the slits 101f, the electrically insulating projection 551 may be formed in the slits 101f.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2004-000526 filed on Jan. 5, 2004 including specification, claims, drawings and summary is incorporated herein by reference in its entirety.

What is claimed is:

1. A liquid crystal display device including:
   (a) a liquid crystal cell comprised of a pair of substrates each having at least one electrode formed thereon, and a liquid crystal layer sandwiched between said substrates;
   (b) a first polarizer arranged to face said liquid crystal cell;
   (c) a second polarizer arranged to face said liquid crystal cell at the opposite side of said first polarizer;
   (d) a first retardation plate arranged between said first polarizer and said liquid crystal cell;
   (e) a second retardation plate arranged between said second polarizer and said liquid crystal cell; and
   (f) an optical layer having negative uniaxial retardation and arranged at least one of between said first retardation plate and said liquid crystal cell, between said second retardation plate and said liquid crystal cell, between said first retardation plate and said first polarizer, and between said second retardation plate and said second polarizer,
   wherein each of said first and second retardation plates has a lagging axis in a plane disposed in parallel with said substrates, and has retardation of almost λ/4, lagging axes of said first and second retardation plates being perpendicular with each other,
   said first polarizer has an absorption axis inclining by about 45 degrees relative to said lagging axis of said first retardation plate, and inclining by about 90 degrees relative to an absorption axis of said second polarizer,
   said liquid crystal layer is composed of liquid crystal which has negative dielectric anisotropy and which is aligned vertically when no voltage is applied thereto, and aligned in four directions when a voltage is applied thereto, and
   said absorption axes of said first and second polarizers are angularly deviated such that characteristic of a viewing angle in said liquid crystal display device is rendered symmetric, relative to a symmetry axis about which said liquid crystal in said liquid crystal layer is aligned in different directions.

2. The liquid crystal display device as set forth in claim 1, wherein an angle at which said absorption axes of said first and second polarizers are angularly deviated relative to said symmetry axis is determined to be an angle at which symmetry in said characteristic of a viewing angle in said liquid crystal display device is accomplished.

3. The liquid crystal display device as set forth in claim 1, wherein said liquid crystal cell has a first area in which a light passes therethrough and a second area in which a light is reflected, and said liquid crystal is aligned in four directions in each of said first and second areas.

4. The liquid crystal display device as set forth in claim 3, wherein said liquid crystal layer has retardation of 333±20 nanometers in said first area, and 150±20 nanometers in said second area.

5. The liquid crystal display device as set forth in claim 1, wherein said optical layer is arranged between said first retardation plate and said liquid crystal cell, between said first retardation plate and said first polarizer, and between said second retardation plate and said second polarizer.

6. The liquid crystal display device as set forth in claim 1, wherein said optical layer is arranged between said first retardation plate and said liquid crystal cell, between said second retardation plate and said liquid crystal cell, between said first retardation plate and said first polarizer, and between said second retardation plate and said second polarizer.

7. The liquid crystal display device as set forth in claim 6, wherein an optical layer arranged between said first retardation plate and said first polarizer has retardation of 25 nanometers in a thickness-wise direction thereof, an optical layer arranged between said second retardation plate and said second polarizer has retardation of 25 nanometers in a thickness-wise direction thereof, an optical layer arranged between said first retardation plate and said liquid crystal cell has retardation of 75 nanometers in a thickness-wise direction thereof, and an optical layer arranged between said second retardation plate and said liquid crystal cell has retardation of 75 nanometers in a thickness-wise direction thereof, and
   an angle at which said absorption axes of said first and second polarizers are angularly deviated relative to said symmetry axis is determined to be 20 degrees.

8. The liquid crystal display device as set forth in claim 6, wherein an optical layer arranged between said first retardation plate and said first polarizer has retardation of 25 nanometers in a thickness-wise direction thereof, an optical layer arranged between said second retardation plate and said second polarizer has retardation of 25 nanometers in a thickness-wise direction thereof, an optical layer arranged between said first retardation plate and said liquid crystal cell has retardation of 100 nanometers in a thickness-wise direction thereof, and an optical layer arranged between said second retardation plate and said liquid crystal cell has retardation of 100 nanometers in a thickness-wise direction thereof, and an angle at which said absorption axes of said first and second polarizers are angularly deviated relative to said symmetry axis is determined to be 5 degrees.

9. The liquid crystal display device as set forth in claim 5, wherein an optical layer arranged between said first retardation plate and said first polarizer is comprised of a support for supporting said first polarizer, and an optical layer arranged between said second retardation plate and said second polarizer is comprised of a support for supporting said second polarizer.

10. The liquid crystal display device as set forth in claim 6, wherein an optical layer arranged between said first retardation plate and said first polarizer is comprised of a support for supporting said first polarizer, and an optical layer arranged between said second retardation plate and said second polarizer is comprised of a support for supporting said second polarizer.

11. The liquid crystal display device as set forth in claim 1, wherein said electrode in at least one of said substrates is formed with a slit.

12. The liquid crystal display device as set forth in claim 11, wherein said slit defines a boundary about which said liquid crystal in said liquid crystal layer is aligned in different directions.

13. The liquid crystal display device as set forth in claim 1, wherein said electrode in at least one of said substrates is formed at a surface facing said liquid crystal layer with an electrically insulating projection defining a boundary about which said liquid crystal in said liquid crystal layer is aligned in different directions.

14. The liquid crystal display device as set forth in claim 1, wherein said electrode in at least one of said substrates is formed at a surface facing said liquid crystal layer with a slit, and an electrically insulating projection defining a boundary about which said liquid crystal in said liquid crystal layer is aligned in different directions is formed in said slit.

* * * * *